(12) United States Patent
Iwatake

(10) Patent No.: US 9,724,825 B2
(45) Date of Patent: Aug. 8, 2017

(54) ROBOT CONTROLLER FOR ROBOT WHICH SETS TWO OBJECTS IN COMBINED STATE

(71) Applicant: FANUC CORPORATION, Yamanashi (JP)

(72) Inventor: Takahiro Iwatake, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/203,848

(22) Filed: Jul. 7, 2016

(65) Prior Publication Data

US 2017/0008171 A1 Jan. 12, 2017

(30) Foreign Application Priority Data

Jul. 9, 2015 (JP) .................................. 2015-138007

(51) Int. Cl.
*B25J 9/16* (2006.01)
*B25J 13/08* (2006.01)

(52) U.S. Cl.
CPC ........... *B25J 9/1633* (2013.01); *B25J 13/085* (2013.01); *G05B 2219/39505* (2013.01)

(58) Field of Classification Search
CPC ........ B25J 9/1633; B25J 13/085; B25J 13/08; G05B 2219/39505; G05B 19/19; G05B 2219/39319; G05B 2219/39322; G05B 2219/39323; G05B 2219/39332
USPC ................. 700/250, 253, 256, 258, 260, 261
See application file for complete search history.

(56) References Cited

U.S. PATENT DOCUMENTS

| 4,621,332 A | 11/1986 | Sugimoto et al. |
| 6,522,952 B1 * | 2/2003 | Arai ....................... B25J 9/1679 414/591 |
| 2010/0332032 A1 * | 12/2010 | Moriyama ............. B25J 9/1682 700/258 |
| 2012/0130541 A1 * | 5/2012 | Szalek ..................... B25J 9/106 700/258 |
| 2013/0110128 A1 * | 5/2013 | Schostek ............ A61B 1/00158 606/130 |

FOREIGN PATENT DOCUMENTS

| JP | H04-043144 B2 | 7/1992 |
| JP | H09-091026 A | 4/1997 |
| JP | 2002052485 A | 2/2002 |

(Continued)

*Primary Examiner* — Bao Long T Nguyen
(74) *Attorney, Agent, or Firm* — Hauptman Ham, LLP

(57) ABSTRACT

A robot controller which uses a robot to more stably, more rapidly move a given object and a different object relative to each other to set the given object and the different object in a combined state in which portions of the two objects are in contact and combined with each other. The robot controller includes an unit which measures a force acting between two objects, an unit which sets a direction of translational force control, an unit which sets a translational force control target force, an unit which sets an axis of rotational force control, an unit which calculates a target amount of translational force control direction movement, an unit which calculates a target amount of rotational force control axis rotational movement, an unit which calculates a target amount of rotational movement, and an unit which generates an operation command for the robot.

15 Claims, 18 Drawing Sheets

(56) References Cited

FOREIGN PATENT DOCUMENTS

| JP | 2006341372 A | 12/2006 |
|----|--------------|---------|
| JP | 2010137299 A | 6/2010  |
| JP | 2015085499 A | 5/2015  |

\* cited by examiner

FIG. 14a
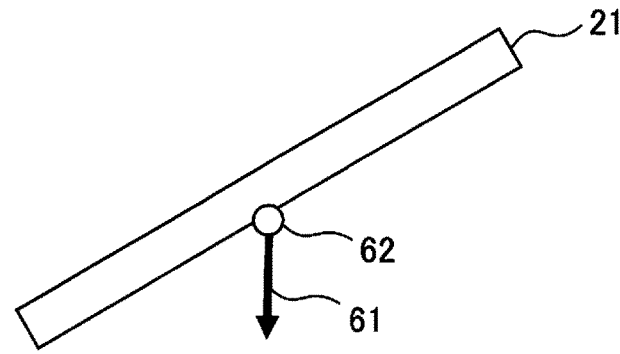
FIG. 14b
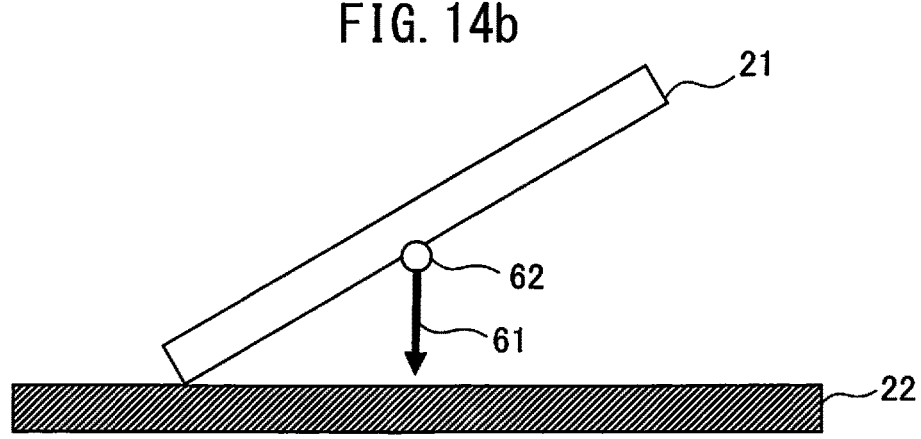
FIG. 14c
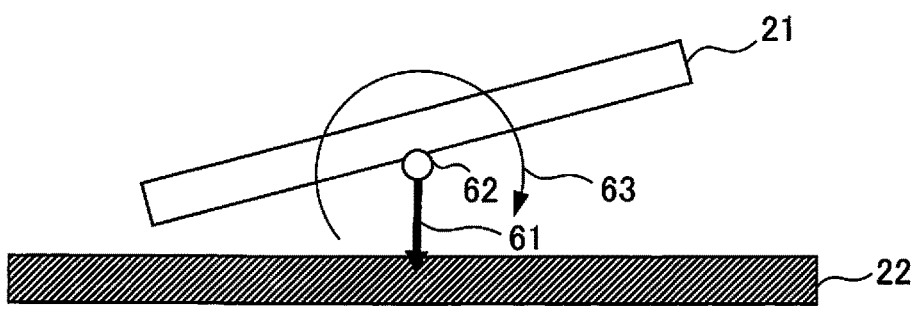

FIG. 16a
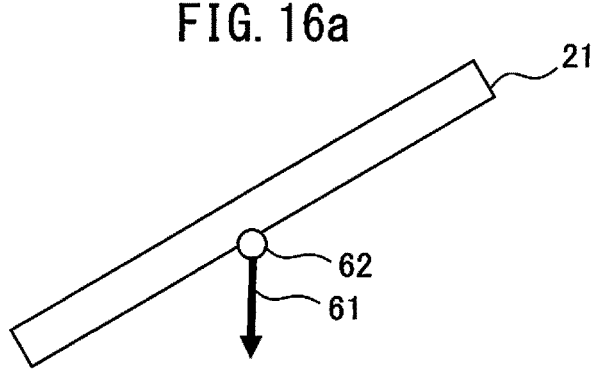
FIG. 16b
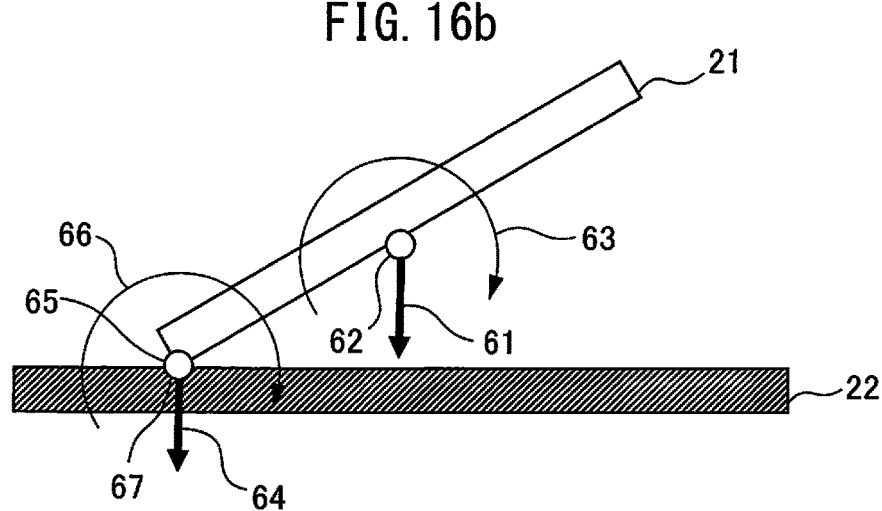
FIG. 16c
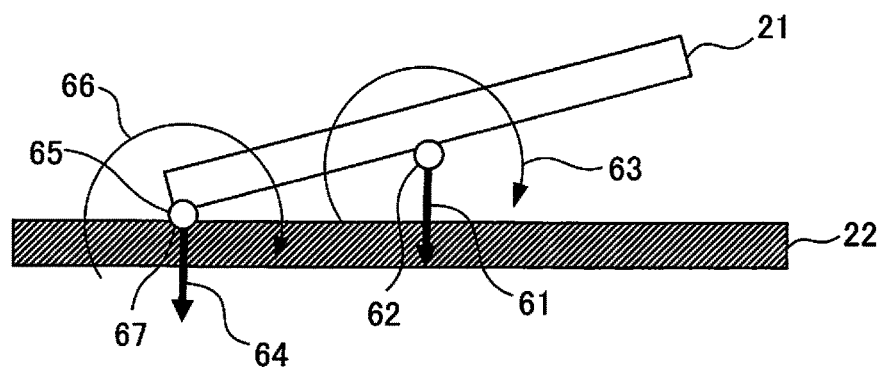

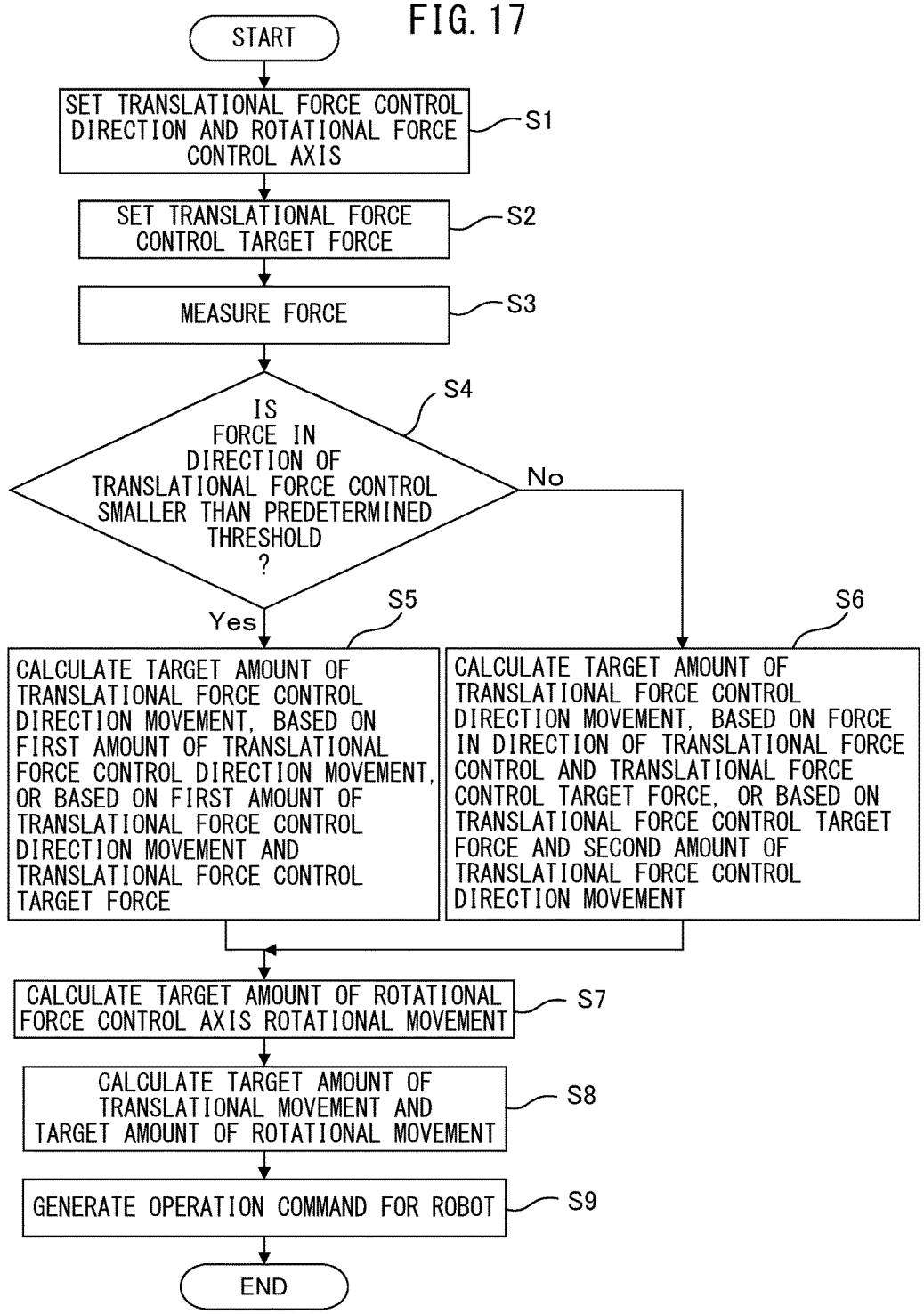

ROBOT CONTROLLER FOR ROBOT WHICH SETS TWO OBJECTS IN COMBINED STATE

RELATED APPLICATIONS

The present application claims priority to Japanese Patent Application Number 2015-138007, filed Jul. 9, 2015, the disclosure of which is hereby incorporated by reference herein in its entirety.

BACKGROUND OF THE INVENTION

1. Field of the Invention

The present invention relates to a robot controller for a robot which controls the force acting between a given object located on the end effector of the robot and a different object to move the given object relative to the different object to set the given object and the different object in a combined state in which a predetermined portion of the given object and a predetermined portion of the different object are in contact and combined with each other.

2. Description of the Related Art

In fitting, two objects are moved relative to each other to fit the shape of a certain portion in one object with that of a certain portion in the other object. The fitting refers herein to fitting a pair of objects having complementary shapes together, i.e., moving two objects to obtain a relationship in which shafts are firmly fitted together or loosely, slidably fitted together in recesses.

It is a common practice to move a given object relative to a different object to set the given object and the different object in a state in which a predetermined portion of the given object and a predetermined portion of the different object are in contact and combined with each other, instead of fitting the given object and the different object together, as in the above-mentioned fitting operation.

Examples of the given object and the different object may include herein various combinations of a workpiece, a tool, a processing or machining device, an inspection device, a measuring device, a worktable, and a jig. For example, a gripped workpiece may be mounted on a worktable for a machine tool, or the like. The surface of a gripped workpiece may be pressed against a processing device set in place to combine their surfaces with each other, or a linear portion forming a gripped workpiece may be pressed against and combined with a processing device set in place. The surface of a held tool may be combined with that of a workpiece fixed in position, the surface of a held tool may be combined with a linear portion forming a workpiece fixed in position, or a linear portion forming a holding tool may be combined with the surface of a workpiece. One component may be attached to another component to combine their surfaces or linear portions with each other. A workpiece may be brought into contact with an inspection device or a measuring device to combine their surfaces with each other.

To achieve, e.g., a cost reduction, quality stabilization, and automation of dangerous operations for the above-described operations in various situations, it is desired to use a robot for more stable, more quick operations.

As a method for moving a given object held on the end effector of a robot relative to a different object to set the given object and the different object in a state in which a predetermined portion of the given object and a predetermined portion of the different object are in contact and combined with each other to automate the above-described operations using a robot, a method is known for controlling the force acting between these two objects to reach a target force by compliance control.

With compliance control, a given object and a different object can be set in a state in which a predetermined portion of the given object and a predetermined portion of the different object are in contact and combined with each other by bringing the given object and the different object into contact with each other in a predetermined direction of translation and equilibrating the forces about one or two predetermined axes of rotation to zero. Then, with compliance control, a control point is set at the center point of rotation about which the given object rotates, the position of the control point for the given object is translated to press the given object in a predetermined direction with a predetermined force, and the given object is rotated about a predetermined axis of rotation including the control point, in accordance with the force about the predetermined axis of rotation, the target force, and the force control gain.

JP H04-043744 B discloses a method for controlling the position of a tool based on a motion model for a compliance mechanism to adjust the force acting between a given object and a different object or the force about the axis to a target value. With this method, the orientation is moved in accordance with the force about the axis, using the center of rotation as a control point.

JP H09-091026 A describes a method for calculating an orientation error at the approach point by bringing surfaces into contact with each other by pressing with a predetermined force in a plane perpendicular to a hole portion to combine the surfaces with each other, in advance, to correct the orientation error.

When any related art technique is used to set a given object and a different object in a combined state in which a predetermined portion of the given object and a predetermined portion of the different object are in contact and combined with each other, the relative position between the given object and the different object is controlled to obtain a state in which these objects are in contact with each other in at least one predetermined direction of translation and a state in which the forces about at least one predetermined axis of rotation are equilibrated to zero.

The force about the predetermined axis of rotation varies for each position at which the given object and the different object come into contact with each other. The magnitude of the force about the axis of rotation also varies depending on conditions such as the pressing force and the types of objects used as the given object and the different object. The force about the axis of rotation is likely to fluctuate because its value is obtained based on the distance between the force in the direction to press and the position about the axis of rotation. The force about the axis of rotation may be prone to noise or vibration or take a small value. Rotation may separate the given object and the different object from each other, thus generating no force about the axis of rotation. The force about the predetermined axis of rotation is controlled down to zero. Therefore, as the above-mentioned state is approached more closely, the force about the predetermined axis of rotation may reduce so that the sign of the force about the axis of rotation may frequently vary.

It is, therefore, difficult to achieve smooth convergence to the above-mentioned state by rapid rotation based on the force about the predetermined axis of rotation. When the target force in the direction to press is small, it is more difficult to achieve smooth convergence to the above-mentioned state by rapid rotation based on the force about the predetermined axis of rotation, because of the small force about the predetermined axis of rotation.

Further, in fitting, when the orientation is moved based on the force received from a given portion, a force acts upon contact with a different portion. Inserting a given object into a different object to follow this force converges the orientation of the given object relative to the different object. In other words, as insertion progresses, the amount by which the given object is moved past the target orientation reduces. In contrast to this, when a given object and a different object are set in a state in which a predetermined portion of the given object and a predetermined portion of the different object are in contact and combined with each other, inserting the given object into the different object does not facilitate convergence to the orientation. As rotation about a predetermined axis of rotation is speeded up, the target orientation is passed over. It is, therefore, hard to achieve smooth convergence to the above-mentioned state in a short period of time by rotation based on the force about the predetermined axis of rotation.

In the general method or the method disclosed in JP H04-043744 B, movement is performed by an amount corresponding to the magnitude of the force acting between the given object and the different object and the force control gain. Increasing the control gain of the force about the predetermined axis of rotation makes the robot operation unstable and prone to oscillation. Since the magnitude of the control gain of the force about the predetermined axis of rotation is limited, the velocity of rotation about the predetermined axis of rotation may not be increased considerably.

When the velocity of rotation about the predetermined axis of rotation is high, the velocity at which the given object and the different object separate from each other in the direction of translation upon rotation about the predetermined axis of rotation is higher than that, at which the given object and the different object come close to each other in the direction to press, based on the magnitude of the force acting between the given object and the different object and the force control gain. Accordingly, the given object and the different object separate or may separate from each other in the direction to press upon rotation of the given object, so that the force about the predetermined axis of rotation reduces. This, in turn, slows down rotation about the predetermined axis of rotation or sets the given object and the different object in a non-contact state, so that the force about the predetermined axis of rotation reduces to zero and rotation stops.

In this case, rotation is restarted in the following way. First, when the given object and the different object may separate from each other, and the given object rotates at a lower velocity, movement in the direction to press calculated based on the force in the direction to press, the target pressing force, and the force control gain brings the given object and the different object into contact with each other again or increases the force in the direction to press. As the force in the direction to press acting between the given object and the different object increases, the force about the predetermined axis of rotation also increases, so that the given object rotates again or the given object rotates at a higher velocity.

Since increasing the control gain of the force in the direction to press makes the robot operation unstable and prone to oscillation, the force control gain can be increased only to a certain threshold. For this reason, increasing the force control gain to speed up movement in the direction to press has only a limited effect in shortening the time during which the above-mentioned non-contact state is maintained or preventing a reduction in force in the direction to press.

As described earlier, when the given object is rotated relative to the different object about a predetermined axis of rotation, it is difficult to speed up rotation or keep the velocity of rotation high by increasing the force control gain. It is, in turn, difficult to stably, quickly set the given object and the different object in a state in which these objects are in contact with each other in at least one predetermined direction of translation and in which the forces about at least one predetermined axis of rotation are equilibrated to zero. This means that the target pressing force in the direction to press may be naturally set as large as possible for stable, rapid rotation. When the velocity of rotation is high, rotation makes the given object and the different object may separate from each other, as mentioned earlier. As a result, it may take much time to obtain a combined state, or the orientation may move over a target state, leading to a waste of time in convergence to the target state.

As for the method for combining surfaces with each other in JP H09-091026 A, it is possibly similar to a method for adjusting the moments of force other than that in the direction of insertion in a tool coordinate system to zero at the time of fitting, and no particular details are specified. It is again difficult to use the force acting between the given object and the different object, the target pressing force, and the force control gain to stably, quickly set the given object and the different object in a state in which these objects are in contact with each other in at least one predetermined direction of translation and in which the forces about at least one predetermined axis of rotation are equilibrated to zero, as in the foregoing description of JP H04-043744 B.

SUMMARY OF INVENTION

In view of this, it is an object of the present invention to provide a robot controller which uses a robot to more stably, more rapidly move a given object and a different object relative to each other to set the given object and the different object in a combined state in which a predetermined portion of the given object and a predetermined portion of the different object are in contact and combined with each other.

In order to achieve the above-described object, the present invention provides a robot controller which controls a force acting between a given object located on an end effector of a robot and a different object to move the given object relative to the different object to obtain a state in which a predetermined portion of the given object and a predetermined portion of the different object are in contact and combined with each other. The controller includes a force measuring unit, a translational force control direction setting unit, a translational force control target force setting unit, a rotational force control axis setting unit, a translational force control direction target movement amount calculation unit, a rotational force control axis target rotational movement amount calculation unit, a target direction target movement amount calculation unit, and an operation command generation unit. The force measuring unit measures the force acting between the given object and the different object. The translational force control direction setting unit sets at least one direction of translational force control in which the given object is translated relative to the different object based on the force acting between the given object and the different object. The translational force control target force setting unit sets, for each of the at least one direction of translational force control, a translational force control target force representing a target value for the force acting between the given object and the different object in the direction of translational force control. The a rotational force control axis setting unit sets at least one axis of rotational force control representing an axis of rotation about which the given object is rotated relative to the different object based on the force acting between the given object and the different object, and sets an axis that is not parallel to the direction of translational force control as at least one of the at least one axis of rotational force control. The translational force control direction target movement amount calculation unit calculates a target amount of translational force control direction movement representing a target value for an amount of translational movement of the given object relative to the different object in the direction of translational force control, based on the force acting between the given object and the different object. The rotational force control axis target rotational movement amount calculation unit calculates a target amount of rotational force control axis rotational movement representing a target value for an amount of rotational movement of the given object relative to the different object about the axis of rotational force control, based on the force acting between the given object and the different object. The target direction target movement amount calculation unit calculates a target amount of translational movement representing a target value for an amount of translational movement of the given object, and a target amount of rotational movement representing a target value for an amount of rotational movement of the given object, based on the force acting between the given object and the different object, the direction of translational force control set by the translational force control direction setting unit, the axis of rotational force control set by the rotational force control axis setting unit, the target amount of translational force control direction movement calculated by the translational force control direction target movement amount calculation unit, and the target amount of rotational force control axis rotational movement calculated by the rotational force control axis target rotational movement amount calculation unit. The operation command generation unit generates an operation command for the robot, based on the target amount of translational movement and the target amount of rotational movement calculated by the target direction target movement amount calculation unit. The translational force control direction target movement amount calculation unit calculates the target amount of translational force control direction movement, based on a first predetermined amount of translational force control direction movement, or the first predetermined amount of translational force control direction movement and the translational force control target force in the direction of translational force control, when the force acting between the given object and the different object in the direction of translational force control is smaller than a first predetermined threshold for a force in the direction of translational force control, and calculates the target amount of translational force control direction movement, based on the force acting between the given object and the different object in the direction of translational force control and the translational force control target force in the direction of translational force control, or the force acting between the given object and the different object in the direction of translational force control, the translational force control target force in the direction of translational force control, and a second predetermined amount of translational force control direction movement, when the force acting between the given object and the different object in the direction of translational force control is not less than the first predetermined threshold for the force in the direction of translational force control.

According to a preferred embodiment, the translational force control direction target movement amount calculation unit calculates an amount of correction movement for the target amount of translational force control direction movement, based on the target amount of rotational force control axis rotational movement, to, in turn, calculate the target amount of translational force control direction movement by correction using the amount of correction movement, in accordance with a relationship between an amount of rotational movement about the axis of rotational force control of the given object and an amount of translational movement of a portion where the given object and the different object come into contact with each other upon rotation about the axis of rotational force control of the given object.

According to another preferred embodiment, the robot controller further includes a contact position setting unit which sets a contact position at which the given object and the different object come into contact with each other, or calculates and sets a contact position at which the given object and the different object come into contact with each other based on the force acting between the given object and the different object. The rotational force control axis setting unit sets at least one predetermined axis of rotational force control, and sets as at least one contact position reference axis of rotational force control, at least one axis which passes through the contact position in the given object or the different object and is parallel to the predetermined axis of rotational force control. The rotational force control axis target rotational movement amount calculation unit calculates a target amount of rotational movement about the contact position reference axis of rotational force control to set the calculated target amount of movement as the target amount of rotational force control axis rotational movement, based on a force about the predetermined axis of rotational force control, or a target amount of rotational movement about the axis of rotational force control calculated for the predetermined axis of rotational force control.

According to still another preferred embodiment, the robot controller further includes a contact portion orientation calculation unit which calculates an orientation of a contact portion in the given object, where the state in which the predetermined portion of the given object and the predetermined portion of the different object are in contact and combined with each other is set, an orientation of the contact portion in the different object, or orientations of the contact portion in the given object and the contact portion in the different object. The contact portion orientation calculation unit calculates a plurality of contact positions at which the given object and the different object come into contact with each other based on the force acting between the given object and the different object, to, in turn, calculate an orientation of a portion where the given object and the different object come into contact with each other based on the plurality of calculated contact positions. The rotational force control axis target rotational movement amount calculation unit calculates the target amount of rotational force control axis rotational movement, based on the force acting between the given object and the different object, and the orientation of the portion where the given object and the different object come into contact with each other, calculated by the contact portion orientation calculation unit.

According to still another preferred embodiment, the robot controller further includes a combined state orientation calculation unit which calculates a combined state orientation to set the state in which the predetermined portion of the given object and the predetermined portion of the different object are in contact and combined with each other. When the given object and the different object come into contact with each other, the robot controller stops movement of the given object relative to the different object in the direction of translational force control and obtains an orientation of the given object, and then stops movement of the given object relative to the different object in the direction of translational force control and rotates the given object relative to the different object about the axis of rotational force control to obtain an orientation of the given object when the given object and the different object come into contact with each other. The combined state orientation calculation unit calculates the combined state orientation based on the orientation of the given object obtained when the given object and the different object come into contact with each other. The rotational force control axis target rotational movement amount calculation unit calculates the target amount of rotational force control axis rotational movement, based on the force acting between the given object and the different object, and the combined state orientation calculated by the combined state orientation calculation unit.

According to still another preferred embodiment, in calculating a target amount of movement about the axis of rotational force control that is not parallel to one of the at least one direction of translational force control set by the translational force control direction setting unit, upon defining as a first contact state, a state in which the force acting between the given object and the different object in the direction of translational force control that is not parallel to the axis of rotational force control is smaller than a second predetermined threshold for the force in the direction of translational force control, or the force acting between the given object and the different object about the axis of rotational force control is smaller than a predetermined threshold A for the force about the axis of rotational force control, and upon defining as a second contact state, a state in which the force acting between the given object and the different object in the direction of translational force control that is not parallel to the axis of rotational force control is not less than the second predetermined threshold for the force in the direction of translational force control, and the force acting between the given object and the different object about the axis of rotational force control is not less than the predetermined threshold A for the force about the axis of rotational force control, the rotational force control axis target rotational movement amount calculation unit calculates the target amount of rotational force control axis rotational movement as zero when the first contact state has been set and no shift from the second contact state to the first contact state is made, calculates the target amount of rotational force control axis rotational movement as zero, or calculates the target amount of rotational force control axis rotational movement, based on a direction of movement and an amount of movement about the axis of rotational force control in the second contact state until a shift to the first contact state is made, when a shift from the second contact state to the first contact state is made, and calculates the target amount of rotational force control axis rotational movement when a shift to the second contact state is made, based on a sign of the force about the axis of rotational force control, and at least one of a predetermined amount of rotational movement A, a translational force control target force in the direction of translational force control that is not parallel to the axis of rotational force control, and the force in the direction of translational force control that is not parallel to the axis of rotational force control.

According to still another preferred embodiment, in calculating a target amount of movement about the axis of rotational force control that is not parallel to one of the at least one direction of translational force control set by the translational force control direction setting unit, upon defining as a first contact state, a state in which the force acting between the given object and the different object in the direction of translational force control that is not parallel to the axis of rotational force control is smaller than a second predetermined threshold for the force in the direction of translational force control, or the force acting between the given object and the different object about the axis of rotational force control is smaller than a predetermined threshold A for the force about the axis of rotational force control, and upon defining as a second contact state, a state in which the force acting between the given object and the different object in the direction of translational force control that is not parallel to the axis of rotational force control is not less than the second predetermined threshold for the force in the direction of translational force control, and the force acting between the given object and the different object about the axis of rotational force control is not less than the predetermined threshold A for the force about the axis of rotational force control, the rotational force control axis target rotational movement amount calculation unit calculates the target amount of rotational force control axis rotational movement as zero when the first contact state has been set and no shift from the second contact state to the first contact state is made, calculates the target amount of rotational force control axis rotational movement as zero, or calculates the target amount of rotational force control axis rotational movement, based on a direction of movement and an amount of movement about the axis of rotational force control in the second contact state until a shift to the first contact state is made, when a shift from the second contact state to the first contact state is made, and calculates the target amount of rotational force control axis rotational movement when a shift to the second contact state is made, based on the force about the axis of rotational force control, the force about the axis of rotational force control and a maximum value of the force about the axis of rotational force control under a predetermined condition in controlling the force acting between the given object and the different object, or a predetermined amount of rotational movement B, the force about the axis of rotational force control, and a maximum value of the force about the axis of rotational force control under a predetermined condition in controlling the force acting between the given object and the different object.

According to still another preferred embodiment, the robot controller further includes a combined state determination unit which determines whether the given object and the different object are in a combined state in which the predetermined portion of the given object and the predetermined portion of the different object are in contact and combined with each other, or a nearly combined state close to the combined state. In calculating a target amount of movement about the axis of rotational force control that is not parallel to one of the at least one direction of translational force control set by the translational force control direction setting unit, upon defining as a first contact state, a state in which the force acting between the given object and the different object in the direction of translational force control that is not parallel to the axis of rotational force control is smaller than a second predetermined threshold for the force in the direction of translational force control, or the force acting between the given object and the different object about the axis of rotational force control is smaller than a predetermined threshold A for the force about the axis of rotational force control, and upon defining as a second contact state, a state in which the force acting between the given object and the different object in the direction of translational force control that is not parallel to the axis of rotational force control is not less than the second predetermined threshold for the force in the direction of translational force control, and the force acting between the given object and the different object about the axis of rotational force control is not less than the predetermined threshold A for the force about the axis of rotational force control, the rotational force control axis target rotational movement amount calculation unit calculates the target amount of rotational force control axis rotational movement as zero when the first contact state has been set and no shift from the second contact state to the first contact state is made, and calculates the target amount of rotational force control axis rotational movement as zero, or calculates the target amount of rotational force control axis rotational movement, based on a direction of movement and an amount of movement about the axis of rotational force control in the second contact state until a shift to the first contact state is made, when a shift from the second contact state to the first contact state is made, and upon defining as a contact state 2A, a state in which the second contact state has been set and the combined state determination unit determines that the nearly combined state or the combined state has been set, or a state subsequent to the state in which the second contact state has been set and the combined state determination unit determines that the nearly combined state or the combined state has been set, and upon defining as a contact state 2B, a state included in the second contact state and different from the contact state 2A, when the contact state 2B has been set, the rotational force control axis target rotational movement amount calculation unit calculates the target amount of rotational force control axis rotational movement, based on a sign of the force about the axis of rotational force control, and at least one of a predetermined amount of rotational movement A, a translational force control target force in the direction of translational force control that is not parallel to the axis of rotational force control, and the force in the direction of translational force control that is not parallel to the axis of rotational force control, and when the contact state 2A has been set, the rotational force control axis target rotational movement amount calculation unit calculates the target amount of rotational force control axis rotational movement, based on the force about the axis of rotational force control, the force about the axis of rotational force control and a maximum value of the force about the axis of rotational force control under a predetermined condition in controlling the force acting between the given object and the different object, or a predetermined amount of rotational movement B, the force about the axis of rotational force control, and a maximum value of the force about the axis of rotational force control under a predetermined condition in controlling the force acting between the given object and the different object, or calculates the target amount of rotational force control axis rotational movement by adjustment to a value smaller than the target amount of rotational force control axis rotational movement calculated in the contact state 2B.

According to still another preferred embodiment, when a state in which the force acting between the given object and the different object in the direction of translational force control that is not parallel to the axis of rotational force control is not less than the second predetermined threshold for the force in the direction of translational force control, and the combined state determination unit determines that the combined state has been set continues for not less than a predetermined time, the rotational force control axis target rotational movement amount calculation unit sets the target amount of rotational force control axis rotational movement to zero, or calculates the target amount of rotational force control axis rotational movement by adjustment to a value smaller than the calculated target amount of rotational force control axis rotational movement, and the translational force control direction target movement amount calculation unit sets the target amount of translational force control direction movement to zero, or calculates the target amount of translational force control direction movement by adjustment to a value smaller than the calculated target amount of translational force control direction movement.

According to still another preferred embodiment, the robot controller further generates an operation command for the robot to move the given object relative to the different object by correcting the direction of movement and the amount of movement of the given object relative to the different object, based on movement of a pedestal supporting the robot when a position, an orientation, or a position and an orientation of the pedestal of the robot move, correcting the direction of movement and the amount of movement of the given object relative to the different object, based on movement of the different object when a position, an orientation, or a position and an orientation of the different object move, or correcting the direction of movement and the amount of movement of the given object relative to the different object, based on movement of the pedestal of the robot and movement of the different object when the position, the orientation, or the position and the orientation of the pedestal of the robot and the position, the orientation, or the position and the orientation of the different object move.

According to still another preferred embodiment, the robot controller further includes a force instability detection unit and a moving operation instability detection unit. The force instability detection unit detects instability of the force acting between the given object and the different object by detecting at least one of a state in which a force greater than a predetermined threshold acts between the given object and the different object during a predetermined time, a state in which a force greater than another predetermined threshold acts between the given object and the different object, and an oscillating state of the force acting between the given object and the different object. The moving operation instability detection unit detects instability of a moving operation of the robot by detecting at least one of a state close to a singular orientation of the robot and an oscillating state of the robot. When the instability of the force is detected by the force instability detection unit or the instability of the moving operation of the robot is detected by the moving operation instability detection unit, the robot controller sets the target amount of rotational force control axis rotational movement to zero, or calculates the target amount of rotational force control axis rotational movement by adjustment to a value smaller than the target amount of rotational force control axis rotational movement calculated when neither the instability of the force nor the instability of the moving operation of the robot is detected.

According to still another preferred embodiment, the robot controller further sets a magnitude of the force in the direction of translational force control as a predetermined threshold when the magnitude of the force in the direction of translational force control is larger than the predetermined threshold, and sets a magnitude of the force about the axis of rotational force control as another predetermined threshold when the magnitude of the force about the axis of rotational force control is larger than the other predetermined threshold.

According to still another preferred embodiment, the translational force control direction setting unit sets at least one of the at least one direction of translational force control based on at least one of a predetermined direction for the given object, a predetermined direction for the different object, a predetermined direction independent of a moving operation of the given object, and the axis of rotational force control when the axis of rotational force control has been set. The rotational force control axis setting unit sets at least one of the at least one axis of rotational force control based on at least one of a predetermined direction for the given object, a predetermined direction for the different object, a predetermined direction independent of a moving operation of the given object, and the direction of translational force control when the direction of translational force control has been set.

According to still another preferred embodiment, the translational force control direction setting unit sets the direction of translational force control, based on the force about the axis of rotational force control when the given object and the different object come into contact with each other, and the given object is pressed against the different object in different directions including components of the direction of translational force control with a predetermined range as a limit.

According to still another preferred embodiment, when the axis of rotational force control includes at least two axes of rotational force control, for a predetermined axis of rotational force control of the at least two axes of rotational force control, based on the force acting between the given object and the different object, when the force about the axis of rotational force control is smaller than a predetermined threshold B for the force about the axis of rotational force control, the rotational force control axis target rotational movement amount calculation unit sets a predetermined amount of rotational movement C as the target amount of rotational force control axis rotational movement, and when the force about the axis of rotational force control is not less than the predetermined threshold B for the force about the axis of rotational force control, the rotational force control axis target rotational movement amount calculation unit calculates the target amount of rotational force control axis rotational movement, based on the force about the axis of rotational force control and a predetermined target force about the axis, or a predetermined amount of rotational movement D, the force about the axis of rotational force control, and the predetermined target force about the axis.

BRIEF DESCRIPTION OF THE DRAWINGS

The above and other objects, features, and advantages of the present invention will become more apparent from the following description of preferred embodiments with reference to the accompanying drawings, in which:

FIGS. 14a to 14c are views illustrating an exemplary problem related to setting of a combined state;

FIGS. 16a to 16c are partial enlarged views illustrating an operation for setting a combined state;

FIG. 17 is a flowchart illustrating exemplary processing by the robot controller according to the embodiment of the present invention;

DETAILED DESCRIPTION

Figure 1:
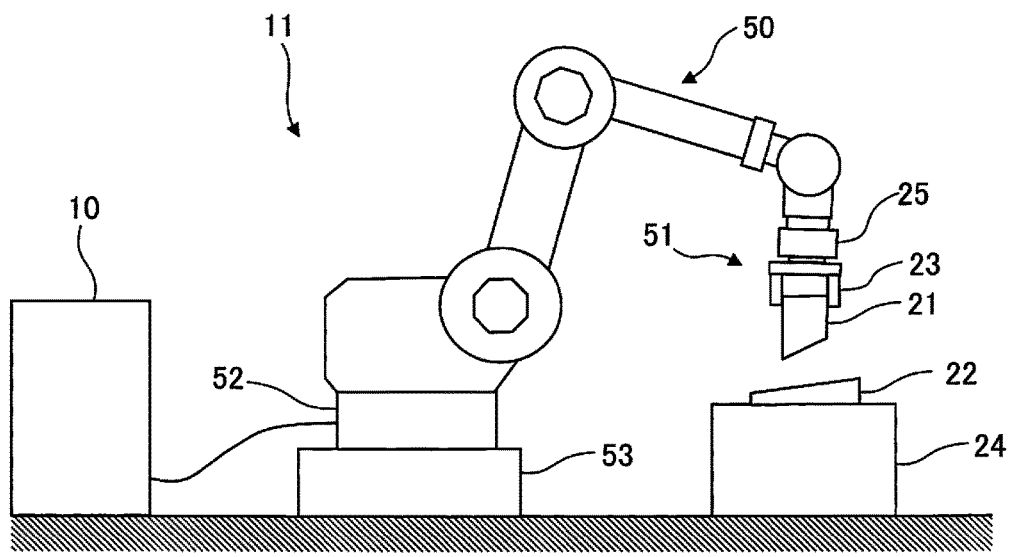
FIG. 1 is a view illustrating the schematic configuration of a robot system including a robot controlled by a robot controller according to an embodiment of the present invention.

Embodiments of the present invention will be described below with reference to the accompanying drawings. In the following drawings, the same reference numerals denote the same members. To foster a better understanding, these drawings use different scales as appropriate.

In the present invention, the "force" includes force translational components and force moment components, unless otherwise noted. The "position and/or orientation" includes at least one of the position and the orientation. The "force control gain" means a coefficient for obtaining the amount of movement of, e.g., the position of each axis of a robot or the position and/or orientation of the distal end portion of the robot in an orthogonal coordinate system, for each control cycle of a robot controller, based on the magnitude of an acting force in force control for moving the robot in accordance with the acting force. The "combined state" means the state in which a predetermined portion of a given object and a predetermined portion of a different object are in contact and combined with each other. The "nearly combined state" means the state in which a predetermined portion of a given object and a predetermined portion of a different object to be set in a combined state have come close to each other and are in a state close to the combined state.

In this embodiment, a coordinate system set for a space can represent the position and/or orientation of the end effector of a robot or a given object held on the end effector of the robot (this state includes the attached state), in an orthogonal coordinate system fixed with respect to a space. A tool coordinate system is set for the end effector of a robot or a given object held on the end effector of the robot. This coordinate system can represent the position and/or orientation of the end effector of a robot or a given object held on the end effector of the robot, in a coordinate system set for a pedestal supporting the robot or a reference coordinate system set for a space. A control point represents the position of the end effector of a robot or a given object held on this end effector. A force control coordinate system is set with a control point as its origin to control the position and/or orientation of a given object held on the end effector of a robot, based on the force acting between the given object and a different object.

An exemplary configuration and action of a robot system which exemplifies a robot controller according to an embodiment of the present invention will be described below with reference to the accompanying drawings. FIG. 1 is a schematic view illustrating an exemplary configuration of a robot system 11 including a robot controller 10 according to the embodiment of the present invention and a robot 50 controlled by the robot controller 10. The robot controller 10 moves the robot 50 by controlling the force acting between a given object 21 held on an end effector 51 of the robot 50 and a different object 22 to move the position and/or orientation of the given object 21 relative to the different object 22 to obtain a combined state in which a predetermined portion of the given object 21 and a predetermined portion of the different object 22 are in contact and combined with each other. In the robot system 11, the end effector 51 of the robot 50 is equipped with a force sensor 25 and a holding unit 23 for holding the given object 21. The holding unit 23 holds the given object 21. The different object 22 is mounted on an installation device 24 for a different object. A robot pedestal 52 supporting the robot 50 is mounted on a robot installation device 53.

A combined state of the given object 21 and the different object 22, obtained by moving the given object 21 held on the end effector 51 of the robot 50 relative to the different object 22 to set the given object 21 and the different object 22 in a combined state in which a predetermined portion of the given object 21 and a predetermined portion of the different object 22 are in contact and combined with each other, will be described below with reference to FIGS. 9a to 12e.

Figure 9A:
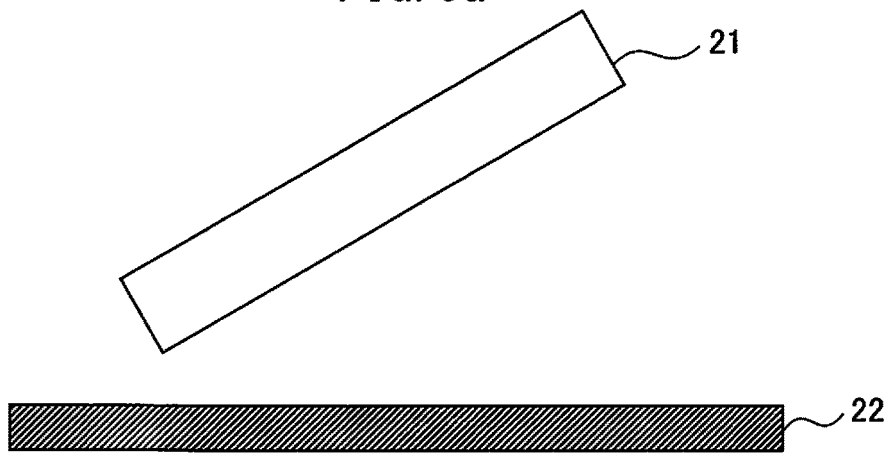
FIGS. 9a to 9d are views illustrating an exemplary combined state.
Figure 9B:
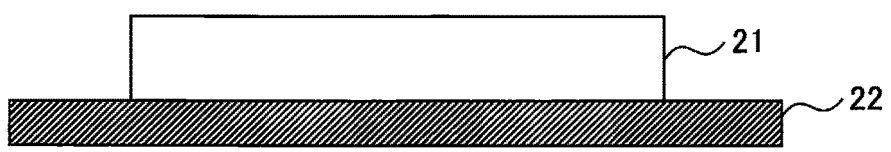
Figure 9C:
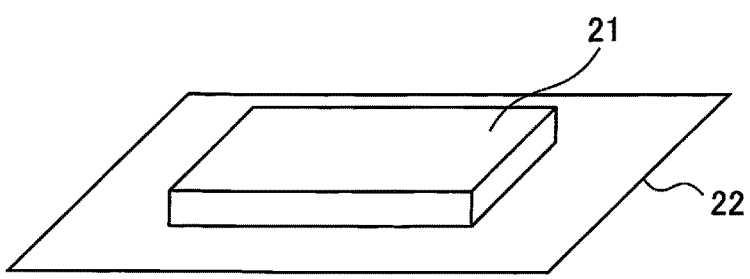
Figure 9D:
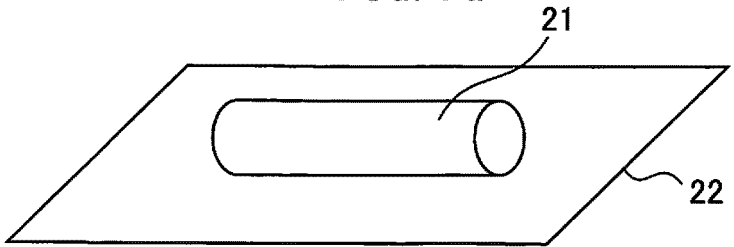

FIGS. 9a to 9d are views for explaining an exemplary combined state upon setting of the given object 21 and the different object 22 in a combined state. The given object 21 forms a rectangular parallelepiped depicted as FIG. 9c or a cylinder depicted as FIG. 9d, while the different object 22 includes a planar portion. FIGS. 9a and 9b are sectional views illustrating the given object 21 and the different object 22 to be set in a combined state. For the sake of simplicity, only one direction of rotation is assumed. The given object 21 and the different object 22 are brought into contact with each other by relative translation and rotation and moved to combine a predetermined portion of the given object 21 and a predetermined portion of the different object 22 with each other, as illustrated as FIG. 9a. The state in which a predetermined surface of the given object 21 and a predetermined surface of the different object 22 are brought into contact and combined with each other by moving the given object 21 and the different object 22 relative to each other, as illustrated as FIGS. 9b and 9c, is assumed as a combined state. The state in which a linear portion forming the given object 21 is in contact and combined with a planar portion forming the different object 22 may be assumed as a combined state. When the given object 21 forms a cylinder, the state in which a predetermined linear portion of a cylindrical body forming the given object 21 and a planar portion forming the different object 22 are brought into contact and combined with each other by moving the given object 21 and the different object 22 relative to each other is assumed as a combined state, as illustrated as FIGS. 9b and 9d.

Figure 10A:
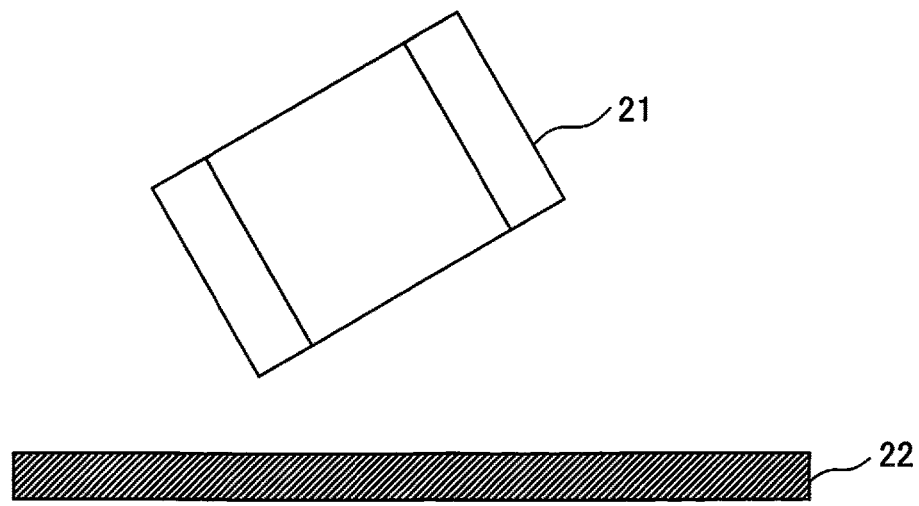
FIGS. 10a to 10c are views illustrating another exemplary combined state.
Figure 10B:
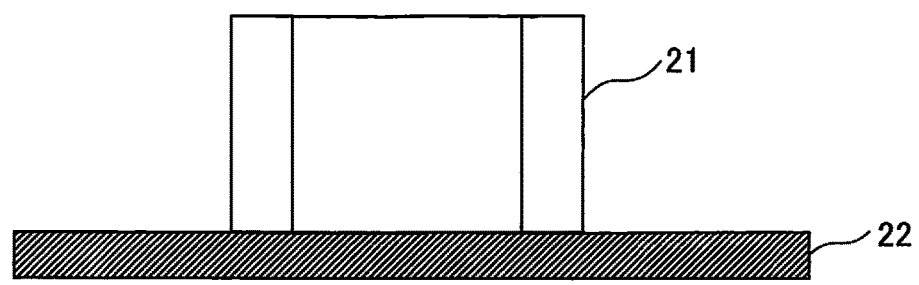
Figure 10C:
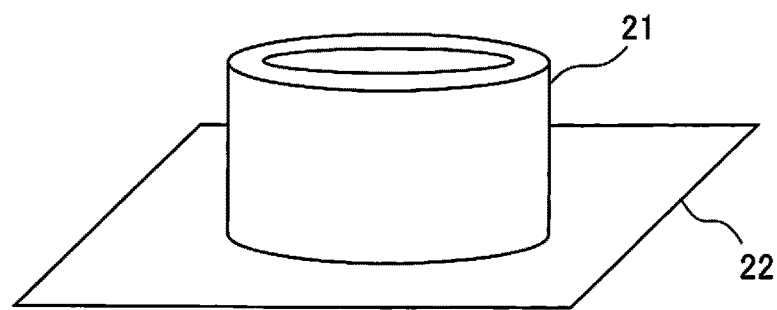

FIGS. 10a to 10c are views for explaining another exemplary combined state upon setting of the given object 21 and the different object 22 in a combined state. The given object 21 depicted as FIGS. 10a to 10c forms a cylinder, while the different object 22 includes a planar portion. FIGS. 10a and 10b are sectional views illustrating the given object 21 and the different object 22 to be set in a combined state. For the sake of simplicity, only one direction of rotation is assumed. The given object 21 and the different object 22 are brought into contact with each other by relative translation and rotation and moved to combine a predetermined portion of the given object 21 and a predetermined portion of the different object 22 with each other, as illustrated as FIG. 10a. Upon defining the bottom surface of the given object 21 as the predetermined portion of the given object 21, when movement is performed to bring the bottom surface of the cylindrical given object 21 and the planar portion of the different object 22 into contact with each other to combine their surface portions with each other, the state in which a predetermined surface of the given object 21 and a predetermined surface of the different object 22 are in contact and combined with each other is assumed as a combined state, as illustrated as FIGS. 10b and 10c. In this manner, the predetermined portion to be set in a combined state may form a surface including a hole formed in its planar portion, such as the bottom surface of a cylinder, or a surface forming a continuous object in a plane or a surface forming discontinuous objects in a plane.

Figure 11A:
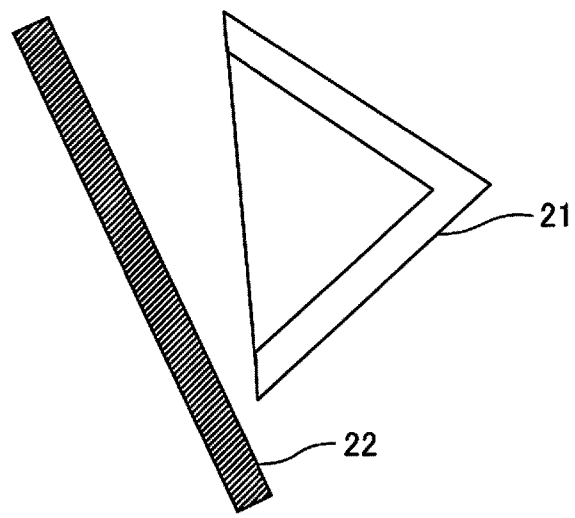
FIGS. 11a to 11c are views illustrating still another exemplary combined state.
Figure 11B:
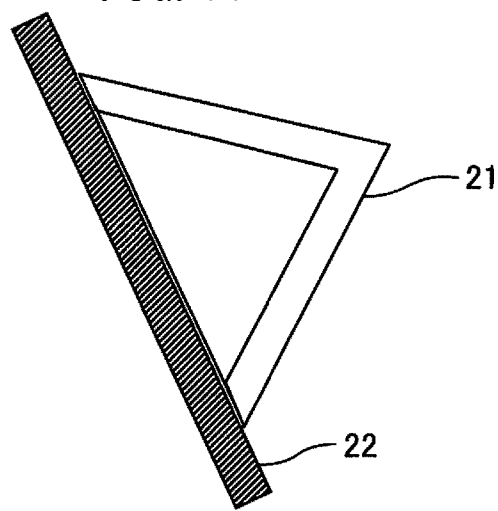
Figure 11C:
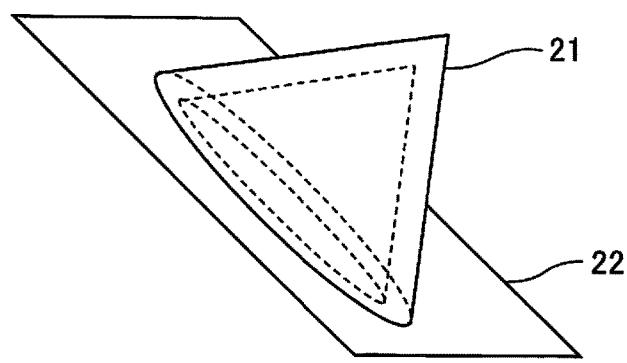

FIGS. 11a to 11c are views for explaining still another exemplary combined state upon setting of the given object 21 and the different object 22 in a combined state. The given object 21 depicted as FIGS. 11a to 11c includes a conical cavity formed in its conical body, while the different object 22 includes a planar portion. The different object 22 is positioned as tilted, as depicted as FIGS. 11a to 11c. FIGS. 11a and 11b are sectional views illustrating the given object 21 and the different object 22 to be set in a combined state. For the sake of simplicity, only one direction of rotation is assumed. The given object 21 and the different object 22 are brought into contact with each other by relative translation and rotation and moved to combine a predetermined portion of the given object 21 and a predetermined portion of the different object 22 with each other, as illustrated as FIG. 11a. Upon defining the bottom surface of the given object 21 as the predetermined portion of the given object 21, when movement is performed to bring the bottom surface of the above-mentioned given object 21 and the planar portion of the different object 22 into contact with each other to combine their surface portions with each other, the state in which a predetermined surface of the given object 21 and a predetermined surface of the different object 22 are in contact and combined with each other is assumed as a combined state, as illustrated as FIGS. 11b and 11c. In this manner, the given object 21 may form a complex body including a planar portion.

Figure 12A:
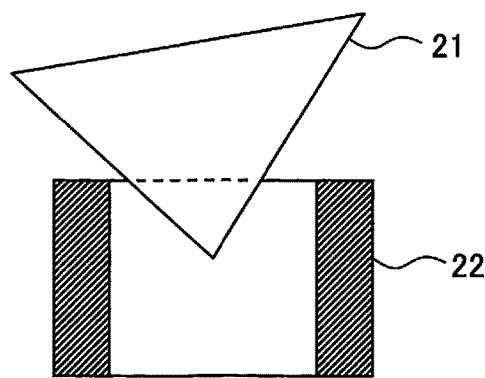
FIGS. 12a to 12e are views illustrating still another exemplary combined state.
Figure 12B:
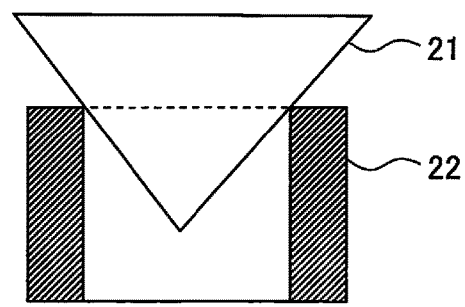
Figure 12C:
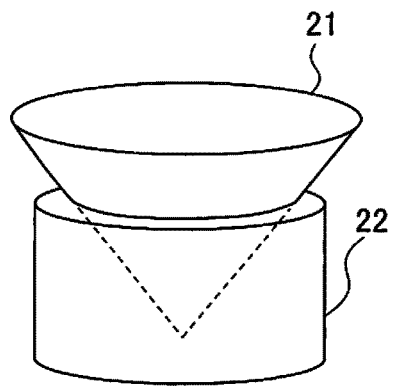

FIGS. 12a to 12e are views for explaining still another exemplary combined state upon setting of the given object 21 and the different object 22 in a combined state. The given object 21 depicted as FIGS. 12a, 12b, and 12c forms a cone, while the different object 22 forms a cylinder, as depicted as FIG. 12c. FIGS. 12a and 12b are sectional views illustrating the given object 21 and the different object 22 to be set in a combined state. For the sake of simplicity, only one direction of rotation is assumed. The given object 21 and the different object 22 are brought into contact with each other by relative translation and rotation and moved to combine a predetermined portion of the given object 21 and a predetermined portion of the different object 22 with each other, as illustrated as FIG. 12a. Note that the side surface portion of a cone forming the conical given object 21 and the upper surface portion of a cylinder forming the cylindrical different object 22 are defined as the predetermined portion of the given object 21 and the predetermined portion of the different object 22 to be set in a combined state. In this case, the state in which the side surface portion of a cone forming the conical given object 21 and the upper surface portion of a cylinder forming the cylindrical different object 22 are in contact and combined with each other is assumed as a combined state, as illustrated as FIGS. 12b and 12c. In this manner, the state in which portions where the given object 21 and the different object 22 are in contact and combined with each other are present in the same plane may be assumed as a combined state. Alternatively, the state in which portions where the given object 21 and the different object 22 are in contact and combined with each other are present on a predetermined curved surface conforming to the shape of the given object 21 or the different object 22 may be assumed as a combined state.

Fitting may preferably involve a clearance having a predetermined size or more in fitting two objects having complementary shapes together or firmly fitting shafts together in recesses, fitting a given object and a different object together as insertion progresses, or fitting two objects shifted in orientation together by force control. Therefore, fitting is different from setting a combined state as mentioned earlier. Fitting is also different from setting a combined state as mentioned earlier, in, e.g., the following respect: in setting such a combined state, the relative position and orientation between the given object 21 and the different object 22 can be changed to combine only predetermined portions of the given object 21 and the different object 22 with each other in a desired contact state, and object jamming and stoppage or other phenomena, as in fitting, do not occur.

For a change to such a combined state based on the force acting between the given object 21 and the different object 22, the conical given object 21 and the cylindrical different object 22 are brought into contact with each other, and an axis of rotation parallel to a predetermined direction independent of the moving operation of the given object 21 or a predetermined direction for the different object 22 is set at the apex of the conical portion of the conical given object 21 or a point on the axis of the conical given object 21 to control the force acting between these two objects to equilibrate the forces about the axis of rotation. Alternatively, the conical given object 21 and the cylindrical different object 22 are brought into contact with each other, and an axis of rotation parallel to a predetermined direction independent of the moving operation of the given object 21 or a predetermined direction for the different object 22 is set at the center point of the upper surface portion of a cylinder forming the cylindrical different object 22 to control the force acting between these two objects to equilibrate the forces about the axis of rotation.

Figure 12D:
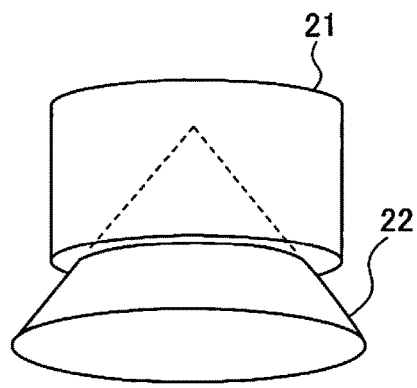

The given object 21 may form a cylinder, while the different object 22 forms a cone, as depicted as FIG. 12d. With the same method as described earlier, a combined state in which the bottom surface of the cylindrical given object 21 and the side surface of the conical different object 22 are combined with each other, as depicted as FIG. 12d, can be obtained by moving the cylindrical given object 21 and the conical different object 22 relative to each other.

Figure 12E:
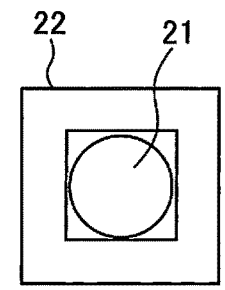

The cylindrical object referred to in the foregoing description may be replaced with an object having a cross-section hollowed out in a quadrangular shape, such as an object including a rectangular parallelepiped cavity, so that a rectangular parallelepiped having a cross-section hollowed out in a quadrangular shape is used as the different object 22, while a conical object is used as the given object 21. Conversely, a rectangular parallelepiped having a cross-section hollowed out in a quadrangular shape may be used as the given object 21, while a conical object is used as the different object 22. Moving such a given object 21 and a different object 22 relative to each other causes a change from the state illustrated as FIG. 12a, as viewed in a lateral sectional view, to bring the given object 21 and the different object 22 into contact with each other and combine their predetermined portions with each other, a lateral sectional view illustrated as FIG. 12b is obtained, and a sectional view in a plane including portions where the given object 21 and the different object 22 are in contact with each other, illustrated as FIG. 12e, is obtained. This state may be assumed as a combined state.

As described above, as long as the given object 21 and the different object 22 can be set in the state in which a predetermined portion of the given object 21 and a predetermined portion of the different object 22 are in contact and combined with each other, the given object 21 and the different object 22 may be formed by combining objects having any shapes. Each of the given object 21 and the different object 22 may include objects having a plurality of shapes.

The robot controller 10 is configured to control the position of each axis of the robot 50 for each predetermined control cycle. The robot controller 10 has a hardware configuration including, e.g., an arithmetic processing unit, a ROM, and a RAM and executes various functions (to be described later).

The robot 50 according to this embodiment is implemented using a vertical multi-articulated robot which uses six axes. However, the robot 50 may be other known types of robots as long as it has a plurality of axes controlled by the robot controller 10 and is capable of movement preferably performed in operation. The robot installation device 53 includes a mechanism unit capable of moving the position and/or orientation. Possible examples of the robot installation device 53 may include a jig capable of rotation or translation, a traveling shaft, a mobile robot such as an AGV (Automated Guided Vehicle) capable of movement on the floor, and another multi-articulated robot capable of moving the position and/or orientation within a three-dimensional space. The robot pedestal 52 according to this embodiment is mounted on the robot installation device 53, but may be set on a flat floor, a slanted base, a device including a mechanism unit capable of moving the position and/or orientation, or a traveling shaft. In this embodiment, for the sake of simplicity, the robot installation device 53 is at rest, unless otherwise specified. Assume herein that the robot 50 is mounted on a device including a movable mechanism unit. Then, when the given object 21 is moved relative to the different object 22, the position and/or orientation of the given object 21 relative to the different object 22 may be corrected and calculated based on the direction and amount of movement of the given object 21 by the device including the movable mechanism unit, and the given object 21 may be moved relative to the different object 22 based on the calculated direction and amount of movement.

Examples of the given object 21 may include a workpiece, a tool, an apparatus, a processing or machining device, an inspection device, a measuring device, a jig, and an adaptor. Examples of the different object 22 may include a workpiece, a tool, an apparatus, a processing or machining device, an inspection device, a measuring device, a jig, an adaptor, a worktable, a transport table for a conveyor, a workpiece placed on a transport table for a conveyor, a workpiece placed in a device including a mechanism unit capable of moving the position and/or orientation, and a hand, a workpiece, or an adaptor mounted on the end effector of another robot. The given object 21 may be brought into contact with the different object 22 mounted on a worktable, or the given object 21 may be brought into contact with, e.g., a worktable or an apparatus. Various combinations of a given object 21 and a different object 22 are available for the objects as mentioned earlier. The given object 21 may be preferably placed in the portion of the end effector 51 of the robot 50. In this embodiment, the given object 21 is held by the holding unit 23, but may be held as attached to the force sensor 25 or as mounted on the end effector 51 of the robot 50. In this embodiment, the different object 22 is mounted on the installation device 24 for a different object that includes a movable mechanism unit. Possible examples of the installation device 24 for a different object may include an apparatus, a conveyor, a jig capable of rotation or translation, a mobile robot such as an AGV (Automated Guided Vehicle) capable of movement on the floor, and another multi-articulated robot capable of moving the position and/or orientation within a three-dimensional space, each of which includes a mechanism unit capable of moving the position and/or orientation. The installation device 24 for a different object may serve as, e.g., a worktable including no movable mechanism unit. In this embodiment, for the sake of simplicity, the installation device 24 for a different object is at rest, unless otherwise specified. Assume herein that the installation device 24 for a different object includes a movable mechanism unit. Then, when the given object 21 is moved relative to the different object 22, the position and/or orientation of the given object 21 relative to the different object 22 may be corrected and calculated based on the direction and amount of movement of the different object 22 by the installation device 24 for a different object, and the given object 21 may be moved relative to the different object 22 based on the calculated direction and amount of movement.

The force sensor 25 serves as a detector which detects a force acting between the given object 21 and the different object 22. The robot controller 10 uses a force measuring unit 31 (to be described later) to measure a force acting between the given object 21 and the different object 22, based on the output from the force sensor 25 detected for each predetermined time. Although a six-axis force sensor is used as the force sensor 25 in this embodiment, a force sensor having degrees of freedom preferably set for operation may be preferably used as the force sensor 25. The force sensor 25 may be attached to an arbitrary portion, such as the end effector or joint portion of the robot 50, the mount portion of the robot 50, or the mount portion of the different object 22, as long as it can detect a force acting between the given object 21 and the different object 22. Further, a plurality of sensors, including a force sensor, may be located in different portions, as mentioned earlier, and used in combination. The sensors detect pieces of information preferably obtained to detect and estimate a force acting between the given object 21 and the different object 22 and vary in, e.g., direction to detect a force (e.g., the direction of translation, the direction of rotation, or the direction of rotation about a joint axis), force detection accuracy, force detection resolution, or force detection purpose. Although the force measuring unit 31 measures a force acting between the given object 21 and the different object 22 based on the output from the force sensor 25 in this embodiment, a force acting between the given object 21 and the different object 22 may be measured by detecting other types of physical information, instead of using the force sensor 25.

Figure 2:
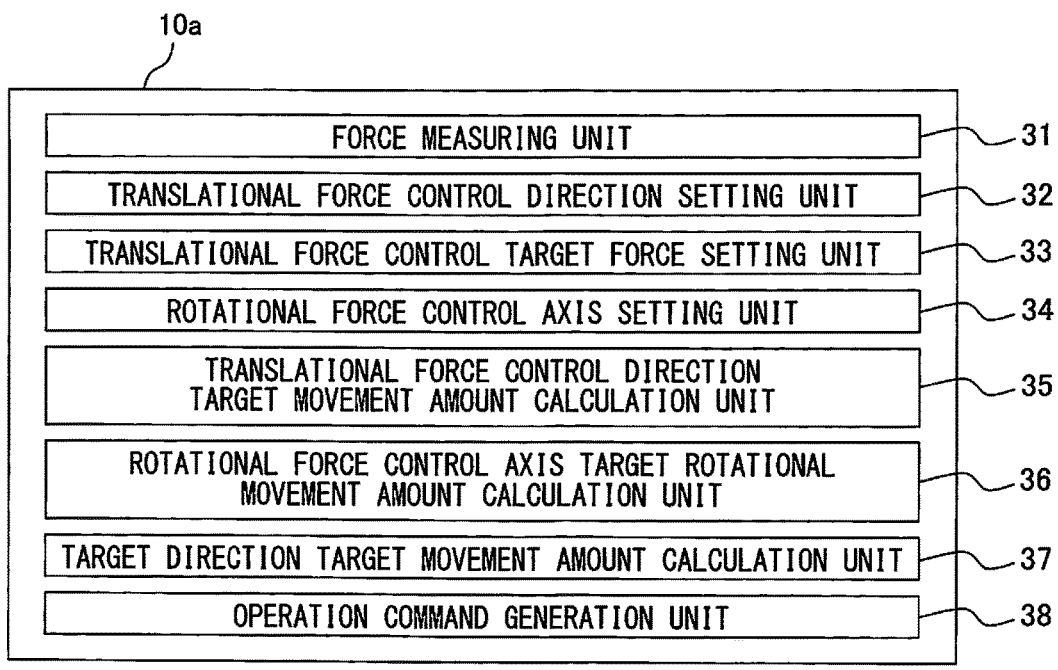
FIG. 2 is a block diagram functionally illustrating the configuration of a robot controller according to an embodiment of the present invention.

FIG. 2 is a block diagram functionally illustrating the configuration of a robot controller 10a according to a first embodiment of the present invention. The robot controller 10a includes a force measuring unit 31, a translational force control direction setting unit 32, a translational force control target force setting unit 33, a rotational force control axis setting unit 34, a translational force control direction target movement amount calculation unit 35, a rotational force control axis target rotational movement amount calculation unit 36, a target direction target movement amount calculation unit 37, and an operation command generation unit 38, as illustrated as FIG. 2. The robot controller 10 further includes a storage unit and a signal output unit which outputs various signals, although not illustrated.

The force measuring unit 31 measures a force acting between the given object 21 held on the end effector 51 of the robot 50 and the different object 22. In doing this, a force translational component F and a force moment component M in a force control coordinate system having as its origin a control point set for the given object 21, the end effector 51 of the robot 50, and the robot 50 are calculated and measured based on the force data detected by the force sensor 25. A force acting between the given object 21 and the different object 22 is calculated and measured for a direction of translational force control set by the translational force control direction setting unit 32 (to be described later), based on the force in the force control coordinate system. Further, for an axis of rotational force control set by the rotational force control axis setting unit 34 (to be described later), a force acting between the given object 21 and the different object 22 about the axis of rotational force control is calculated and measured.

Assume herein that a motor is used as an actuator which moves shafts constituting the robot 50, instead of using the force sensor 25 mounted on the end effector 51 of the robot 50, to measure a force acting between the given object 21 and the different object 22. Then, the force measuring unit 31 may estimate, calculate, and measure a force acting between the given object 21 and the different object 22, based on, e.g., the current value, the deviations between actual shaft positions and command positions for the shafts constituting the robot 50, or the output from a torque sensor mounted on each shaft.

In measuring a force acting between the given object 21 and the different object 22, the force measuring unit 31 uses a known method, such as a technique disclosed in Japanese Patent No. 4267027, to calculate the influence that an object such as a tool or a workpiece attached to the force sensor 25 exerts on the force detected by the force sensor 25 by, e.g., gravity or the force of inertia (including the Coriolis force and the gyro effect), and compensates for the calculated influence as appropriate. Thus, the force measuring unit 31 can measure a net force acting between the given object 21 and the different object 22. Alternatively, the force measuring unit 31 may compensate the force, based on the force obtained when the given object 21 and the different object 22 are set in a non-contact state such as at the start of the force control or during the force control, and then calculate and measure a force acting between the given object 21 and the different object 22.

The translational force control direction setting unit 32 sets at least one direction of translational force control, in which the given object 21 is translated relative to the different object 22 based on the force acting between the given object 21 and the different object 22. The direction of translational force control means the direction in which the given object 21 is translated relative to the different object 22 based on the force acting between the given object 21 and the different object 22. In this direction, the given object 21 is brought close to and into contact with the different object 22 or the translational force is controlled to reach a target force. The translational force control direction setting unit 32 preferably sets a direction of translational force control, in which the force acting between the given object 21 and the different object 22 is controlled to allow the given object 21 and the different object 22 to appropriately come into contact with each other.

A direction of translational force control may be set not to press the given object 21 against the different object 22 in a certain direction to generate a force about the axis of rotational force control and perform rotation about the axis of rotational force control, but to passively move the given object 21 relative to the different object 22 while keeping them in contact by controlling the force acting between the given object 21 and the different object 22 in a certain direction of translational force control. In this case, however, a direction of translational force control is set to press the given object 21 against the different object 22 in another direction of translational force control to generate a force about the axis of rotational force control and perform rotation about the axis of rotational force control.

The translational force control direction setting unit 32 sets a direction of translational force control in the following way.

(1) A direction parallel to the direction of any axis of a predetermined tool coordinate system for the given object 21 is set as a direction of translational force control. Alternatively, a direction parallel to a predetermined direction in a tool coordinate system is set as a direction of translational force control. In this case, the direction of translational force control depends on the orientation of the given object 21 and can be set to a direction according to movement of the given object 21.

(2) A direction parallel to the direction of any axis of a predetermined coordinate system for the different object 22 is set as a direction of translational force control. Alternatively, a direction parallel to a predetermined direction in a predetermined coordinate system for the different object 22 is set as a direction of translational force control. Alternatively again, a coordinate system which is parallel to a predetermined coordinate system for the different object 22 and has a control point as its origin is set as a force control coordinate system, and the direction of any axis of the force control coordinate system or a predetermined direction in the force control coordinate system is set as a direction of translational force control. In this case, the direction of translational force control depends on the orientation of the different object 22 and can be set to a direction according to movement of the different object 22 when the orientation of the different object 22 varies.

(3) A direction parallel to any axis of a reference coordinate system or any axis of a coordinate system set for a space, in which the position and/or orientation stays the same even upon the moving operation of the given object 21, is set as a direction of translational force control. Alternatively, a direction parallel to a predetermined direction in a reference coordinate system or a coordinate system set for a space, in which the position and/or orientation stays the same even upon the moving operation of the given object 21, is set as a direction of translational force control. Alternatively again, a coordinate system which is parallel to a reference coordinate system or a coordinate system set for a space, in which the position and/or orientation stays the same even upon the moving operation of the given object 21, and has a control point as its origin is set as a force control coordinate system, and the direction of any axis of the force control coordinate system or a predetermined direction in the force control coordinate system is set as a direction of translational force control. In this case, the given object 21 can be moved in a predetermined direction of translational force control, independently of the orientation of the given object 21.

(4) When an axis of rotational force control (to be described later) is set by the rotational force control axis setting unit 34 (to be described later), a direction parallel to a direction perpendicular to the axis of rotational force control or parallel to a direction making a predetermined angle with the axis of rotational force control is set as a direction of translational force control, based on the direction of the axis of rotational force control. When two axes of rotational force control are set, a direction parallel to a direction perpendicular to the two axes of rotational force control may be set as a direction of translational force control. In this case, a direction of translational force control can be set in accordance with the directions of the axes of rotational force control.

For each setting method described above in (1) through (4), two or more directions of translational force control may be set. In addition, based on the direction determined by each setting method, a direction of translational force control may be selectively set in accordance with the level of priority of each setting method, a direction selected to be switchable in accordance with the state of the moving operation or contact of the given object 21 or the different object 22 may be set as a direction of translational force control, the direction of the weighted sum of vectors pointing in directions selected from those determined by each setting method may be set as a direction of translational force control, or, when two or more directions of translational force control are set, they may be set based on directions selected from those determined by each of the above-mentioned setting methods for each direction of translational force control.

In moving the position and/or orientation of the different object 22, the translational force control direction setting unit 32 may correct the direction and amount of movement of the different object 22 and set a direction of translational force control. When the robot pedestal 52 is located on a mechanism unit capable of moving the position and/or orientation, the direction of translational force control of the given object 21 relative to the different object 22 may be corrected to a desired direction, based on the direction and amount of movement of the above-mentioned mechanism unit.

The translational force control target force setting unit 33 sets a translational force control target force representing a target value for the force acting between the given object 21 and the different object 22 in the direction of translational force control set by the translational force control direction setting unit 32. When two or more directions of translational force control are set by the translational force control direction setting unit 32, the translational force control target force setting unit 33 sets a translational force control target force for each direction of translational force control. The translational force control target forces may take equal values for all directions of translational force control.

When a direction of translational force control is set not to press the given object 21 against the different object 22 in a certain direction to generate a force about the axis of rotational force control and perform rotation about the axis of rotational force control, but to passively move the given object 21 relative to the different object 22 while keeping them in contact by controlling the force acting between the given object 21 and the different object 22 in a certain direction of translational force control, zero translational force control target force may be set for the certain direction of translational force control.

The translational force control target force setting unit 33 may change the translational force control target force in accordance with the conditions of the moving operation of the given object 21 or the different object 22. The translational force control target force setting unit 33 may increase the translational force control target force using a predetermined value as its upper limit when the force about the axis of rotational force control (to be described later) is too small to rotate the given object 21 (e.g., when the force acting between the given object 21 and the different object 22 about the axis of rotational force control (to be described later) has been smaller than a predetermined threshold for a predetermined time or more, when the force acting between the given object 21 and the different object 22 about the axis of rotational force control (to be described later) during movement of the given object 21 falls below a predetermined threshold a predetermined number of times for a predetermined time or more per another predetermined time, or when the force acting between the given object 21 and the different object 22 in the direction of translational force control is equal to or greater than a predetermined threshold and the force acting between the given object 21 and the different object 22 about the axis of rotational force control (to be described later) is smaller than a predetermined threshold). This makes it possible to increase the force in the direction of translational force control only where appropriate.

The rotational force control axis setting unit 34 sets at least one axis of rotational force control representing an axis of rotation about which the given object 21 is rotated relative to the different object 22 based on the force acting between the given object 21 and the different object 22. An axis that is not parallel to the direction of translational force control is set as at least one of such axes of rotational force control. An axis of rotation about which the given object 21 is rotated relative to the different object 22 based on the force acting between the given object 21 and the different object 22 is assumed as an axis of rotational force control. Setting an axis that is not parallel to the direction of translational force control as at least one of such axes of rotational force control makes it possible to generate, upon pressing in the direction of translational force control, a force acting between the given object 21 and the different object 22 about an axis of rotational force control that is not parallel to the direction of translational force control, and perform rotation based on the force about the axis of rotational force control. Setting an appropriate axis of rotational force control and performing movement based on the force about the axis of rotational force control make it possible to obtain a state in which a predetermined portion of the given object 21 and a predetermined portion of the different object 22 are in contact and combined with each other. An axis of rotation which can set a combined state in which linear portions, curved portions, planar portions, or curved surface portions of the given object 21 and the different object 22 are in contact and combined with each other, and allows movement to bring the given object 21 and the different object 22 into contact with each other is further assumed as an axis of rotational force control.

The rotational force control axis setting unit 34 sets an axis of rotational force control in the following way. A point set in a predetermined tool coordinate system for the given object 21, a point set in a predetermined coordinate system for the different object 22, or a point set in a reference coordinate system or a coordinate system set for a space in which the position and/or orientation stays the same even upon the moving operation of the given object 21 is assumed as predetermined points to be referred to hereinafter in (1) through (4).

When an axis of rotational force control is set to pass through a control point set for the given object 21 or a point set in a predetermined tool coordinate system for the given object 21, the direction of rotation of the given object 21 can be changed in accordance with movement of the given object 21 because the axis of rotational force control depends on the position and orientation of the given object 21.

When an axis of rotational force control is set to pass through a point set in a predetermined coordinate system for the different object 22, the given object 21 can be rotated relative to the different object 22. Therefore, when the different object 22 moves, the direction of rotation of the given object 21 can be changed in accordance with movement of the different object 22.

When an axis of rotational force control is set to pass through a point set in a reference coordinate system or a coordinate system set for a space in which the position and/or orientation stays the same even upon the moving operation of the given object 21, the given object 21 can be rotated with reference to the point set in the reference coordinate system or the coordinate system set for the space.

When the different object 22 remains at the same position and/or orientation and no coordinate system is set for the different object 22, the given object 21 may be moved with reference to a point set in a reference coordinate system or a coordinate system set for a space.

An axis which passes through a center point used to obtain a state in which a predetermined portion of the given object 21 and a predetermined portion of the different object 22 are in contact and combined with each other, an axis which passes through a point located in the direction of translational force control from the center point, or the like may be set as an axis of rotational force control. Even when the axis of rotational force control does not pass through, and is spaced apart from such a point, it can be determined that a combined state has been set by adjusting a predetermined threshold according to which it is determined that a combined state has been set based on whether the force about the axis of rotational force control is equal to or smaller than the predetermined threshold. When the translational force control target force in the direction of translational force control is large, the predetermined threshold may be large.

However, when the translational force control target force in the direction of translational force control is small, it is difficult to determine that a combined state has been set when the predetermined threshold is large.

(1) Any axis of a predetermined tool coordinate system for the given object 21 is set as an axis of rotational force control. Alternatively, an axis which passes through a control point and is parallel to a predetermined direction in a tool coordinate system is set as an axis of rotational force control. Alternatively again, an axis which passes through a predetermined point and is parallel to any axis of a tool coordinate system or parallel to a predetermined direction in the tool coordinate system is set as an axis of rotational force control. In this case, an axis of rotation according to movement of the given object 21 can be set as an axis of rotational force control.

(2) Any axis of a predetermined coordinate system for the different object 22 is set as an axis of rotational force control. Alternatively, an axis which runs in a predetermined direction and passes through a predetermined point in a predetermined coordinate system for the different object 22 is set as an axis of rotational force control. Alternatively again, an axis which is parallel to any axis in a predetermined coordinate system for the different object 22 and passes through a control point or a predetermined point is set as an axis of rotational force control. Alternatively again, an axis which is parallel to a predetermined direction in a predetermined coordinate system for the different object 22 and passes through a control point or a predetermined point is set as an axis of rotational force control. Alternatively again, a coordinate system which is parallel to a predetermined coordinate system for the different object 22 and has a control point as its origin is set as a force control coordinate system, and any axis of the force control coordinate system or an axis in a predetermined direction in the force control coordinate system is set as an axis of rotational force control. In this case, when the different object 22 varies in position and/or orientation, an axis of rotation according to movement of the different object 22 can be set as an axis of rotational force control.

(3) An axis which is parallel to any axis of a reference coordinate system or any axis of a coordinate system set for a space, in which the position and/or orientation stays the same even upon the moving operation of the given object 21, and passes through a control point or a predetermined point is set as an axis of rotational force control. Alternatively, an axis which is parallel to a predetermined direction in a reference coordinate system or a coordinate system set for a space, in which the position and/or orientation stays the same even upon the moving operation of the given object 21, and passes through a control point or a predetermined point is set as an axis of rotational force control. Alternatively again, a coordinate system which is parallel to a reference coordinate system or a coordinate system set for a space, in which the position and/or orientation stays the same even upon the moving operation of the given object 21, and has a control point as its origin is set as a force control coordinate system, and any axis of the force control coordinate system or an axis in a predetermined direction in the force control coordinate system is set as an axis of rotational force control. In this case, the given object 21 can be rotated about a predetermined axis of rotation, independently of the orientation of the given object 21.

(4) When a direction of translational force control is set by the translational force control direction setting unit 32, an axis which is parallel to a direction perpendicular to the direction of translational force control and passes through a control point or a predetermined point is set as an axis of rotational force control, based on the direction of translational force control. Alternatively, an axis which is parallel to a direction making a predetermined angle with the direction of translational force control and passes through a control point or a predetermined point is set as an axis of rotational force control, based on the direction of translational force control. Alternatively again, two axes which are perpendicular to the direction of translational force control and orthogonal to each other, and pass through a control point or a predetermined point may be set as axes of rotational force control. When two or more directions of translational force control are set, an axis of rotational force control may be set based on any predetermined direction of translational force control. An axis of rotational force control may be set by selecting a suitable one from the axes determined by the setting methods described above in (1), (2), and (3), in accordance with the direction of translational force control. Assume, for example, that a predetermined direction for the given object 21 is set as a direction of translational force control. Then, of any axes of a predetermined coordinate system for the different object 22 or a coordinate system independent of the moving operation of the given object 21, two axes forming a plane which makes a nearly right angle with the direction of translational force control at the start of a moving operation for setting a combined state may be set as axes of rotational force control. In this manner, an axis of rotational force control can be set in accordance with the direction of translational force control.

Two or more axes of rotation may be set as axes of rotational force control, using each setting method described earlier in (1) through (4).

For the axis determined by each setting method described earlier in (1) through (4), an axis determined by selecting a setting method in accordance with the level of priority of each setting method according to the circumstances involved may be set as an axis of rotational force control, an axis determined by a method selected to be switchable in accordance with the state of the moving operation or contact of the given object 21 or the different object 22 may be set as an axis of rotational force control, an axis along the direction of the weighted sum of vectors pointing in vector directions along axes selected from those determined by each setting method may be set as an axis of rotational force control, or, when two or more axes of rotational force control are set, they may be set based on axes of rotation selected from those determined by each setting method for each axis of rotational force control.

When the different object 22 varies in position and/or orientation, the rotational force control axis setting unit 34 may correct the position and/or orientation of the axis of rotation, based on the direction and amount of movement of the different object 22. When the robot pedestal 52 is located on a mechanism unit capable of moving the position and/or orientation, the position and/or orientation of the axis of rotational force control may be corrected so that the direction of rotation about the axis of rotational force control of the given object 21 relative to the different object 22 reaches a desired direction, based on the direction and amount of movement of the movable mechanism unit.

The translational force control direction target movement amount calculation unit 35 calculates a target amount of translational force control direction movement by which the given object 21 is translated relative to the different object 22 in the direction of translational force control, based on the force acting between the given object 21 and the different object 22. The target amount of translational force control direction movement is represented as a vector and used to determine the direction and amount of movement. The target amount of translational force control direction movement includes a positive or negative sign and is used to determine either forward or backward translation for the direction of translational force control. When two or more directions of translational force control are set by the translational force control direction setting unit 32, the translational force control direction target movement amount calculation unit 35 calculates a target amount of translational force control direction movement for each direction of translational force control.

The translational force control direction target movement amount calculation unit 35 calculates a target amount of translational force control direction movement, based on a first predetermined amount of translational force control direction movement, or the first predetermined amount of translational force control direction movement and a translational force control target force in the direction of translational force control, when the force acting between the given object 21 and the different object 22 in the direction of translational force control is smaller than a first predetermined threshold for a force in the direction of translational force control.

The translational force control direction target movement amount calculation unit 35 calculates a target amount of translational force control direction movement in accordance with a predetermined velocity of translation or a first predetermined amount of translational force control direction movement for each control cycle of the robot controller 10, given by, e.g., a function for calculating the velocity of translation, when the force acting between the given object 21 and the different object 22 in the direction of translational force control is smaller than a first predetermined threshold for a force in the direction of translational force control. The first predetermined threshold for the force in the direction of translational force control in this case can be used to determine that the force acting between the given object 21 and the different object 22 in the direction of translational force control is too small to keep them in contact. The first predetermined threshold can further be used to determine that, because of the insufficient force acting between the given object 21 and the different object 22 in the direction of translational force control, the force about the axis of rotational force control (to be described later) is too small to allow rotation based on this force about the axis.

A predetermined velocity of translation used to determine a first amount of translational force control direction movement may be set as follows. The velocity of translation before the given object 21 and the different object 22 come into contact with each other may be set equal to that when the force acting between the given object 21 and the different object 22 in the direction of translational force control falls below a first predetermined threshold for the force in the direction of translational force control after the given object 21 and the different object 22 come into contact with each other. The velocity of translation may be changed when it is raised until contact is made for the first time and lowered once contact is made. Assume that, after the given object 21 and the different object 22 come into contact with each other for the first time, the moving distance or time used for a change from a non-contact state to a contact state shortens. Then, once contact is made, when the force acting between the given object 21 and the different object 22 in the direction of translational force control falls below a first predetermined threshold for the force in the direction of translational force control, the velocity of translation during the moving operation may be increased by raising the acceleration of translation or setting the target velocity of translation high. A predetermined velocity of translation may be set based on the allowable magnitude of a force generated upon contact between the given object 21 and the different object 22 or set by automatically adjusting the velocity of translation based on, e.g., a time constant which can be set in the moving operation of the robot 50 or the state of vibration during movement.

The translational force control direction target movement amount calculation unit 35 may calculate a target amount of translational force control direction movement, based on a first predetermined amount of translational force control direction movement and a translational force control target force in the direction of translational force control, when the force acting between the given object 21 and the different object 22 in the direction of translational force control is smaller than a first predetermined threshold for a force in the direction of translational force control. In other words, as described earlier, calculation of a target amount of translational force control direction movement in accordance with a predetermined velocity of translation may involve adjustment by adding a velocity calculated based on the translational force control target force in the direction to press and the force control gain. This allows adjustment by raising or lowering the velocity of translation in the direction of translational force control in accordance with the setting of the translational force control target force.

The translational force control direction target movement amount calculation unit 35 calculates a target amount of translational force control direction movement, based on the force acting between the given object 21 and the different object 22 in the direction of translational force control and the translational force control target force in the direction of translational force control, or the force acting between the given object 21 and the different object 22 in the direction of translational force control, the translational force control target force in the direction of translational force control, and a second predetermined amount of translational force control direction movement, when the force acting between the given object 21 and the different object 22 in the direction of translational force control is equal to or greater than the first predetermined threshold for the force in the direction of translational force control. The first predetermined threshold for the force in the direction of translational force control in this case can be used to determine that the force acting between the given object 21 and the different object 22 in the direction of translational force control is not small to keep them in contact. The first predetermined threshold can further be used to determine that the force about the axis of rotational force control (to be described later) is large enough to allow rotation based on this force about the axis.

When the force acting between the given object 21 and the different object 22 in the direction of translational force control is equal to or greater than the first predetermined threshold for the force in the direction of translational force control, the translational force control direction target movement amount calculation unit 35 determines that the given object 21 and the different object 22 are in contact with each other in the direction of translational force control. The translational force control direction target movement amount calculation unit 35 calculates a target amount of translational force control direction movement, based on the difference between the translational force control target force and the force in the direction of translational force control, and the force control gain, so that the force acting between the given object 21 and the different object 22 in the direction of translational force control reaches the translational force control target force.

Alternatively, when the force acting between the given object 21 and the different object 22 in the direction of translational force control is equal to or greater than the first predetermined threshold for the force in the direction of translational force control, the translational force control direction target movement amount calculation unit 35 uses the translational force control target force and the force in the direction of translational force control to adjust a second predetermined amount of translational force control direction movement, based on a predetermined velocity of translation or a second predetermined amount of translational force control direction movement for each control cycle of the robot controller 10, given by, e.g., a function for calculating the velocity of translation, separately from the first predetermined amount of translational force control direction movement used when the force acting between the given object 21 and the different object 22 in the direction of translational force control is smaller than the first predetermined threshold for the force in the direction of translational force control. The translational force control direction target movement amount calculation unit 35 adds the second predetermined amount of translational force control direction movement to the amount of movement calculated based on the difference between the translational force control target force and the force in the direction of translational force control, and the force control gain to calculate a target amount of translational force control direction movement.

As described earlier, the first predetermined amount of translational force control direction movement is used when the force acting between the given object 21 and the different object 22 in the direction of translational force control is smaller than a first predetermined threshold for a force in the direction of translational force control. The second predetermined amount of translational force control direction movement is used when the force acting between the given object 21 and the different object 22 in the direction of translational force control is equal to or greater than the first predetermined threshold for the force in the direction of translational force control.

The velocity at which the given object 21 and the different object 22 are brought close to each other during non-rotation before the given object 21 and the different object 22 come into contact with each other for the first time, the velocity of movement when the force acting between the given object 21 and the different object 22 in the direction of translational force control reduces upon rotation of the given object 21 after the given object 21 and the different object 22 come into contact with each other, the velocity at which the given object 21 and the different object 22 are brought close to each other during non-rotation upon return to a non-contact state after the given object 21 and the different object 22 come into contact with each other, and the like are preferably adjusted to appropriate values in accordance with, e.g., the conditions of the moving operation of the given object 21, the translational force control target force, the force control gain, or the velocity of rotation.

For easy setting and processing, the second predetermined amount of translational force control direction movement may be set equal to the first predetermined amount of translational force control direction movement when the force acting between the given object 21 and the different object 22 in the direction of translational force control is smaller than a first predetermined threshold for a force in the direction of translational force control.

The second predetermined amount of translational force control direction movement may be set smaller than the first predetermined amount of translational force control direction movement when the velocity of translation may not be raised based on the second predetermined amount of translational force control direction movement (e.g., when the time taken for a change from a non-contact state to a contact state is short, when the target amount of translational force control direction movement is adjusted by other methods, or when it is desired to prevent the force in the direction of translational force control from exceeding the translational force control target force and acting too much to press).

The second predetermined amount of translational force control direction movement may be set greater than the first predetermined amount of translational force control direction movement to keep the given object 21 and the different object 22 in contact with each other without separation in the direction of translational force control when the given object 21 and the different object 22 are may separate from each other according to the circumstances involved (e.g., when the velocity of rotation about the axis of rotational force control (to be described later) of the given object 21 is high).

When the second predetermined amount of translational force control direction movement is adjusted based on the translational force control target force and the force in the direction of translational force control, this is done such that the second predetermined amount of translational force control direction movement becomes zero when the force in the direction of translational force control is equal to the translational force control target force or equal to or smaller than the above-mentioned certain predetermined threshold, and the second predetermined amount of translational force control direction movement reduces as the force in the direction of translational force control approaches the translational force control target force when the magnitude of the force in the direction of translational force control ranges from a certain predetermined threshold to the magnitude of the translational force control target force. For other conditions, the second predetermined amount of translational force control direction movement is adjusted to zero. Let, for example, Fp be the force in the direction of translational force control, Fd be the translational force control target force, Vc be the second predetermined amount of translational force control direction movement, and Vt be the amount of translational force control direction movement calculated by adjusting the second predetermined amount of translational force control direction movement. Then, under the condition in which the magnitude of the force in the direction of translational force control ranges from zero to the magnitude of the translational force control target force, when the translational force control target force Fd is not zero, the second amount of translational force control direction movement Vt may be adjusted and calculated as:

$$Vt = (1-(Fp/Fd)) \times Vc \qquad (1)$$

When the translational force control target force Fd is zero, Vt may be adjusted and calculated as:

$$Vt=(-Fp) \times Vc \qquad (2)$$

The force in the direction of translational force control can be put close to the translational force control target force more quickly by adding the value of the second predetermined amount of translational force control direction movement adjusted using the translational force control target force and the force in the direction of translational force control to the amount of movement calculated based on the difference between the translational force control target force and the force in the direction of translational force control, and the force control gain.

In compliance control, when the given object 21 and the different object 22 are set in a combined state, the position of the given object 21 is moved in the direction of translational force control by an amount calculated by multiplying, by the force control gain, the difference between the translational force control target force and the force acting between the given object 21 and the different object 22 in the direction of translational force control, after the given object 21 and the different object 22 come into contact with each other for the first time.

FIGS. 14a to 14c are partial enlarged views illustrating an exemplary problem related to setting of the given object 21 and the different object 22 in a combined state. Referring to FIGS. 14a to 14c, a predetermined direction independent of the moving operation of the given object 21 is set as a direction of translational force control 61, and an axis which runs in a predetermined direction independent of the moving operation of the given object 21 and passes through a control point for the given object 21 is set as an axis of rotational force control 62. Setting a direction of translational force control and an axis of rotational force control, as illustrated as FIGS. 14a to 14c, makes it possible to set the given object 21 and the different object 22 in a combined state by compliance control according to the force about the axis of rotational force control 62 and the force in the direction of translational force control 61.

Referring to FIG. 14a, the given object 21 and the different object 22 are not in contact with each other, and the given object 21 is translated in the direction of translational force control 61. As the given object 21 is translated more in the direction of translational force control 61, the given object 21 and the different object 22 come into contact with each other for the first time, as illustrated as FIG. 14b. When the given object 21 and the different object 22 come into contact with each other in the direction of translational force control 61, a force about the axis of rotational force control 62 is generated so that the given object 21 rotates in a direction of rotation 63 by force control. When this occurs, the given object 21 rotates in the direction of rotation 63 about the axis of rotational force control 62, so that the portion where the given object 21 and the different object 22 are in contact with each other moves from the different object 22 in the direction opposite to the direction of translational force control 61, as illustrated as FIG. 14c. When the given object 21 and the different object 22 are not in contact with each other or the force in the direction of translational force control 61 reduces, the given object 21 stops its rotation in the direction of rotation 63 or rotation slows down. At this time, a force about the axis of rotational force control 62 is not generated or does not increase unless the force acting between the given object 21 and the different object 22 in the direction of translational force control 61, the translational force control target force, and the force control gain are used to increase the force acting between the given object 21 and the different object 22 in the direction of translational force control 61.

Figure 15A:
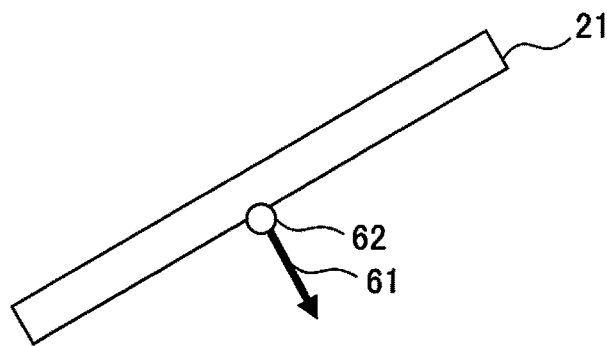
FIGS. 15a to 15c are views illustrating another exemplary problem related to setting of a combined state.
Figure 15B:
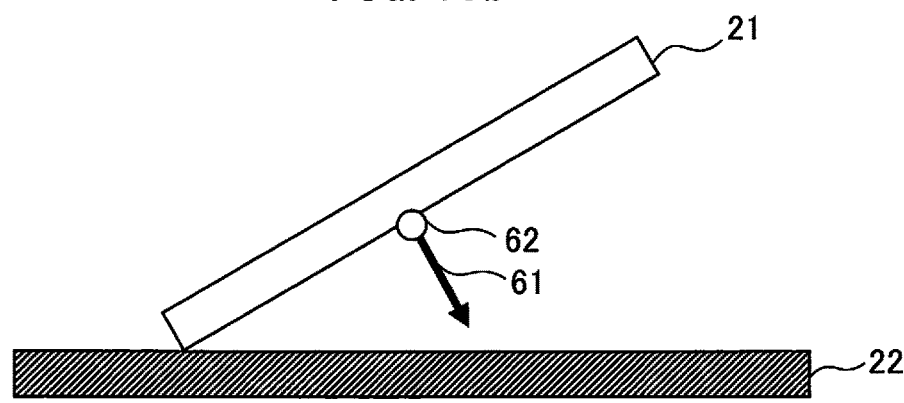
Figure 15C:
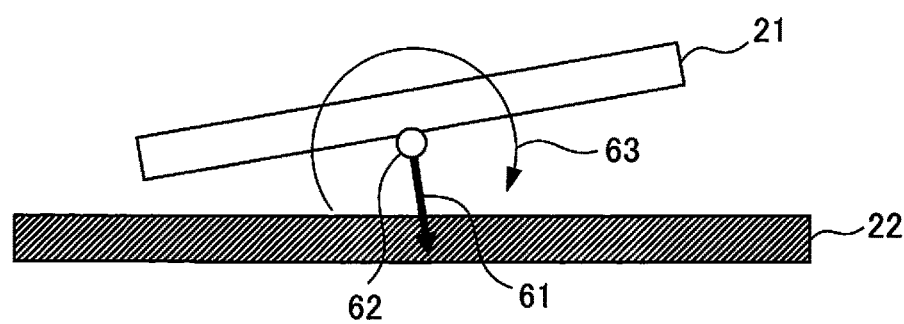

FIGS. 15a to 15c are partial enlarged views illustrating another exemplary problem related to setting of the given object 21 and the different object 22 in a combined state. Referring to FIGS. 15a to 15c, a direction preset for the given object 21, such as a predetermined direction in a tool coordinate system, is set as a direction of translational force control 61, and an axis which runs in a predetermined direction preset for the given object 21 and passes through a control point for the given object 21 is set as an axis of rotational force control 62. Setting a direction of translational force control and an axis of rotational force control, as illustrated as FIGS. 15a to 15c, makes it possible to set the given object 21 and the different object 22 in a combined state by compliance control according to the force about the axis of rotational force control 62 and the force in the direction of translational force control 61.

Referring to FIG. 15a, the given object 21 and the different object 22 are not in contact with each other, and the given object 21 is translated in the direction of translational force control 61 that changes depending on the orientation of the given object 21. As the given object 21 is translated more in the direction of translational force control 61, the given object 21 and the different object 22 come into contact with each other for the first time, as illustrated as FIG. 15b. When a force is generated upon contact between the given object 21 and the different object 22 in the direction of translational force control 61, a force about the axis of rotational force control 62 is generated so that the given object 21 rotates in a direction of rotation 63. When this occurs, the given object 21 rotates in the direction of rotation 63 about the axis of rotational force control 62, so that the portion where the given object 21 and the different object 22 are in contact with each other moves from the different object 22 in the direction opposite to the direction of translational force control 61, as illustrated as FIG. 15c. At this time, the direction of translational force control 61 varies depending on the orientation of the given object 21. When the given object 21 and the different object 22 are not in contact with each other or the force in the direction of translational force control 61 reduces, the given object 21 stops its rotation in the direction of rotation 63 or rotation slows down. At this time, a force about the axis of rotational force control 62 is not generated or does not increase unless the force acting between the given object 21 and the different object 22 in the direction of translational force control 61, the translational force control target force, and the force control gain are used to increase the force acting between the given object 21 and the different object 22 in the direction of translational force control 61. In this manner, as in the case described with reference to FIGS. 14a to 14c, even when the direction of translational force control varies depending on the moving operation of the given object 21, the given object 21 and the different object 22 are in a non-contact state or may separate from each other when the given object 21 is rotated relative to the different object 22 to set them in a combined state.

The force control gain or the translational force control target force can be adjusted only within a limited range. Increasing the force control gain makes the robot 50 more likely to move with oscillation due to factors associated with, e.g., the operation performance of the robot 50, vibration upon the operation of the robot 50, or noise produced in the force, or leads to too much movement of the robot 50 depending on the force. Therefore, the force control gain can be increased only to a certain extent. It is often preferable to keep the translational force control target force relatively small so as not to bring the given object 21 and the different object 22 into contact with each other with too large a force to avoid breakage, deformation, or damage.

As described earlier, when the given object 21 is moved relative to the different object 22 in the direction of translational force control 61 using the difference between the force in the direction of translational force control 61 and the translational force control target force, and the force control gain to press the given object 21 against the different object 22 with the translational force control target force in the direction of translational force control 61, the given object 21 is rotated relative to the different object 22 about the axis of rotational force control 62 based on the force generated about the axis of rotational force control 62, and the translational force control target force is preferably kept relatively small, the force control gain is limited in magnitude. In this case, a translational operation in the direction of translational force control 61 based on the force in the direction of translational force control 61 is not performed rapidly, resulting in repetitions of separation and contact of the given object 21 and the different object 22 upon rotation about the axis of rotational force control 62, or generation of an insufficient force in the direction of translational force control 61. This hinders stable, rapid rotation. It, therefore, may take much time to set the given object 21 and the different object 22 in a combined state.

In contrast to this, with the method according to the present invention, when the force acting between the given object 21 and the different object 22 in the direction of translational force control reduces, calculating a target amount of translational force control direction movement, as described earlier, achieves more stable movement and setting of the given object 21 and the different object 22 in a combined state in a shorter period of time than in the method for calculating a velocity of translation by multiplying, by the force control gain, the difference between the translational force control target force and the force acting between the given object 21 and the different object 22 in the direction of translational force control.

The rotational force control axis target rotational movement amount calculation unit 36 calculates a target amount of rotational force control axis rotational movement by which the given object 21 is rotated relative to the different object 22 about the axis of rotational force control, based on the force acting between the given object 21 and the different object 22. The target amount of rotational force control axis rotational movement is represented as a vector and used to determine the direction and amount of movement. The target amount of rotational force control axis rotational movement includes a positive or negative sign and is used to determine either forward or backward rotation for the direction of rotation about the axis of rotational force control. When two or more axes of rotational force control are set by the rotational force control axis setting unit 34, the rotational force control axis target rotational movement amount calculation unit 36 calculates a target amount of rotational force control axis rotational movement for each axis of rotational force control.

The target direction target movement amount calculation unit 37 calculates a target amount of translational movement of the given object 21 and a target amount of rotational movement of the given object 21, based on the force acting between the given object 21 and the different object 22, the direction of translational force control set by the translational force control direction setting unit 32, the axis of rotational force control set by the rotational force control axis setting unit 34, the target amount of translational force control direction movement calculated by the translational force control direction target movement amount calculation unit 35, and the target amount of rotational force control axis rotational movement calculated by the rotational force control axis target rotational movement amount calculation unit 36.

Besides the target amount of translational force control direction movement and the target amount of rotational force control axis rotational movement, when the given object 21 receives a force exerted by the different object 22 in a direction perpendicular to the direction of translational force control, the target direction target movement amount calculation unit 37 may calculate an amount of translational movement to passively reduce the target force to zero based on the force acting in the direction perpendicular to the direction of translational force control, i.e., to set the acting force smaller than a predetermined threshold, and calculate a target amount of translational movement and a target amount of rotational movement based on the calculated amount of movement, the target amount of translational force control direction movement, and the target amount of rotational force control axis rotational movement.

Besides the target amount of translational force control direction movement and the target amount of rotational force control axis rotational movement, when the robot pedestal 52 is moved by the movable robot installation device 53, and the movement of the robot pedestal 52 continues to move the given object 21, the target direction target movement amount calculation unit 37 may calculate a target amount of translational movement and a target amount of rotational movement based on the expected amount of movement of the given object 21 by the movement of the robot pedestal 52 in the next control cycle of the robot controller 10. When the different object 22 is moved by the movable installation device 24 for a different object, and the different object 22 continues its movement, the target direction target movement amount calculation unit 37 may calculate a target amount of translational movement and a target amount of rotational movement based on the amount of movement of the different object 22 in the next control cycle of the robot controller 10.

In response to moving operation input from the outside of the robot controller 10 by, e.g., a device for inputting moving operations, such as a teach device, or a moving operation input signal from, e.g., another controller when the given object 21 is moved relative to the different object 22 to set the given object 21 and the different object 22 in a combined state, the target direction target movement amount calculation unit 37 may temporarily move the given object 21 based on the external input, independently of the target amount of translational force control direction movement and the target amount of rotational force control axis rotational movement, and then move the given object 21 based on the target amount of translational force control direction movement and the target amount of rotational force control axis rotational movement after the external moving operation input becomes invalid.

Alternatively, in response to moving operation input from the outside of the robot controller 10 by, e.g., a device for inputting moving operations, such as a teach device, or a moving operation input signal from, e.g., another controller when the given object 21 is moved relative to the different object 22 to set the given object 21 and the different object 22 in a combined state, the target direction target movement amount calculation unit 37 may calculate a target amount of translational movement and a target amount of rotational movement based on the amounts of translational movement and/or rotational movement by external moving operation input, the target amount of translational force control direction movement, and the target amount of rotational force control axis rotational movement, or by, e.g., summing the products of the respective amounts of movement multiplied by a weighting factor at this time.

The target direction target movement amount calculation unit 37 calculates a target amount of translational movement and a target amount of rotational movement, in accordance a deceleration stop or emergency stop instruction when issued from the outside of the robot controller 10 by, e.g., an emergency stop signal input via a teach device or an emergency stop switch, or an emergency stop signal input via, e.g., another controller or another sensor.

A target amount of translational movement and a target amount of rotational movement are further calculated to execute deceleration stop or emergency stop according to the circumstances during force control (e.g., when the magnitude of, e.g., the force in the direction of translational force control or a direction other than the direction of translational force control, the force in the direction along any axis of a force control coordinate system, the force about any axis of the force control coordinate system, the force about the axis of rotational force control, or the force about a predetermined axis of rotation exceeds a predetermined threshold, when an excessive force is detected by the force measuring unit 31, when a force greater than a threshold acts during a predetermined time, or when the operation of the robot 50 oscillates during force control).

When the position or orientation of the given object 21 changes excessively past a predetermined threshold from the start of moving the given object 21 to set the given object 21 and the different object 22 in a combined state, a target amount of translational movement and a target amount of rotational movement are further calculated to execute deceleration stop or emergency stop.

When the position and orientation during force control or the position of any axis of the robot 50 is about to move past a movable range or a predetermined range, a target amount of translational movement and a target amount of rotational movement are further calculated to execute deceleration stop before the predetermined range is passed over.

In this manner, the target direction target movement amount calculation unit 37 may adjust and calculate a target amount of translational movement and a target amount of rotational movement in accordance with, e.g., the operation during force control or input from the outside of the robot controller 10. For deceleration stop or emergency stop, an operation command generation unit (to be described later) may generate a command by adjustment and calculation to issue such a command.

The operation command generation unit 38 generates an operation command for the robot 50, based on the target amount of translational movement and the target amount of rotational movement calculated by the target direction target movement amount calculation unit 37.

At this time, the operation command generation unit 38 generates and outputs an operation command to an actuator for the robot 50 to allow the robot 50 to smoothly move to a desired position and orientation, based on the target amount of translational movement and the target amount of rotational movement. The operation command generation unit 38 further adjusts the operation command by, e.g., performing filtering processing to prevent a rapid increase in jerk or anti-vibration processing for damping vibration upon the operation of the robot 50, or correcting the command position and/or orientation in consideration of flexure of the robot 50 to achieve accurate movement to a target position.

When a deceleration stop or emergency stop instruction is issued from the outside of the robot controller 10 by, e.g., an emergency stop signal input via a teach device or an emergency stop switch, or an emergency stop signal input via, e.g., another controller or another sensor, the target direction target movement amount calculation unit 37 or the operation command generation unit 38 executes deceleration stop or emergency stop of the robot 50.

Exemplary processing of the robot controller 10a according to the above-described embodiment, for controlling the force acting between the given object 21 held on the end effector 51 of the robot 50 and the different object 22 to move the given object 21 relative to the different object 22 by the robot controller 10a to set the given object 21 and the different object 22 in a combined state in which a predetermined portion of the given object 21 and a predetermined portion of the different object 22 are in contact and combined with each other, will be described below with reference to FIG. 17. FIG. 17 is a flowchart illustrating an exemplary process of processing operations by the robot controller 10a.

FIG. 17 illustrates exemplary processing executed for each control cycle of the robot controller 10a to generate an operation command for the robot 50 for each control cycle based on the force acting between the given object 21 and the different object 22. In this case, it is determined whether a combined state has been set based on whether the force about at least one predetermined axis of rotation is zero or equal to a predetermined threshold when the given object 21 and the different object 22 are in contact with each other in at least one predetermined direction of translation. However, it may be determined whether a combined state has been set using a determination method other than a method for determination based on whether the force about the axis of rotation is zero, as will be described later.

After the start of an operation for moving the given object 21 held on the end effector 51 of the robot 50 relative to the different object 22 to set the given object 21 and the different object 22 in a combined state, the translational force control direction setting unit 32 sets at least one direction of translational force control, in which the given object 21 is translated relative to the different object 22 and pressed against the different object 22, and the rotational force control axis setting unit 34 sets at least one axis of rotational force control representing an axis of rotation of the given object 21 relative to the different object 22 (step S1). At this time, the rotational force control axis setting unit 34 sets an axis that is not parallel to the direction of translational force control as at least one of such axes of rotational force control.

The translational force control target force setting unit 33 sets a translational force control target force representing a target pressing force to translate the given object 21 relative to the different object 22 and press the given object 21 against the different object 22, for the direction of translational force control set by the translational force control direction setting unit 32, or, when two or more directions of translational force control are set, this is done for each direction of translational force control (step S2).

The force measuring unit 31 measures a force acting between the given object 21 and the different object 22, based on the force data detected by the force sensor 25 and the setting of the direction of translational force control and the axis of rotational force control, to measure a force acting between the given object 21 and the different object 22 in the direction of translational force control and a force acting between the given object 21 and the different object 22 about the axis of rotational force control (step S3).

The translational force control direction target movement amount calculation unit 35 determines whether the force in the direction of translational force control is smaller than a predetermined threshold (step S4).

The translational force control direction target movement amount calculation unit 35 calculates a target amount of translational force control direction movement, based on a first predetermined amount of translational force control direction movement or the first predetermined amount of translational force control direction movement and the translational force control target force in the direction of translational force control, when the force acting between the given object 21 and the different object 22 in the direction of translational force control is smaller than a first predetermined threshold (step S5).

The translational force control direction target movement amount calculation unit 35 calculates a target amount of translational force control direction movement, based on the force acting between the given object 21 and the different object 22 in the direction of translational force control and the translational force control target force in the direction of translational force control, or the force acting between the given object 21 and the different object 22 in the direction of translational force control, the translational force control target force in the direction of translational force control, and a second predetermined amount of translational force control direction movement, when the force acting between the given object 21 and the different object 22 in the direction of translational force control is equal to or greater than the first predetermined threshold (step S6).

The rotational force control axis target rotational movement amount calculation unit 36 calculates a target amount of rotational force control axis rotational movement by which the given object 21 is rotated relative to the different object 22 about the axis of rotational force control, based on the force acting between the given object 21 and the different object 22 (step S7).

The target direction target movement amount calculation unit 37 calculates a target amount of translational movement and a target amount of rotational movement of the given object 21, based on the target amount of translational force control direction movement calculated by the translational force control direction target movement amount calculation unit 35 in step S5 or S6, and the target amount of rotational force control axis rotational movement calculated by the rotational force control axis target rotational movement amount calculation unit 36 in step S7 (step S8).

The operation command generation unit 38 generates an operation command for the robot 50, based on the target amount of translational movement and the target amount of rotational movement calculated by the target direction target movement amount calculation unit 37 (step S9).

With the above-mentioned processes in steps S1 through S9, a moving operation command for moving the given object 21 held on the end effector 51 of the robot 50 relative to the different object 22 to set the given object 21 and the different object 22 in a combined state is generated for each control cycle of the robot controller 10 based on the force acting between the given object 21 and the different object 22. The processes in steps S1 through S9 are executed for each control cycle of the robot controller 10 and repeated until the given object 21 and the different object 22 are set in a combined state.

In a second embodiment of the present invention, as an additional feature to the robot controller 10 according to the first embodiment of the present invention, preferably, a translational force control direction target movement amount calculation unit 35 in a robot controller 10 calculates an amount of correction movement for the target amount of translational force control direction movement, based on the target amount of rotational force control axis rotational movement calculated by a rotational force control axis target rotational movement amount calculation unit 36, to, in turn, calculate a target amount of translational force control direction movement by correction using the amount of correction movement, in accordance with the relationship between the amount of rotational movement about the axis of rotational force control of a given object 21 and the amount of translational movement of a portion where the given object 21 and a different object 22 come into contact with each other upon rotation about the axis of rotational force control of the given object 21. An amount of movement in a direction parallel to the direction of translational force control of the portion where the given object 21 and the different object 22 come into contact with each other is preferably set as an amount of translational movement of the portion where the given object 21 and the different object 22 come into contact with each other.

Differences from the robot controller 10 according to the first embodiment of the present invention will now be mainly described in the second embodiment of the present invention. Details which will not be particularly referred to hereinafter are practiced in the same way.

When the given object 21 and the different object 22 are set in a combined state, the given object 21 and the different object 22 separate from each other in their contact portion upon rotation about the axis of rotational force control of the given object 21. An amount of translational movement preferably performed to bring the given object 21 and the different object 22 into contact with each other in the direction of translational force control is calculated or estimated, and the given object 21 is translated by the amount of translational movement preferably performed to bring the given object 21 and the different object 22 into contact with each other, while the given object 21 is rotated about the axis of rotational force control. At this time, correction is preferably performed by adding the above-mentioned amount of translational movement to the amount of movement for force control that allows the force acting between the given object 21 and the different object 22 to reach a translational force control target force.

It is preferable to set as a target amount of translational force control direction movement, the sum of the amount of movement of the different object 22 in a direction parallel to the direction of translational force control when the different object 22 moves, the amount of movement for force control that allows the force acting between the given object 21 and the different object 22 to reach a translational force control target force, and the amount of movement by which the given object 21 and the different object 22 separate from each other upon rotation of the given object 21.

As illustrated as FIGS. 14a to 14c and 15a to 15c, when the given object 21 and the different object 22 come into contact with each other, and the given object 21 rotates about an axis of rotational force control 62 by the target amount of rotational force control axis rotational movement calculated by the rotational force control axis target rotational movement amount calculation unit 36, the portion where the given object 21 and the different object 22 come into contact with each other moves in the direction opposite to a direction of translational force control 61. At this time, the given object 21 may be preferably translated relative to the different object 22 in the direction of translational force control 61 to bring the given object 21 and the different object 22 into contact with each other. The given object 21 translates in the direction of translational force control 61 by the target amount of translational force control direction movement in the direction of translational force control 61 calculated by the translational force control direction target movement amount calculation unit 35, so that the given object 21 and the different object 22 come into contact with each other. By repetitions of such rotation and translation, the given object 21 and the different object 22 enter a combined state. In other words, as illustrated as FIGS. 14a to 14c and 15a to 15c, when no axis of rotational force control is located at the position at which the given object 21 and the different object 22 come into contact with each other for the first time, once the given object 21 and the different object 22 come into contact with each other, the given object 21 may be preferably translated by the distance by which the given object 21 and the different object 22 separate from each other upon rotation, to keep the given object 21 and the different object 22 in contact. At this time, the distance by which the given object 21 and the different object 22 separate from each other in the direction of translational force control is estimated and calculated as an amount of correction for the amount of rotational movement calculated for each control cycle, based on the relationship between the amount of rotational movement about the axis of rotational force control and the amount of translational movement in the direction of translational force control of the portion where the given object 21 and the different object 22 come into contact with each other, and the given object 21 is translated by the calculated amount of correction, together with rotation, to allow the given object 21 and the different object 22 to rotate relative to each other while keeping them in as close contact as possible or preventing their separation as much as possible. Such translation further allows control to more stably, quickly press the given object 21 and the different object 22 against each other with the translational force control target force. For such movement, the translational force control direction target movement amount calculation unit 35 obtains a relationship, during a predetermined time, between the amount of rotational movement about the axis of rotational force control of the given object 21 and the amount of translational movement in the direction of translational force control of the portion where the given object 21 and the different object 22 come into contact with each other, to calculate an amount of translational movement on an axis parallel to the direction of translational force control of the portion where the given object 21 and the different object 22 come into contact with each other upon rotation of the given object 21. Then, an amount of correction movement L for the target amount of translational force control direction movement by which the portion where the given object 21 and the different object 22 come into contact with each other is translated in the direction of translational force control may be approximately calculated as:

$$L = d \times \theta \qquad (3)$$

where d is the distance from the axis of rotational force control to the portion where the given object 21 and the different object 22 come into contact with each other, and θ is the target amount of rotational movement about the axis of rotational force control of the given object 21 for each control cycle of the robot controller 10.

The distance from the axis of rotational force control to the portion where the given object 21 and the different object 22 come into contact with each other is preferably obtained by, e.g., using the shape information of the given object 21, measuring the distance from the axis of rotational force control of the given object 21 to the contact point in advance, or calculating the distance to the contact point based on the force at the time of first contact.

In calculating an amount of correction movement for the target amount of translational force control direction movement, to bring the given object 21 and the different object 22 into contact with each other after they separate from each other upon rotation of the given object 21, an amount of movement of the given object 21 in the direction of translational force control may be acquired in an actual moving operation, and an amount of correction movement for the target amount of translational force control direction movement may be estimated and calculated based on the target amount of rotational force control axis rotational movement, using a state estimation method such as the Kalman filter, in accordance with the relationship between the amount of rotational movement about the axis of rotational force control of the given object 21 and the amount of translational movement of the portion where the given object 21 and the different object 22 come into contact with each other upon rotation about the axis of rotational force control of the given object 21, obtained based on the acquired data.

When the different object 22 varies in position and/or orientation, a moving distance for bringing the given object 21 and the different object 22 into contact with each other upon rotation of the given object 21 and movement of the different object 22 is acquired in an actual moving operation, and a distance by which the given object 21 and the different object 22 separate from each other in the direction of translational force control in the next control cycle may be estimated from the state of relative movement between the given object 21 and the different object 22, based on the acquired data. Upon defining a predetermined upper limit for the estimated value, the target amount of translational force control direction movement may be corrected by the estimated distance. In other words, an amount of movement preferably performed so as not to separate the given object 21 and the different object 22 from each other may be estimated from the state of rotation of the given object 21 and movement of the position and/or orientation of the different object 22, and the target amount of translational force control direction movement of the given object 21 may be corrected by the amount of movement.

Performing correction by the amount of correction movement calculated in the above-described way to calculate a target amount of translational force control direction movement makes it possible to prevent separation between the given object 21 and the different object 22 as much as possible in the direction of translational force control, while rotating the given object 21 in accordance with the target amount of rotational force control axis rotational movement. When two or more directions of translational force control are set, the above-mentioned calculation and correction operations may be performed for each direction or only one direction, or a direction selected for each control cycle. In the above-mentioned way, the given object 21 and the different object 22 can be more stably, quickly set in a combined state.

Figure 3:
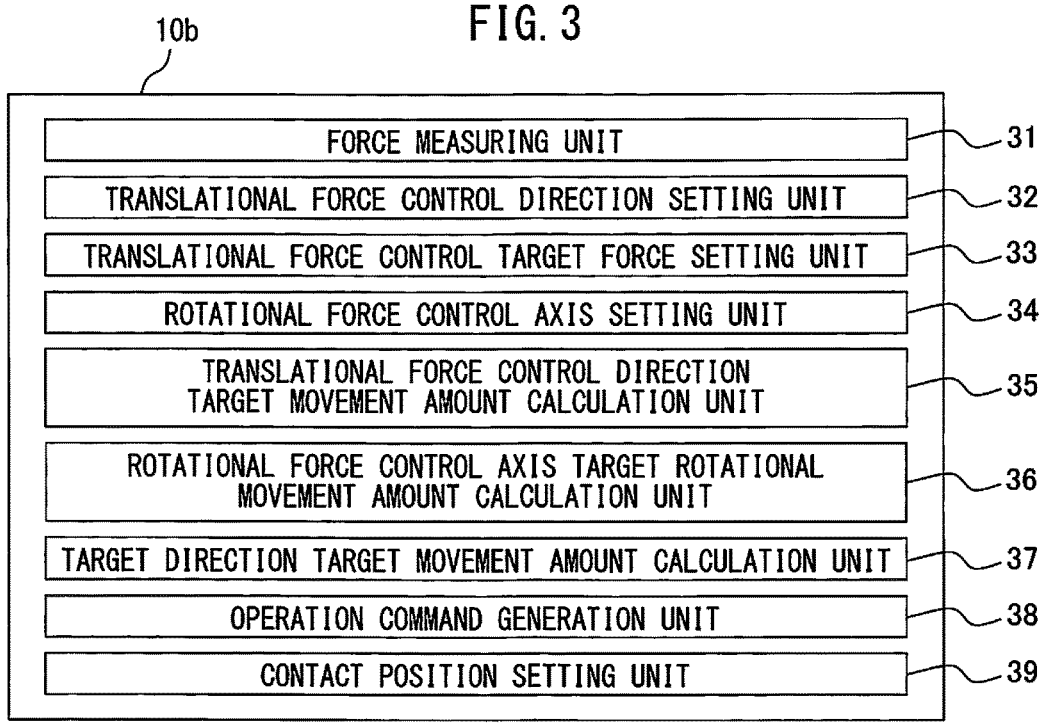
FIG. 3 is a block diagram functionally illustrating the configuration of a robot controller according to another embodiment of the present invention.

FIG. 3 is a block diagram functionally illustrating the configuration of a robot controller 10b according to a third embodiment of the present invention. In the third embodiment of the present invention, a contact position setting unit 39 may be added to the robot controller 10 according to the first or second embodiment of the present invention to obtain another robot controller configuration. In the third embodiment of the present invention, the robot controller 10b includes a contact position setting unit 39 as added to the robot controller 10a, as depicted as FIG. 3. The configuration of a robot controller 10f, depicted as FIG. 5, including functions to be described later may be used. A method for setting a given object 21 and a different object 22 in a combined state by the robot controller 10 according to the third embodiment of the present invention will be described below with reference to FIGS. 14a to 14c, 15a to 15c, and 16a to 16c.

In the third embodiment of the present invention, as an additional feature to the robot controller 10 according to the first or second embodiment of the present invention, preferably, the robot controller 10 includes a contact position setting unit 39 which sets a contact position at which the given object 21 and the different object 22 come into contact with each other, or calculates and sets a contact position at which the given object 21 and the different object 22 come into contact with each other based on the force acting between the given object 21 and the different object 22. A rotational force control axis setting unit 34 sets at least one predetermined axis of rotational force control, and sets as at least one contact position reference axis of rotational force control, at least one axis which passes through the contact position in the given object 21 or the different object 22 and is parallel to the predetermined axis of rotational force control. A rotational force control axis target rotational movement amount calculation unit 36 calculates a target amount of rotational movement about the contact position reference axis of rotational force control to set the calculated target amount of movement as a target amount of rotational force control axis rotational movement, based on a force about the predetermined axis of rotational force control, or a target amount of rotational movement about the axis of rotational force control calculated for the predetermined axis of rotational force control.

Differences from the robot controller 10 according to the first or second embodiment of the present invention will now be mainly described in the third embodiment of the present invention. Details which will not be particularly referred to hereinafter are practiced in the same way.

As described earlier, as illustrated as FIGS. 14a to 14c and 15a to 15c, when the given object 21 and the different object 22 come into contact with each other, and the given object 21 rotates about an axis of rotational force control 62 by the target amount of rotational force control axis rotational movement calculated by the rotational force control axis target rotational movement amount calculation unit 36, the given object 21 translates in a direction of translational force control 61 by the target amount of translational force control direction movement in the direction of translational force control 61 calculated by a translational force control direction target movement amount calculation unit 35. By repetitions of such rotation and translation, the given object 21 and the different object 22 enter a combined state. In other words, as illustrated as FIGS. 14a to 14c and 15a to 15c, when no axis of rotational force control is located at the position at which contact is made for the first time, once contact is made, the given object 21 may be preferably translated by the distance by which the given object 21 and the different object 22 separate from each other upon rotation.

FIGS. 16a to 16c are partial enlarged views illustrating an operation for setting the given object 21 and the different object 22 in a combined state by the robot controller 10 according to the third embodiment of the present invention. FIG. 16a illustrates the state at the start of movement to set the given object 21 and the different object 22 in a combined state, a predetermined direction independent of the moving operation of the given object 21 is set as a direction of translational force control 61, and an axis which runs in a predetermined direction independent of the moving operation of the given object 21 and passes through a control point for the given object 21 is set as an axis of rotational force control 62. The direction of translational force control of the given object 21 relative to the different object 22 may be changed, as in other embodiments. As the given object 21 is translated relative to the different object 22 in the direction of translational force control 61, as illustrated as FIG. 16a, the given object 21 comes into contact with the different object 22 in the portion of a point of contact 65, as illustrated as FIG. 16b. It is determined whether the given object 21 and the different object 22 have come into contact with each other by comparing the force acting between the given object 21 and the different object 22 in the direction of translational force control with a predetermined threshold. Alternatively, it may be determined whether the given object 21 and the different object 22 have come into contact with each other by comparing the force about the axis of rotational force control 62 with a predetermined threshold or based on a change in force about the axis of rotational force control 62 per predetermined time. When the given object 21 comes into contact with the different object 22 in a linear portion, a central or representative point for the linear portion may be set as a point of contact 65. When the given object 21 comes into contact with the different object 22 in a plurality of discontinuous portions, a central or representative point for these portions may be set as a point of contact 65. When the portion where the given object 21 and the different object 22 come into contact with each other varies, the contact position at this time may be set as a point of contact 65. A representative point in the portion where first contact is made is assumed herein as a point of contact 65. As illustrated as FIGS. 14a to 14c and 15a to 15c, when no axis of rotational force control is located at the position at which contact is made for the first time, once contact is made, the given object 21 may be preferably translated by the distance by which the contact portions between the given object 21 and the different object 22 separate from each other upon rotation. In contrast to this, as illustrated as FIGS. 16a to 16c, when the given object 21 is rotated relative to the different object 22, the distance by which the contact portions between the given object 21 and the different object 22 separate from each other upon rotation can be kept as small as possible by moving the given object 21 about the axis of rotational force control located at the point of contact 65. In the third embodiment of the present invention, the given object 21 is rotated relative to the different object 22 using their contact position as a center to perform such movement.

The contact position setting unit 39 sets a predetermined position for the given object 21 or the different object 22 as a contact position when the position at which the given object 21 and the different object 22 come into contact with each other for the first time is known in advance, or the given object 21 and the different object 22 are moved relative to each other and brought into contact with each other at the predetermined position for the first time.

Alternatively, the contact position setting unit 39 calculates a position at which the given object 21 and the different object 22 come into contact with each other, based on the force acting between the given object 21 and the different object 22, when their contact is made, and sets the calculated position for the given object 21 or the different object 22 as a contact position. The position at which the given object 21 and the different object 22 come into contact with each other may be an approximate position calculated based on the force acting between the given object 21 and the different object 22.

Contact positions between the given object 21 and the different object 22 may be sequentially calculated, estimated, and updated using a state estimation method such as the Kalman filter, for each control cycle of the robot controller 10 based on the force acting between the given object 21 and the different object 22.

The rotational force control axis setting unit 34 sets at least one predetermined axis of rotational force control first. For the sake of simplicity, only one axis of rotational force control is used herein, but the same applies to two or more axes of rotational force control. Further, as in other parts of the embodiment of the present invention, an axis of rotation which allows linear and planar portions of the given object 21 and the different object 22 to be combined with each other or allows them to move to a desired state when contact is made in a predetermined direction of translation, and the forces about a predetermined axis of rotational force control are equilibrated is set as an axis of rotational force control.

A predetermined direction independent of the moving operation of the given object 21 is set as a direction of translational force control 61, and an axis which runs in a predetermined direction independent of the moving operation of the given object 21 and passes through a control point for the given object 21 is set as an axis of rotational force control 62, as illustrated as FIG. 16a.

When the given object 21 and the different object 22 come into contact with each other as the given object 21 is moved relative to the different object 22 in the direction of translational force control 61, the contact position setting unit 39 sets a contact position, as illustrated as FIG. 16b.

The rotational force control axis setting unit 34 sets as at least one contact position reference axis of rotational force control 67, at least one axis which passes through a point defining the contact position set for the given object 21 or the different object 22 and is parallel to the predetermined axis of rotational force control 62, based on the contact position set by the contact position setting unit 39. For the sake of simplicity, only one contact position reference axis of rotational force control is used herein.

When the portion where the given object 21 and the different object 22 are combined with each other forms a plane, it suffices to set two axes of rotational force control and perform the same moving process as in the method for movement about a specific axis of rotational force control, for each axis of rotational force control, as in other embodiments of the present invention. The target amount of rotational movement about each axis of rotational force control may be adjusted as appropriate in consideration of, e.g., the target amounts of rotational force control axis rotational movement for other axes of rotational force control.

Although an axis of rotational force control may be set at the position of the point of contact 65 for the given object 21 when the different object 22 is at rest, an axis of rotational force control is preferably set at the position of the point of contact 65 set for the different object 22 when the different object 22 moves. In addition, when a predetermined direction for the given object 21 is set as a direction of translational force control, and the direction of translational force control with respect to the different object 22 varies depending on the moving operation of the given object 21, an axis of rotational force control 67 is preferably set at the position of the point of contact 65 set for the given object 21.

The translational force control direction target movement amount calculation unit 35 calculates a target amount of translational force control direction movement by which the given object 21 is translated relative to the different object 22 in a direction parallel to the direction of translational force control 61, based on the force acting between the given object 21 and the different object 22. At this time, a target amount of translational force control direction movement is calculated for a translational force control direction 64 which is parallel to the direction of translational force control 61 and has the position of the contact position reference axis of rotational force control 67 as a reference.

The rotational force control axis target rotational movement amount calculation unit 36 calculates a target amount of rotational movement in a direction of rotation 66 about the contact position reference axis of rotational force control 67, based on the force about the predetermined axis of rotational force control 62 or the target amount of rotational movement in a direction of rotation 63 about a predetermined axis of rotational force control 62 calculated for the predetermined axis of rotational force control 62, and sets the calculated target amount of movement as a target amount of rotational force control axis rotational movement. Assume herein that a force about the contact position reference axis of rotational force control 67 is calculated based on the force acting between the given object 21 and the different object 22. Then, when the set contact position is identical to an actual contact position, the calculated force is zero. When the set contact position is different from, but close to an actual contact position, the calculated force is considerably smaller than the force about a predetermined axis of rotational force control 62 calculated for the predetermined axis of rotational force control 62. It is, therefore, undesirable to perform movement based on the force about the contact position reference axis of rotational force control 67. A target amount of rotational movement about the contact position reference axis of rotational force control 67 is calculated based on the force about the predetermined axis of rotational force control 62. Alternatively, a target amount of rotational movement about a predetermined axis of rotational force control 62 calculated for the axis of rotational force control 62 is calculated, and a target amount of rotational movement about the contact position reference axis of rotational force control 67 is calculated based on the calculated target amount of rotational movement. When the given object 21 and the different object 22 are set in a combined state, the target amount of rotational movement about a predetermined axis of rotational force control 62 calculated for the predetermined axis of rotational force control 62 is zero, and the target amount of rotational movement about the contact position reference axis of rotational force control 67 is also zero. It is, therefore, possible to satisfactorily set the given object 21 and the different object 22 in a combined state. In this way, when the given object 21 and the different object 22 are rotated relative to each other, the given object 21 and the different object 22 can be set in a combined state by rotation about the contact position reference axis of rotational force control 67 by an amount of rotational movement about a predetermined axis of rotational force control 62 calculated based on the force about the predetermined axis of rotational force control 62.

The given object 21 is rotated relative to the different object 22 about the contact position reference axis of rotational force control 67 and translated to be pressed with the translational force control target force in the translational force control direction 64, using the target amount of translational force control direction movement calculated by the translational force control direction target movement amount calculation unit 35 and the target amount of rotational force control axis rotational movement calculated by the rotational force control axis target rotational movement amount calculation unit 36, as described earlier. With this operation, as illustrated as FIGS. 16b and 16c, the given object 21 and the different object 22 can be more stably set in a combined state in a shorter period of time while preventing them from being set in a non-contact state or separating from each other as much as possible upon rotation of the given object 21. At this time, even when the set contact position is shifted from an actual contact position, the given object 21 and the different object 22 can be more stably, quickly set in a combined state by setting a position close to the actual contact position as a center of rotation than by rotation about the axis of rotational force control 62.

Figure 4:
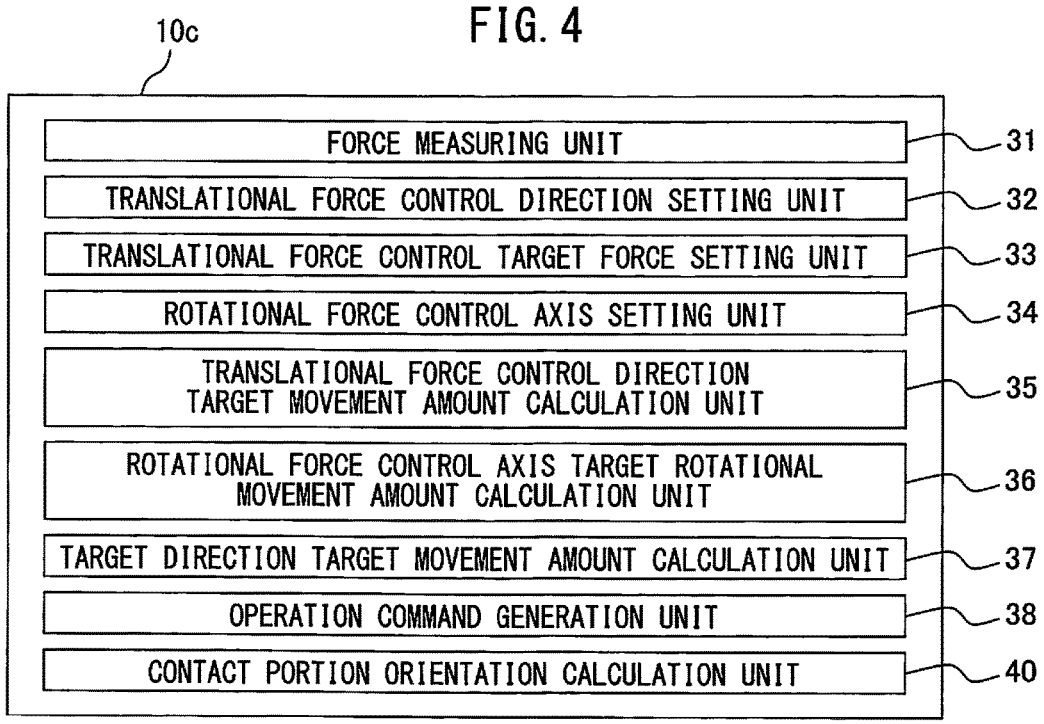
FIG. 4 is a block diagram functionally illustrating the configuration of a robot controller according to still another embodiment of the present invention.
Figure 8:
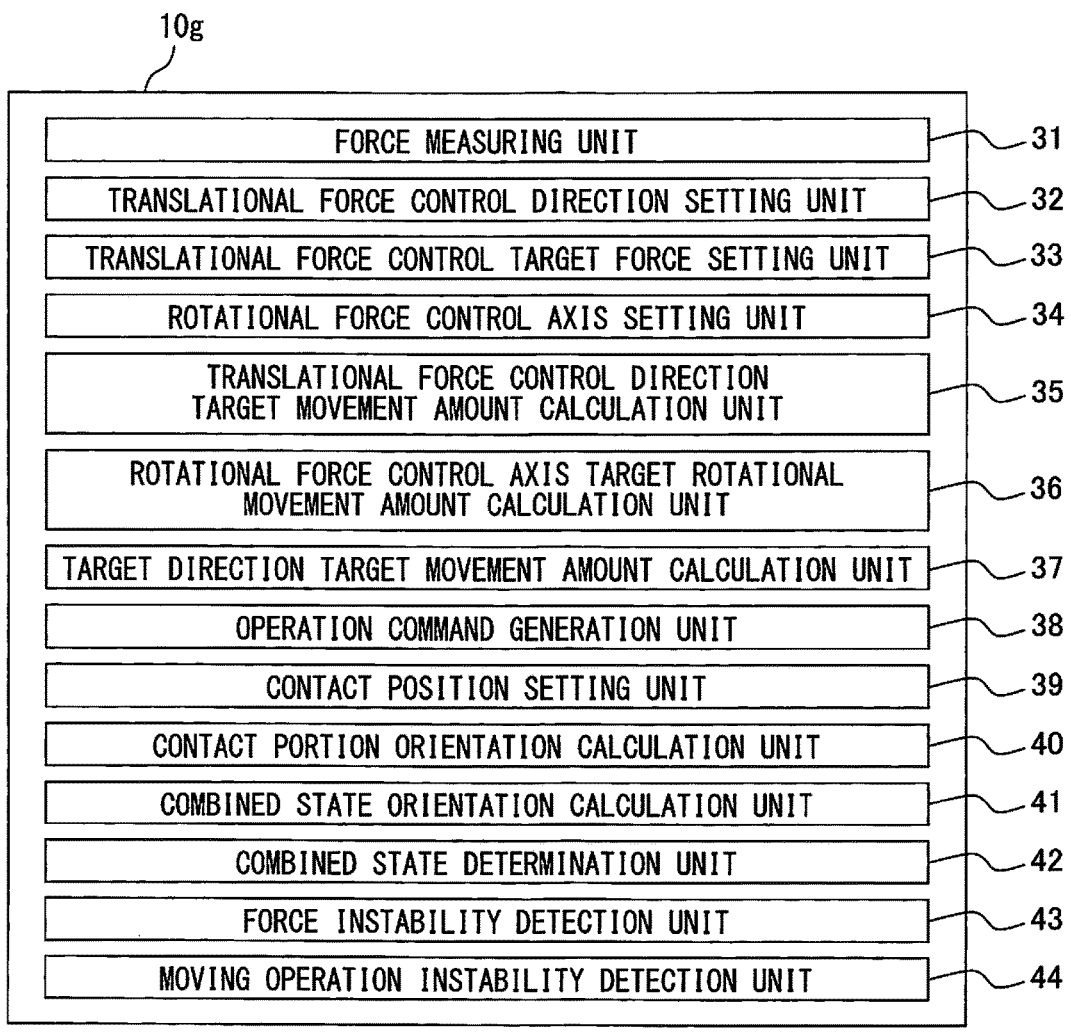
FIG. 8 is a block diagram functionally illustrating the configuration of a robot controller according to still another embodiment of the present invention.

FIG. 4 is a block diagram functionally illustrating the configuration of a robot controller 10c according to a fourth embodiment of the present invention. In the fourth embodiment of the present invention, a contact portion orientation calculation unit 40 may be added to the robot controller 10 according to any one of the first to third embodiments of the present invention to obtain another robot controller configuration. In the fourth embodiment of the present invention, a contact portion orientation calculation unit 40 is added to the robot controller 10a, as depicted as FIG. 4. Alternatively, a contact portion orientation calculation unit 40 is added to the robot controller 10b, although not illustrated herein. The configuration of a robot controller 10g, depicted as FIG. 8, including functions to be described later may be used. A method for setting a given object 21 and a different object 22 in a combined state by the robot controller 10 including the contact portion orientation calculation unit 40 according to the fourth embodiment of the present invention will be described below with reference to FIGS. 18a to 18e.

In the fourth embodiment of the present invention, as an additional feature to the robot controller 10 according to any one of the first to third embodiments of the present invention, preferably, the robot controller 10 includes a contact portion orientation calculation unit 40 which calculates an orientation of a contact portion in the given object 21, where a state in which a predetermined portion of the given object 21 and a predetermined portion of the different object 22 are in contact and combined with each other is set, an orientation of the contact portion in the different object 22, or orientations of the contact portion in the given object 21 and the contact portion in the different object 22. The contact portion orientation calculation unit 40 calculates a plurality of contact positions at which the given object 21 and the different object 22 come into contact with each other based on the force acting between the given object 21 and the different object 22, to, in turn, calculate an orientation of a portion where the given object 21 and the different object 22 come into contact with each other based on the plurality of calculated contact positions. A rotational force control axis target rotational movement amount calculation unit 36 calculates a target amount of rotational force control axis rotational movement, based on the force acting between the given object 21 and the different object 22, and the orientation of the portion where the given object 21 and the different object 22 come into contact with each other, calculated by the contact portion orientation calculation unit 40.

Differences from the robot controllers 10 according to the first to third embodiments of the present invention will now be mainly described in the fourth embodiment of the present invention. Details which will not be particularly referred to hereinafter are practiced in the same way.

Figure 18A:
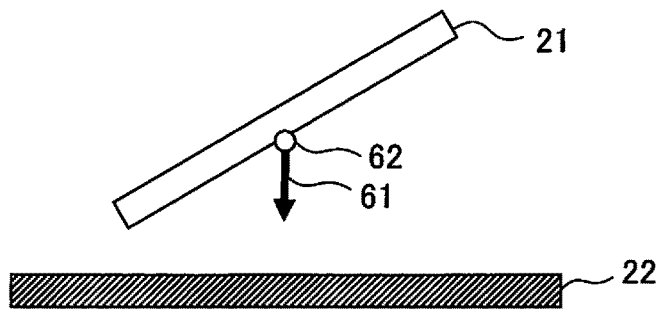
FIGS. 18a to 18e are views illustrating exemplary setting of a combined state.
Figure 18B:
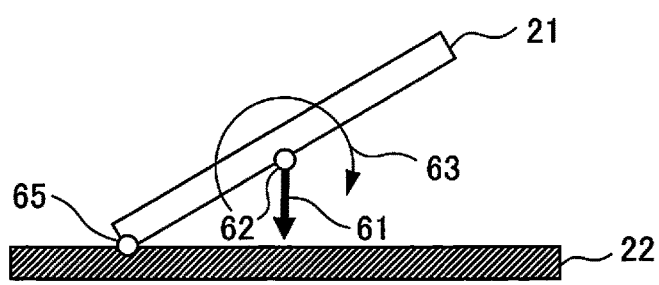

FIGS. 18a to 18e are partial enlarged views illustrating an operation for setting the given object 21 and the different object 22 in a combined state by the robot controller 10 according to the fourth embodiment of the present invention. FIG. 18a illustrates the state at the start of movement to set the given object 21 and the different object 22 in a combined state, a predetermined direction independent of the moving operation of the given object 21 is set as a direction of translational force control 61, and an axis which runs in a predetermined direction independent of the moving operation of the given object 21 and passes through a control point for the given object 21 is set as an axis of rotational force control 62. The direction of translational force control of the given object 21 relative to the different object 22 may be changed, instead of a predetermined direction, as in other embodiments. As the given object 21 is translated relative to the different object 22 in the direction of translational force control 61, as illustrated as FIG. 18a, the given object 21 comes into contact with the different object 22 in the portion of a point of contact 65, as illustrated as FIG. 18b. It is determined whether the given object 21 and the different object 22 have come into contact with each other by comparing the force acting between the given object 21 and the different object 22 in the direction of translational force control with a predetermined threshold. Alternatively, it may be determined whether the given object 21 and the different object 22 have come into contact with each other by comparing the force about the axis of rotational force control 62 with a predetermined threshold or based on a change in force about the axis of rotational force control 62 per predetermined time. The contact portion orientation calculation unit 40 calculates a position at which the given object 21 and the different object 22 come into contact with each other, based on the force acting between the given object 21 and the different object 22. When the robot controller 10 includes a contact position setting unit 39, which calculates a position at which the given object 21 and the different object 22 come into contact with each other, the contact portion orientation calculation unit 40 may calculate a contact position using a calculation unit shared by the contact position setting unit 39.

Figure 18C:
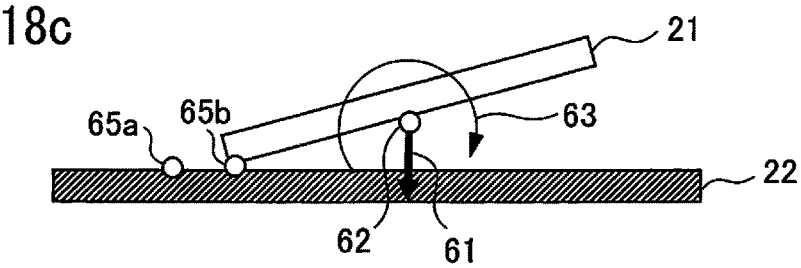

Next, the given object 21 is moved to change the contact position for the different object 22, as illustrated as FIG. 18c. At this time, the given object 21 is moved in the direction of translational force control 61 while rotating it about the axis of rotational force control 62 so that the contact position for the different object 22 changes. In the above-mentioned movement, the given object 21 may be moved relative to the different object 22 in a direction of translation, such as a direction perpendicular to the direction of translational force control 61, so that the contact position for the different object 22 changes. As described in conjunction with the robot controller 10 according to the third embodiment of the present invention, the given object 21 may be moved about an axis of rotational force control, which is set to pass through a predetermined position specified for the given object 21 or the different object 22, such as the position at which the given object 21 and the different object 22 come into contact with each other for the first time, while the given object 21 is moved in another direction of translational force control, which is set to a direction perpendicular to the direction of translational force control 61 or a direction that is not parallel to the direction of translational force control 61, so that the contact position for the different object 22 changes. The given object 21 may be moved by changing the direction of translational force control of the given object 21 relative to the different object 22. A target direction target movement amount calculation unit 37 may calculate a target amount of translational movement for changing the contact position or the direction perpendicular to the direction of translational force control 61, based on the direction of translational force control 61. After the orientation of a portion where the given object 21 and the different object 22 come into contact with each other is calculated by the contact portion orientation calculation unit 40, an operation for moving the given object 21 in a direction of translation other than the direction of translational force control 61 may be stopped, and only an operation for setting a combined state may be performed.

FIG. 18c uses a point of contact 65b to represent the contact position between the given object 21 and the different object 22 at a certain time, and a point of contact 65a to represent the position at which the given object 21 and the different object 22 come into contact with each other for the first time. As described earlier, the given object 21 is moved to change the contact position for the different object 22, so that the orientation of a contact portion in the different object 22, where the given object 21 and the different object 22 are set in a combined state, is calculated based on a plurality of contact positions calculated in this moving operation.

Figure 18D:
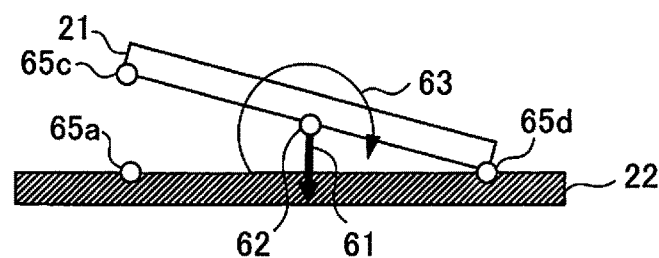

The given object 21 may be moved with rotation so that the contact position for the different object 22 changes and the contact position for the given object 21 changes, as illustrated as FIG. 18d. FIG. 18d uses a point of contact 65d to represent the position where the given object 21 and the different object 22 come into contact with each other, and a point of contact 65a to represent the position at which the given object 21 and the different object 22 come into contact with each other for the first time, depicted as FIG. 18b. As illustrated as FIG. 18b, after the given object 21 and the different object 22 come into contact with each other for the first time, upon rotation at a high velocity in a direction of rotation 63 about the axis of rotational force control 62, an orientation related to a combined state may be passed over, resulting in contact on the opposite side of the axis of rotational force control 62, as depicted as FIG. 18d, upon further rotation. Alternatively, the velocity of rotation about the axis of rotational force control 62 relative to the velocity of movement in the direction of translational force control 61 may be intentionally set high to make contact, as depicted as FIG. 18d.

Figure 18E:
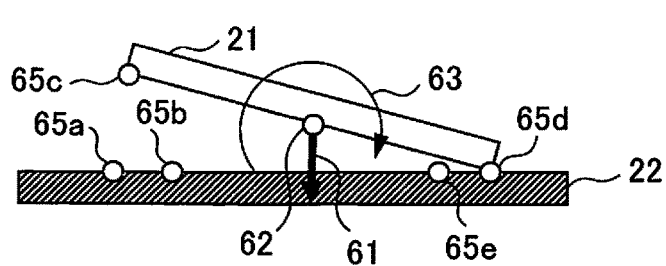

Contact positions may be calculated when a certain portion of the given object 21 is brought into contact with the different object 22 at a plurality of points such as points of contact 65a and 65b, as illustrated as FIG. 18c, and a portion, different from the certain portion, of the given object 21 is then brought into contact with the different object 22 at a plurality of points such as points of contact 65d and 65e, as illustrated as FIG. 18e.

In the above-mentioned manner, contact positions are calculated by moving the given object 21 relative to the different object 22 to bring them into contact with each other. Thus, the orientation of a contact portion in the given object 21, where the given object 21 and the different object 22 come into contact with each other, is calculated from points of contact 65c and 65d for the given object 21. The orientation of a contact portion in the different object 22, where the given object 21 and the different object 22 come into contact with each other, is further calculated from points of contact 65a and 65d for the different object 22 or points of contact 65a, 65b, 65d, and 65e.

As described earlier, the given object 21 is moved to change the contact position between the given object 21 and the different object 22, so that the orientation of a contact portion in the given object 21, which is in a combined state in which a predetermined portion of the given object 21 and a predetermined portion of the different object 22 are in contact and combined with each other and where the given object 21 and the different object 22 come into contact with each other, the orientation of the contact portion in the different object 22, or the orientations of the contact portion in the given object 21 and the contact portion in the different object 22, can be calculated based on a plurality of contact positions calculated in this moving operation.

The rotational force control axis target rotational movement amount calculation unit 36 calculates a target amount of rotational force control axis rotational movement, based on the force acting between the given object 21 and the different object 22, and the orientation of the contact portion, where the given object 21 and the different object 22 come into contact with each other, calculated by the contact portion orientation calculation unit 40, as described earlier. At this time, when a tool coordinate system is set for an end effector 51 of a robot 50 to allow determination of the orientation of the contact portion in the given object 21 with respect to the different object 22, the orientation of the contact portion in the different object 22 is calculated by the contact portion orientation calculation unit 40, and the rotational force control axis target rotational movement amount calculation unit 36 increases the target amount of rotational movement to maintain rapid rotation until the orientation of the contact portion in the given object 21 approaches that of the contact portion in the different object 22, and reduces the target amount of rotational movement after the approach. When a coordinate system is set to allow determination of the orientation of the contact portion in the different object 22, the orientation of the contact portion in the given object 21 is calculated by the contact portion orientation calculation unit 40, and the rotational force control axis target rotational movement amount calculation unit 36 increases the target amount of rotational movement to maintain rapid rotation until the orientation of the contact portion in the given object 21 approaches that of the contact portion in the different object 22, and reduces the target amount of rotational movement after the approach. Further, the orientations of the contact portion in the given object 21 and the contact portion in the given object 21 may be calculated by the contact portion orientation calculation unit 40, and the rotational force control axis target rotational movement amount calculation unit 36 may increase the target amount of rotational movement to maintain rapid rotation until the orientation of the contact portion in the given object 21 approaches that of the contact portion in the different object 22, and reduce the target amount of rotational movement after the approach. When a tool coordinate system is set for the end effector 51 of the robot 50 to allow determination of the orientation of the contact portion in the given object 21, the orientation of the contact portion in the different object 22 may be calculated by the contact portion orientation calculation unit 40 or the orientations of the contact portion in the given object 21 and the contact portion in the different object 22 may be calculated by the contact portion orientation calculation unit 40 to move the orientation so that the given object 21 and the different object 22 are set in a combined state based on the calculated orientation or orientations, and to translate the given object 21 in the direction of translational force control so that the force in the direction of translational force control reaches the translational force control target force, based on the force acting between the given object 21 and the different object 22. When the force acting between the given object 21 and the different object 22 in the direction of translational force control is small or the given object 21 and the different object 22 are not in contact with each other, a target amount of rotational force control axis rotational movement may be calculated based on at least one of the amount of movement in a predetermined direction of rotation, and the translational force control target force in a direction of translational force control that is not parallel to a predetermined axis of rotational force control at this time, until the orientation of the contact portion in the given object 21 approaches that of the contact portion in the different object 22.

When the force acting between the given object 21 and the different object 22 about the axis of rotational force control gets larger due to the difference between an actual orientation and the orientation of the contact portion in the given object 21, the orientation of the contact portion in the different object 22, or the orientations of the contact portion in the given object 21 and the contact portion in the different object 22, calculated as described earlier, it is preferable to stop movement based on the calculated orientation of the portion where the given object 21 and the different object 22 come into contact with each other, and to perform movement using only methods described in other parts of this embodiment.

In this manner, according to the fourth embodiment, the given object 21 is moved to change the contact position for the given object 21 or the different object 22, so that the orientation of the portion where the given object 21 and the different object 22 come into contact with each other is calculated based on a plurality of contact positions calculated in this moving operation. When the position and/or orientation of the given object 21 or the different object 22 varies due to factors other than those of the moving operation of the robot 50, the given object 21 and the different object 22 are preferably moved relative to each other, as described earlier, based on the varying amount of movement, as in other embodiments. As in the setting of planes in a combined state, when axes of rotational force control are set in two directions, the above-mentioned movement is preferably performed about the axis of rotational force control in each direction for a plurality of axes of rotational force control.

As described earlier, when the orientation of the portion where the given object 21 and the different object 22 come into contact with each other in a combined state is calculated and estimated by the contact portion orientation calculation unit 40, it suffices to rapidly move the given object 21 in the direction of translational force control while moving it fast to the obtained orientation. Therefore, the given object 21 and the different object 22 can be stably, quickly set in a combined state. Even when the given object 21 and the different object 22 are pressed against each other with a small force, the given object 21 and the different object 22 can be stably, quickly set in a combined state, regardless of the magnitude of the force in the direction of translational force control or the force about the axis of rotational force control.

Figure 5:
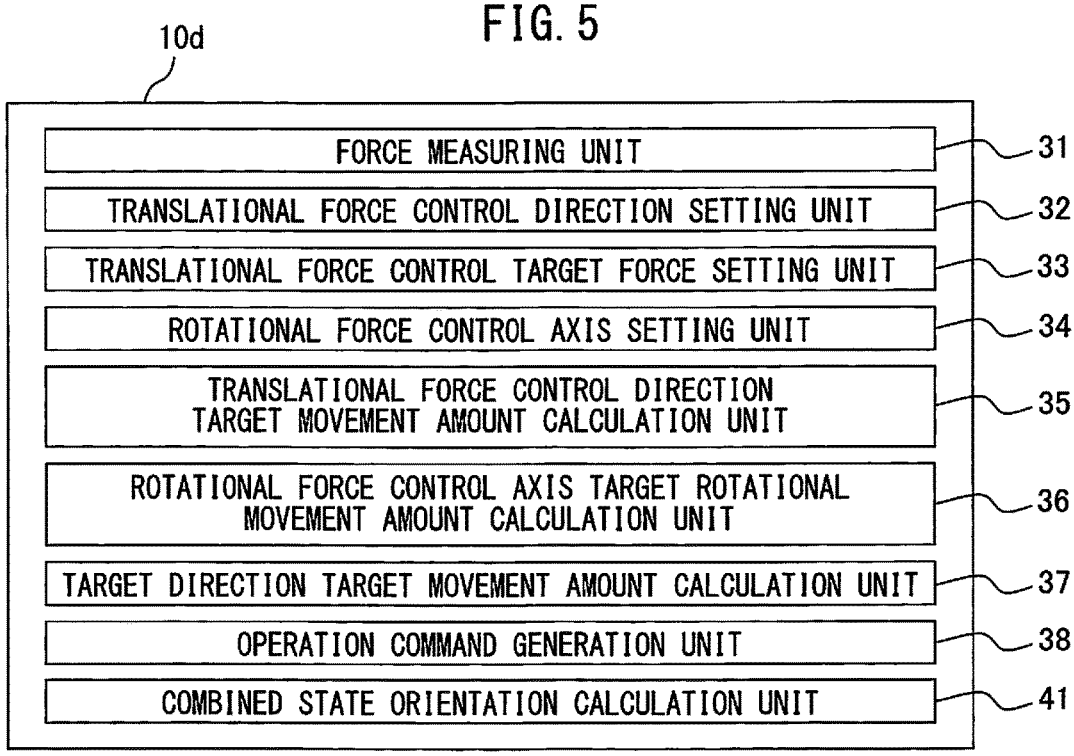
FIG. 5 is a block diagram functionally illustrating the configuration of a robot controller according to still another embodiment of the present invention.

FIG. 5 is a block diagram functionally illustrating the configuration of a robot controller 10d according to a fifth embodiment of the present invention. In the fifth embodiment of the present invention, a combined state orientation calculation unit 41 may be added to the robot controller 10 according to the first embodiment of the present invention to obtain another robot controller configuration. In the fifth embodiment of the present invention, a combined state orientation calculation unit 41 is added to the robot controller 10a, as depicted as FIG. 5. The configuration of a robot controller 10g, depicted as FIG. 8, including functions to be described later may be used. A method for setting a given object 21 and a different object 22 in a combined state by the robot controller 10 including the combined state orientation calculation unit 41 according to the fifth embodiment of the present invention will be described below with reference to FIGS. 19a to 19c.

In the fifth embodiment of the present invention, as an additional feature to the robot controller 10 according to the first embodiment of the present invention, preferably, the robot controller 10 includes a combined state orientation calculation unit 41 which calculates a combined state orientation to set a state in which a predetermined portion of the given object 21 and a predetermined portion of the different object 22 are in contact and combined with each other. When the given object 21 and the different object 22 come into contact with each other, the robot controller 10 stops movement of the given object 21 relative to the different object 22 in the direction of translational force control and obtains an orientation of the given object 21, and then stops movement of the given object 21 relative to the different object 22 in the direction of translational force control and rotates the given object 21 relative to the different object 22 about the axis of rotational force control to obtain an orientation of the given object 21 when the given object 21 and the different object 22 come into contact with each other. The combined state orientation calculation unit 41 calculates a combined state orientation based on the orientation of the given object 21 obtained when the given object 21 and the different object 22 come into contact with each other. A rotational force control axis target rotational movement amount calculation unit 36 calculates a target amount of rotational force control axis rotational movement, based on the force acting between the given object 21 and the different object 22, and the combined state orientation calculated by the combined state orientation calculation unit 41.

Differences from the robot controllers 10 according to the above-mentioned embodiments of the present invention will now be mainly described in the fifth embodiment of the present invention. Details which will not be particularly referred to hereinafter are practiced in the same way.

Figure 19A:
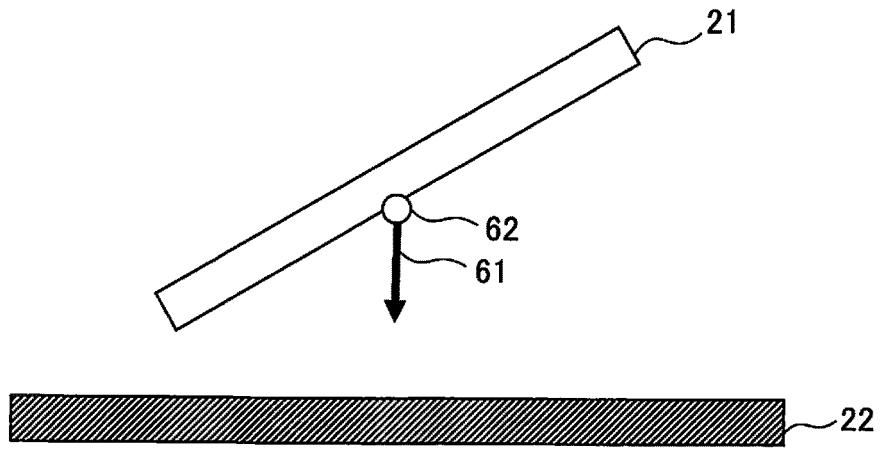
FIGS. 19a to 19c are views illustrating exemplary setting of a combined state.
Figure 19B:
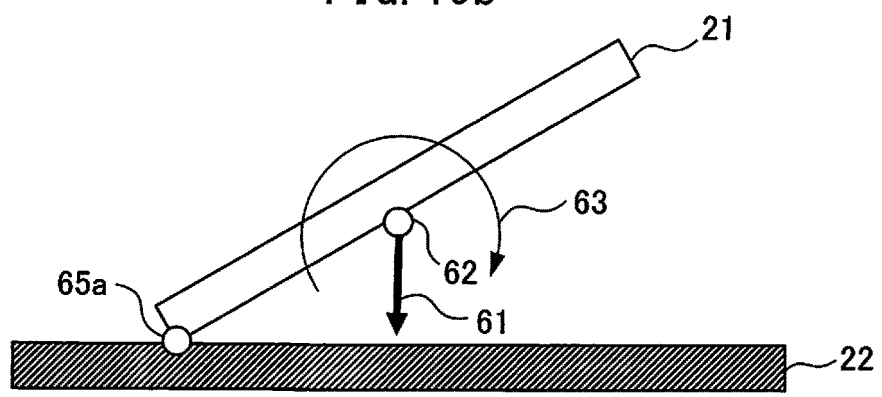
Figure 19C:
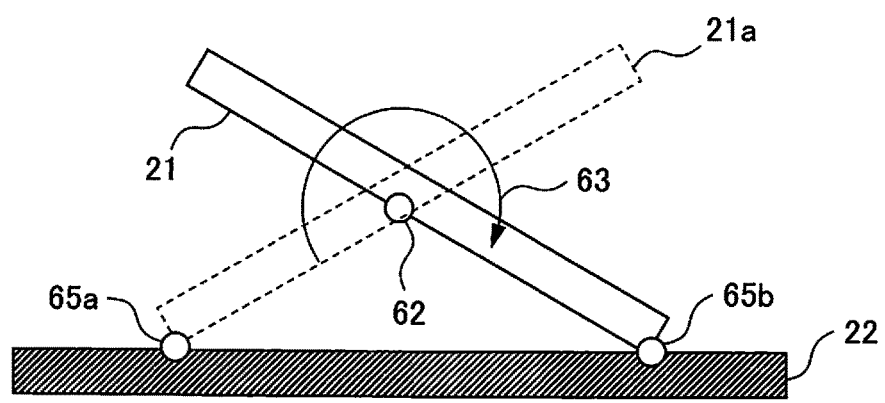

FIGS. 19a to 19c are partial enlarged views illustrating an operation for setting the given object 21 and the different object 22 in a combined state by the robot controller 10 according to the fifth embodiment of the present invention. FIG. 19a illustrates the state at the start of movement to set the given object 21 and the different object 22 in a combined state, a predetermined direction independent of the moving operation of the given object 21 is set as a direction of translational force control 61, and an axis which runs in a predetermined direction independent of the moving operation of the given object 21 and passes through a control point for the given object 21 is set as an axis of rotational force control 62. As the given object 21 is translated in the direction of translational force control 61, as illustrated as FIG. 19a, the given object 21 and the different object 22 come into contact with each other in the portion of a point of contact 65a, as illustrated as FIG. 19b. It is determined whether the given object 21 and the different object 22 have come into contact with each other by comparing the force acting between the given object 21 and the different object 22 in the direction of translational force control with a predetermined threshold. Alternatively, it may be determined whether the given object 21 and the different object 22 have come into contact with each other by comparing the force about the axis of rotational force control 62 with a predetermined threshold or based on a change in force about the axis of rotational force control 62 per predetermined time. When the given object 21 and the different object 22 come into contact with each other, the robot controller 10 stops movement of the given object 21 relative to the different object 22 in the direction of translational force control and obtains the orientation of the given object 21. An orientation in a coordinate system which stays the same even upon movement of the given object 21, such as a coordinate system set for the different object 22, a coordinate system set for a space, or a coordinate system set for a robot pedestal 52, is obtained as the orientation of the given object 21 in this moving operation. When the different object 22 moves, an orientation in a coordinate system set for the different object 22 may be obtained. Again, when the different object 22 moves, the orientation in the coordinate system may be corrected in consideration of the amount of movement.

At the stop of movement of the given object 21 relative to the different object 22 in the direction of translational force control, the target amount of translational force control direction movement calculated by a translational force control direction target movement amount calculation unit 35 is adjusted to zero so that the target amount of translational force control direction movement of the given object 21 relative to the different object 22 becomes zero. At this time, when the target amount of translational force control direction movement of the given object 21 relative to the different object 22 is zero, but the position and/or orientation of the given object 21 or the different object 22 varies due to factors other than those of the moving operation of a robot 50, a target direction target movement amount calculation unit 37 preferably calculates an amount of movement to translate the given object 21, based on the varying amount of movement, as in other embodiments. Subsequently, the robot controller 10 adjusts the target amount of translational force control direction movement calculated by the translational force control direction target movement amount calculation unit 35 to zero so that the target amount of translational force control direction movement of the given object 21 relative to the different object 22 becomes zero, and calculates a target amount of rotational force control axis rotational movement using the rotational force control axis target rotational movement amount calculation unit 36 to rotate the given object 21 relative to the different object 22 about the axis of rotational force control. As illustrated as FIG. 19b, rotation is performed in a direction of rotation 63 by obtaining a direction of rotation based on the force about the axis of rotational force control when the given object 21 and the different object 22 come into contact with each other. In this case, the rotational force control axis target rotational movement amount calculation unit 36 calculates a target amount of rotational force control axis rotational movement, based on at least one of the amount of movement in a predetermined direction of rotation, and the translational force control target force in a direction of translational force control that is not parallel to a predetermined axis of rotational force control at this time. When this is done based on the translational force control target force, the product of the translational force control target force multiplied by a predetermined coefficient is calculated as an amount of rotational movement. Alternatively, as a target amount of rotational movement, the amount of movement in a predetermined direction of rotation or the product of the translational force control target force multiplied by a predetermined coefficient may be selectively used, a value calculated as their weighted sum may be set, or the calculated value may be adjusted in accordance with the state of vibration of the moving operation of the robot 50 and set.

When the given object 21 in the state depicted as FIG. 19b is not translated in the direction of translational force control 61 but is rotated only in the direction of rotation 63 about the axis of rotational force control 62, the given object 21 and the different object 22 come into contact with each other in the portion of a point of contact 65b, as illustrated as FIG. 19c. It is determined whether the given object 21 and the different object 22 have come into contact with each other by comparing the force acting between the given object 21 and the different object 22 in the direction of translational force control with a predetermined threshold. Alternatively, it may be determined whether the given object 21 and the different object 22 have come into contact with each other by comparing the force about the axis of rotational force control 62 with a predetermined threshold or based on a change in force about the axis of rotational force control 62 per predetermined time. As illustrated as FIG. 19c, when the given object 21 and the different object 22 come into contact with each other, the robot controller 10 stops rotation of the given object 21 relative to the different object 22 in the direction of rotation 63 about the axis of rotational force control 62 and obtains the orientation of the given object 21. An orientation in a coordinate system set for the different object 22, a coordinate system set for a space, or a coordinate system set for the robot pedestal 52, is obtained as the orientation of the given object 21 in this moving operation. When the different object 22 moves, an orientation in a coordinate system set for the different object 22 may be obtained. Again, when the different object 22 moves, the orientation in the coordinate system may be corrected in consideration of the amount of movement. When the robot controller 10 stops rotation of the given object 21 relative to the different object 22 in the direction of rotation about the axis of rotational force control 62, the robot controller 10 adjusts the target amount of rotational force control axis rotational movement calculated by the rotational force control axis target rotational movement amount calculation unit 36 to zero so that the target amount of movement of the given object 21 relative to the different object 22 about the axis of rotational force control 62 becomes zero. At this time, when the target amount of rotational force control axis rotational movement of the given object 21 relative to the different object 22 is zero, but the position and/or orientation of the given object 21 or the different object 22 varies due to factors other than those of the moving operation of the robot 50, the target direction target movement amount calculation unit 37 preferably calculates an amount of movement to rotate the given object 21, based on the varying amount of movement, as in other embodiments.

The combined state orientation calculation unit 41 calculates a combined state orientation based on the orientation of the given object 21 obtained when the given object 21 and the different object 22 come into contact with each other, as described earlier. In the case illustrated as FIGS. 19a to 19c, when the position of the axis of rotational force control 62 stays the same, an intermediate orientation of two orientations calculated based on the orientation of a given object 21a when the given object 21 and the different object 22 come into contact with each other at the point of contact 65a, and the orientation of the given object 21 when the given object 21 and the different object 22 come into contact with each other at the point of contact 65b, as depicted as FIG.

19c, is set as a combined state orientation to set the given object 21 and the different object 22 in a combined state.

After calculation of a combined state orientation, to restart translation of the given object 21 relative to the different object 22 in the direction of translational force control 61, the translational force control direction target movement amount calculation unit 35 calculates a target amount of translational force control direction movement, based on the force acting between the given object 21 and the different object 22, as described in the embodiment of the present invention, without adjusting the target amount of translational force control direction movement to zero. The rotational force control axis target rotational movement amount calculation unit 36 calculates a target amount of rotational force control axis rotational movement, based on the force acting between the given object 21 and the different object 22, and the combined state orientation calculated by the combined state orientation calculation unit 41. At this time, the target amount of rotational force control axis rotational movement is calculated to be larger until the orientation of the given object 21 approaches the combined state orientation, and is calculated to be smaller after the orientation of the given object 21 approaches the combined state orientation. When the force acting between the given object 21 and the different object 22 in the direction of translational force control is small or the given object 21 and the different object 22 are not in contact with each other, a target amount of rotational force control axis rotational movement may be calculated based on at least one of the amount of movement in a predetermined direction of rotation, and the translational force control target force in a direction of translational force control that is not parallel to a predetermined axis of rotational force control at this time, until the orientation of the given object 21 approaches the combined state orientation. During rotation about the axis of rotational force control based on the combined state orientation, when the force acting between the given object 21 and the different object 22 about the axis of rotational force control gets larger due to the difference between an actual combined state orientation and the combined state orientation calculated in the aforementioned way, movement is preferably performed using methods described in other embodiments of the present invention, instead of movement based on the combined state orientation.

When the position and/or orientation of the given object 21 or the different object 22 varies due to factors other than those of the moving operation of the robot 50, the orientation of the given object 21 relative to the different object 22 when the given object 21 and the different object 22 come into contact with each other is preferably calculated based on the varying amount of movement. Again, as in other embodiments, when the position and/or orientation of the given object 21 or the different object 22 varies due to factors other than those of the moving operation of the robot 50, the amount of movement of the given object 21 relative to the different object 22 is preferably calculated based on the varying amount of movement.

As described earlier, when a combined state orientation to set the given object 21 and the different object 22 in a combined state is calculated and estimated by the combined state orientation calculation unit 41, an approximate target orientation can be determined. Therefore, the given object 21 and the different object 22 can be stably, quickly set in a combined state by rapidly moving the given object 21 in the direction of translational force control while moving it fast to the obtained orientation. The given object 21 and the different object 22 can be stably, quickly set in a combined state, regardless of the magnitude of the force in the direction of translational force control or the force about the axis of rotational force control.

In a sixth embodiment of the present invention, as an additional feature to the robot controllers 10 according to the first to fifth embodiments of the present invention, preferably, in calculating a target amount of movement about an axis of rotational force control that is not parallel to one of the directions of translational force control set by a translational force control direction setting unit 32, upon defining as a first contact state, the state in which the force acting between a given object 21 and a different object 22 in the direction of translational force control that is not parallel to the axis of rotational force control is smaller than a second predetermined threshold for the force in the direction of translational force control, or the force acting between the given object 21 and the different object 22 about the axis of rotational force control is smaller than a predetermined threshold A for the force about the axis of rotational force control, and upon defining as a second contact state, the state in which the force acting between the given object 21 and the different object 22 in the direction of translational force control that is not parallel to the axis of rotational force control is equal to or greater than the second predetermined threshold for the force in the direction of translational force control, and the force acting between the given object 21 and the different object 22 about the axis of rotational force control is equal to or greater than the predetermined threshold A for the force about the axis of rotational force control, a rotational force control axis target rotational movement amount calculation unit 36 in a robot controller 10 calculates the target amount of rotational force control axis rotational movement as zero when the first contact state has been set and no shift from the second contact state to the first contact state is made, calculates the target amount of rotational force control axis rotational movement as zero, or calculates a target amount of rotational force control axis rotational movement, based on the direction and amount of movement about the axis of rotational force control in the second contact state until a shift to the first contact state is made, when a shift from the second contact state to the first contact state is made, and calculates the target amount of rotational force control axis rotational movement when a shift to the second contact state is made, based on the sign of the force about the axis of rotational force control, and at least one of a predetermined amount of rotational movement A, the translational force control target force in the direction of translational force control that is not parallel to the axis of rotational force control, and the force in the direction of translational force control that is not parallel to the axis of rotational force control.

Differences from the robot controllers 10 according to the first to fifth embodiments of the present invention will now be mainly described in the sixth embodiment of the present invention. Details which will not be particularly referred to hereinafter are practiced in the same way.

As for a predetermined axis of rotational force control that is not parallel to one of the directions of translational force control set by the translational force control direction setting unit 32, the given object 21 and the different object 22 are pressed against each other in the direction of translational force control that is not parallel to the axis of rotational force control to generate a force about the axis of rotational force control so that the given object 21 and the different object 22 can be rotated relative to each other based on the generated force about the axis.

A second predetermined threshold for the force in the direction of translational force control can be used to determine that the force acting between the given object 21 and the different object 22 in the direction of translational force control is too small to keep them in contact. The second predetermined threshold can further be used to determine that, because of the insufficient force acting between the given object 21 and the different object 22 in the direction of translational force control, the force about the axis of rotational force control is too small to allow rotation based on this force about the axis. A predetermined threshold A for the force about the axis of rotational force control can be used to determine that the force acting between the given object 21 and the different object 22 about the axis of rotational force control is too small to allow rotation based on this force about the axis, or that the given object 21 and the different object 22 are in contact with each other and the force about the axis of rotational force control has reached an equilibrium or a nearly equilibrium state. The predetermined threshold A for the force about the axis of rotational force control may be set based on the force acting between the given object 21 and the different object 22 about the axis of rotational force control during a predetermined time after the given object 21 and the different object 22 come into contact with each other in the direction of translational force control.

The second predetermined threshold for the force in the direction of translational force control may be equal to the first predetermined threshold for the force in the direction of translational force control. The second predetermined threshold for the force in the direction of translational force control may be set to a value different from the first predetermined threshold for the force in the direction of translational force control, and may be set to a value suitable for calculating a target amount of rotational force control axis rotational movement by the rotational force control axis target rotational movement amount calculation unit 36. The second predetermined threshold for the force in the direction of translational force control may be set larger than the first predetermined threshold for the force in the direction of translational force control to reduce the second predetermined threshold for the force in the direction of translational force control and confirm that the force about the axis of rotational force control is sufficient. Since the force about the axis of rotational force control is confirmed using the predetermined threshold A for the force about the axis of rotational force control, the second predetermined threshold for the force in the direction of translational force control may be set smaller than the first predetermined threshold for the force in the direction of translational force control. The second predetermined threshold for the force in the direction of translational force control is preferably set in consideration of, e.g., noise produced in the force in the direction of translational force control, vibration upon the moving operation of a robot 50, and vibration upon force control.

When the predetermined threshold A for the force about the axis of rotational force control is set large, the direction of rotation to move can be more precisely determined to allow movement in an appropriate direction about the axis of rotational force control. However, when the force about the axis of rotational force control reduces and frequently falls below the above-mentioned predetermined threshold, movement may not be performed based on the force about the axis of rotational force control, resulting in inappropriate rotation. When the predetermined threshold A for the force about the axis of rotational force control is set small, movement can be performed based on the force about the axis of rotational force control even if the force about the axis of rotational force control is small. However, the direction of movement or the like may often be improperly determined, resulting in inappropriate rotation.

In this manner, the predetermined threshold A for the force about the axis of rotational force control is preferably set in consideration of, e.g., noise produced in the force about the axis of rotational force control, vibration upon the moving operation of the robot 50, and vibration upon force control. When movement is performed based on the force about the axis of rotational force control, frequent reversal of the positive or negative sign of the force about the axis of rotational force control may hinder appropriate determination of the direction of rotation about the axis of rotational force control, or lead to an oscillating operation upon movement of the robot 50 due to erroneous use of forces suffering from vibration or noise. Therefore, rotation is preferably performed about the axis of rotational force control, based on the force about the axis of rotational force control processed by appropriately setting such a predetermined threshold. When the contact state between the given object 21 and the different object 22 is determined based on the force acting between the given object 21 and the different object 22, and especially when the contact state between the given object 21 and the different object 22 is determined based on the value of a small force about the axis of rotation, appropriate filtering and estimation processing for the force data, value adjustment based on an appropriate predetermined threshold, and the like are preferably performed to appropriately cope with noise or an abrupt change in value to determine how the force about the axis of rotational force control acts based on such force data.

The first contact state means the state in which the given object 21 and the different object 22 are in a non-contact state or an inappropriate contact state in the direction of translational force control, that in which the given object 21 and the different object 22 are in contact with each other in the direction of translational force control, but the force acting between the given object 21 and the different object 22 about the axis of rotational force control is small, or that in which the given object 21 and the different object 22 are in contact with each other in the direction of translational force control, and the forces about the axis of rotational force control are in equilibrium.

The second contact state means the state in which the given object 21 and the different object 22 are in contact with each other in the direction of translational force control, and the force acting between the given object 21 and the different object 22 about the axis of rotational force control is relatively large and larger than a predetermined value, so that the given object 21 and the different object 22 can be rotated relative to each other based on the force about the axis of rotational force control.

When the first contact state has been set and no shift from the second contact state to the first contact state is made, this means that, for example, the force acting between the given object 21 and the different object 22 about the axis of rotational force control is too small to allow appropriate rotation of the given object 21 based on the force about the axis of rotational force control, and the given object 21 and the different object 22 have not yet come into contact with each other. When the first contact state has been set and no shift from the second contact state to the first contact state is made, the rotational force control axis target rotational movement amount calculation unit 36 calculates the target amount of rotational force control axis rotational movement as zero so as not to allow rotation about a predetermined axis of rotational force control.

When a shift from the second contact state to the first contact state is made, this means that, for example, a force about the axis of rotational force control is generated upon contact between the given object 21 and the different object 22, and rotation about the axis of rotational force control causes a state in which the given object 21 and the different object 22 are in a non-contact state or an inappropriate contact state, that in which the given object 21 and the different object 22 are in contact with each other in the direction of translational force control, but the force acting between the given object 21 and the different object 22 about the axis of rotational force control is small, or that in which the given object 21 and the different object 22 are in contact with each other in the direction of translational force control, and the forces about the axis of rotational force control are in equilibrium.

When a shift from the second contact state to the first contact state is made, the rotational force control axis target rotational movement amount calculation unit 36 calculates the target amount of rotational force control axis rotational movement as zero so as not to allow rotation about the axis of rotational force control. When a shift is made from the first contact state to the state in which the given object 21 and the different object 22 are in contact with each other in the direction of translational force control, and the forces about the axis of rotational force control are in equilibrium, it is preferable not to perform rotation about the axis of rotational force control. When it is difficult to estimate how to move after the previous moving operation and perform movement, or it unexpectedly takes much time to set a combined state due to rotation in excess of an appropriate amount of movement, it is preferable not to perform rotation.

Alternatively, when a shift from the second contact state to the first contact state is made, an amount of movement may be calculated by estimating how to move after the previous moving operation, based on the direction and amount of movement about the axis of rotational force control in the second contact state until a shift to the first contact state is made when a force about the axis of rotational force control is generated upon contact between the given object 21 and the different object 22, and rotation is performed about the axis of rotational force control. At this time, the direction and amount of movement in the next control cycle are estimated and calculated from the direction and amount of movement for the previous rotational movement. When the amount of rotational movement is large at this time, it may take much time to converge the given object 21 and the different object 22 to a combined state. Calculation is therefore preferably done by adjustment to an appropriate small amount of movement. When the given object 21 and the different object 22 are in a non-contact state or an insufficient contact state in the first contact state, and the velocity of movement in the direction of translational force control is high, so that, even when the first contact state is set, a shift from the first contact state to the second contact state is immediately made again, the given object 21 and the different object 22 can be set in a combined state in a shorter period of time by the aforementioned movement while the first contact state is maintained.

In the second contact state, the given object 21 and the different object 22 are in contact with each other in the direction of translational force control, and the force acting between the given object 21 and the different object 22 about the axis of rotational force control is relatively large and larger than a predetermined value, so that the given object 21 and the different object 22 can be rotated relative to each other based on the force about the axis of rotational force control.

When the difference between the force about the axis of rotational force control and the target force about the axis of rotational force control is multiplied by a force control gain to calculate an amount of relative rotational movement between the given object 21 and the different object 22, the target force about the axis of rotational force control is set to zero or a small value close to zero to set the given object 21 and the different object 22 in a combined state. When the target force about the axis of rotational force control is set to zero, the given object 21 is passively rotated in accordance with the force about the axis of rotational force control.

When the given object 21 and the different object 22 are set in a combined state in accordance with the force acting between the given object 21 and the different object 22 about the axis of rotational force control, rotation about the axis of rotational force control speeds up or slows down depending on the magnitude of the force about the axis of rotation, because the force about the axis of rotational force control varies when the given object 21 and the different object 22 come into contact with each other, according to circumstances associated with, e.g., the relationship in relative position and orientation between the given object 21 and the different object 22 obtained for the first time, and the sizes, shapes, and materials of the given object 21 and the different object 22.

When the force in the direction of translational force control is small or the distance between the axis of rotation and the contact position is small, the force about the axis of rotation is also small. Since the magnitude of the force about the axis of rotation depends on the force in the direction of translational force control and the distance from the point of action of force to the axis of rotation, fluctuations in position at which the given object 21 and the different object 22 come into contact with each other, fluctuations in force in the direction of translational force control, vibration upon movement of the robot 50, or vibration upon force control may more likely to cause noise and significant fluctuations, resulting in frequent sign reversal. When the given object 21 and the different object 22 are set in a combined state, the force in the direction of translational force control is controlled to reach a target force having a predetermined value, while the forces about the axis of rotational force control are controlled to be equilibrated to zero in the contact state. The above-mentioned variations in force about the axis of rotational force control may frequently change the force sign. When significant noise is produced in the force about the axis of rotational force control, the force fluctuates considerably, or the force sign frequently reverses, oscillation is more likely to occur when the force about the axis of rotational force control is multiplied by a force control gain and the robot 50 is moved, so the force control gain may not be set considerably high. Since the force about the axis of rotational force control is generally small, a method for multiplying the difference between the force about the axis of rotational force control and the target force by a force control gain may be insufficient to raise the velocity of movement about the axis of rotational force control.

As described earlier, in a method for multiplying the force about the axis of rotational force control by a force control gain to calculate an amount of relative rotational movement between the given object 21 and the different object 22, it may be difficult to stably, quickly reduce the translational force control target force to set a combined state.

Under the circumstances, the sign of a force about the axis of rotational force control having a magnitude equal to or greater than a predetermined threshold is used for the force about the axis of rotational force control, and an amount of movement about the axis of rotational force control is calculated based on more stable values or information.

In the second contact state, the direction of rotation about the axis of rotational force control is obtained based on the sign of the force about the axis of rotational force control to, in turn, obtain the sign of the amount of movement. The amount of rotational movement about the axis of rotational force control is calculated based on the predetermined amount of rotational movement A. The use of not variant values such as the force about the axis of rotational force control but a predetermined value allows stable movement. The velocity of rotation can be set to a desired velocity using a predetermined amount of movement.

Alternatively, based on the translational force control target force in a direction of translational force control that is not parallel to the axis of rotational force control, the magnitude of the translational force control target force is multiplied by a predetermined coefficient or the like to calculate an amount of movement about the axis of rotational force control. This makes it possible to adjust the amount of movement about the axis of rotational force control in accordance with the translational force control target force.

Alternatively again, based on the force in a direction of translational force control that is not parallel to the axis of rotational force control, the force in the direction of translational force control is multiplied by a predetermined coefficient or the like to calculate an amount of movement about the axis of rotational force control. This makes it possible to adjust the amount of movement about the axis of rotational force control in accordance with the force in the direction of translational force control.

Alternatively again, an amount of movement about the axis of rotational force control may be calculated by obtaining the weighted sum of values calculated in the above-mentioned way or selecting and summing such values. Assume that the product of a predetermined amount of rotational movement A multiplied by a specific coefficient is calculated as an amount of movement about the axis of rotational force control, using the predetermined amount of rotational movement A, the translational force control target force in a direction of translational force control that is not parallel to the axis of rotational force control, and the force in the direction of translational force control that is not parallel to the axis of rotational force control. Then, when the force in the direction of translational force control is close to the translational force control target force, the specific coefficient may be adjusted to be larger to, in turn, adjust the amount of movement about the axis of rotational force control. Thus, when the difference between the force acting between the given object 21 and the different object 22 and the translational force control target force is large, it can be determined that no stable state has been obtained, and movement about the axis of rotational force control is slowed down; or when this difference is small, it can be determined that a stable state has been obtained, and movement about the axis of rotational force control is speeded up.

In the second contact state, a target amount of rotational force control axis rotational movement is calculated using the direction of rotation about the axis of rotational force control calculated in the above-mentioned way, and the amount of rotational movement about the axis of rotational force control.

As described earlier, the use of not the magnitude of the force about the axis of rotational force control but a value which allows more stable calculation of an amount of rotational movement achieves stable, quick rotation.

In a seventh embodiment of the present invention, as an additional feature to the robot controllers 10 according to the first to fifth embodiments of the present invention, preferably, in calculating a target amount of movement about an axis of rotational force control that is not parallel to one of the directions of translational force control set by a translational force control direction setting unit 32, upon defining as a first contact state, the state in which the force acting between a given object 21 and a different object 22 in the direction of translational force control that is not parallel to the axis of rotational force control is smaller than a second predetermined threshold for the force in the direction of translational force control, or the force acting between the given object 21 and the different object 22 about the axis of rotational force control is smaller than a predetermined threshold A for the force about the axis of rotational force control, and upon defining as a second contact state, the state in which the force acting between the given object 21 and the different object 22 in the direction of translational force control that is not parallel to the axis of rotational force control is equal to or greater than the second predetermined threshold for the force in the direction of translational force control, and the force acting between the given object 21 and the different object 22 about the axis of rotational force control is equal to or greater than the predetermined threshold A for the force about the axis of rotational force control, a rotational force control axis target rotational movement amount calculation unit 36 in a robot controller 10 calculates the target amount of rotational force control axis rotational movement as zero when the first contact state has been set and no shift from the second contact state to the first contact state is made, calculates the target amount of rotational force control axis rotational movement as zero, or calculates a target amount of rotational force control axis rotational movement, based on the direction and amount of movement about the axis of rotational force control in the second contact state until a shift to the first contact state is made, when a shift from the second contact state to the first contact state is made, and calculates the target amount of rotational force control axis rotational movement when a shift to the second contact state is made, based on the force about the axis of rotational force control, the force about the axis of rotational force control and the maximum value of the force about the axis of rotational force control under a predetermined condition in controlling the force acting between the given object 21 and the different object 22, or a predetermined amount of rotational movement B, the force about the axis of rotational force control, and the maximum value of the force about the axis of rotational force control under a predetermined condition in controlling the force acting between the given object 21 and the different object 22.

Differences from the robot controllers 10 according to the first to fifth embodiments of the present invention will now be mainly described in the seventh embodiment of the present invention. Details which will not be particularly referred to hereinafter are practiced in the same way.

When the first contact state has been set and no shift from the second contact state to the first contact state is made or a shift from the second contact state to the first contact state is made, a target amount of rotational force control axis rotational movement is calculated in the same way as when the first contact state has been set and no shift from the second contact state to the first contact state is made or a shift from the second contact state to the first contact state is made in the robot controller 10 according to the sixth embodiment of the present invention.

In the second contact state, the given object 21 and the different object 22 are in contact with each other in the direction of translational force control, and the force acting between the given object 21 and the different object 22 about the axis of rotational force control is relatively large and larger than a predetermined value, and a target amount of rotational force control axis rotational movement may be calculated to rotate the given object 21 and the different object 22 relative to each other, based on the force about the axis of rotational force control.

When the difference between the force about the axis of rotational force control and the target force about the axis of rotational force control is multiplied by a force control gain to calculate an amount of relative rotational movement between the given object 21 and the different object 22, the target force about the axis of rotational force control is set to zero or a small value close to zero to set the given object 21 and the different object 22 in a combined state. When the target force about the axis of rotational force control is set to zero, the given object 21 is passively rotated in accordance with the force about the axis of rotational force control.

When the force about the axis of rotational force control is large and unstable, when a nearly combined state is set and movement is preferably performed in accordance with the magnitude of the force about the axis of rotational force control, or when appropriate estimation and filtering processing is performed for the force data about the axis of rotational force control to perform adjustment to an appropriate value, a target amount of rotational force control axis rotational movement is preferably calculated based on the force about the axis of rotational force control, in consideration of the magnitude of the force about the axis of rotational force control as well.

By taking the magnitude of the force about the axis of rotational force control into consideration, the amount of rotational movement about the axis of rotational force control can be appropriately adjusted as the combined state is approached more closely, without moving the given object 21 and the different object 22 past a combined state, to achieve smooth convergence to the combined state.

When the force acting between the given object 21 and the different object 22 about the axis of rotational force control is multiplied by a force control gain, this is preferably done such that when the force about the axis of rotational force control is as large as a predetermined upper limit or more, this force is adjusted to the predetermined upper limit, and when the force about the axis of rotational force control is as small as less than a predetermined lower limit, this force is adjusted to the predetermined lower limit.

When the conditions under which the given object 21 and the different object 22 come into contact with each other are known to a certain extent, or the translational force control target force is large, a predetermined upper or lower limit for setting the force about the axis of rotational force control to a predetermined value is preferably set based on the translational force control target force or assumed situations. The above-mentioned predetermined lower limit may be equal to the predetermined threshold A for the force about the axis of rotational force control.

In the second contact state, a target amount of rotational force control axis rotational movement may be calculated based on the force acting between the given object 21 and the different object 22 about the axis of rotational force control, and the maximum value of the force about the axis of rotational force control under a predetermined condition in controlling the force acting between the given object 21 and the different object 22.

The above-mentioned predetermined upper or lower limit may be obtained by multiplying, by a predetermined coefficient, the maximum value of the force about the axis of rotational force control under a predetermined condition in controlling the force acting between the given object 21 and the different object 22. This makes it possible to set a predetermined upper or lower limit in accordance with the conditions under which the given object 21 and the different object 22 come into contact with each other.

The force about the axis of rotational force control or the maximum value of the force about the axis of rotational force control is preferably obtained based on a value calculated by executing appropriate estimation and filtering processing for the force data about the axis of rotational force control to remove abruptly changed values or outliers such as unusually large or small for other values or perform adjustment to an appropriate value.

Examples of the maximum value of the force about the axis of rotational force control under the above-mentioned predetermined condition may include: the maximum value of the force about the axis of rotational force control obtained until the current time in controlling the force acting between the given object 21 and the different object 22; the maximum value of the force about the axis of rotational force control when the force acting between the given object 21 and the different object 22 in a direction of translational force control that is not parallel to the axis of rotational force control becomes equal to or greater than a predetermined threshold or a second predetermined threshold for the force in the direction of translational force control for the first time; the maximum value of the force about the axis of rotational force control obtained during a predetermined time after the elapse of another predetermined time when the force acting between the given object 21 and the different object 22 in a direction of translational force control that is not parallel to the axis of rotational force control becomes equal to or greater than a predetermined threshold or a second predetermined threshold for the force in the direction of translational force control for the first time; the maximum value of the force about the axis of rotational force control obtained when the force acting between the given object 21 and the different object 22 in a direction of translational force control that is not parallel to the axis of rotational force control becomes equal to or greater than a predetermined threshold or a second predetermined threshold for the force in the direction of translational force control until the current time; the maximum value of the force about the axis of rotational force control obtained when the force acting between the given object 21 and the different object 22 about the axis of rotational force control becomes equal to or greater than a predetermined threshold for the first time; the maximum value of the force about the axis of rotational force control obtained during a predetermined time after the elapse of another predetermined time when the force acting between the given object 21 and the different object 22 about the axis of rotational force control becomes equal to or greater than a predetermined threshold for the first time; and the maximum value of the force about the axis of rotational force control obtained when the force acting between the given object 21 and the different object 22 about the axis of rotational force control becomes equal to or greater than a predetermined threshold until the current time.

When an amount of rotational movement is calculated based on the product of the force acting between the given object 21 and the different object 22 about the axis of rotational force control multiplied by a force control gain, the maximum value of the force about the axis of rotational force control obtained under any of the above-mentioned predetermined conditions may be multiplied by a coefficient to calculate predetermined upper and lower limits, and the value of the force about the axis of rotational force control adjusted using the calculated predetermined upper and lower limits may be multiplied by a force control gain.

When the force acting between the given object 21 and the different object 22 about the axis of rotational force control is multiplied by a force control gain, a value adjusted by dividing the force about the axis of rotational force control by the maximum value of the force about the axis of rotational force control obtained under any of the above-mentioned predetermined conditions, as well as adjustment using predetermined upper and lower limits, may be multiplied by a force control gain.

In this manner, the value of the force about the axis of rotational force control adjusted using the maximum value of the force about the axis of rotational force control obtained under the predetermined condition is multiplied by a force control gain to calculate a target amount of rotational force control axis rotational movement. This makes it possible to adjust the target amount of rotational force control axis rotational movement to an appropriate value in accordance with the conditions under which the given object 21 and the different object 22 come into contact with each other and, in turn, to prevent too much movement or movement in unintended directions.

In the second contact state, a target amount of rotational force control axis rotational movement may be calculated based on the predetermined amount of rotational movement B, the force acting between the given object 21 and the different object 22 about the axis of rotational force control, and the maximum value of the force about the axis of rotational force control under a predetermined condition in controlling the force acting between the given object 21 and the different object 22.

A predetermined amount of movement in the direction of rotation is set as a predetermined amount of rotational movement B in the robot controller 10 according to the seventh embodiment of the present invention. A value given by a specific constant, or the sum of the values obtained by multiplying, by a weighting factor, a value given by a specific constant and the product of the target force to press in a direction of translational force control that is not parallel to the axis of rotational force control multiplied by a predetermined coefficient may be set as a predetermined amount of rotational movement B.

The predetermined amount of rotational movement B may be multiplied by the quotient of the current force about the axis of rotational force control divided by the maximum value of the force about the axis of rotational force control obtained under the predetermined condition, as described earlier, to calculate a target amount of rotational force control axis rotational movement.

The sum of the values obtained by multiplying, by a weighting factor, the predetermined amount of rotational movement B and the product of the value of the force about the axis of rotational force control adjusted using the maximum value of the force about the axis of rotational force control obtained under the predetermined condition, as described earlier, multiplied by a force control gain, may be calculated as a target amount of rotational force control axis rotational movement.

The sum of the values obtained by multiplying, by a weighting factor, the product of the value of the force about the axis of rotational force control adjusted using the maximum value of the force about the axis of rotational force control obtained under the predetermined condition, as described earlier, multiplied by a force control gain, and the product of the predetermined amount of rotational movement B multiplied by the quotient of the current force about the axis of rotational force control divided by the maximum value of the force about the axis of rotational force control under the predetermined condition, as described earlier, may be calculated as a target amount of rotational force control axis rotational movement.

As described earlier, a target amount of rotational force control axis rotational movement is calculated based on a predetermined amount of rotational movement, the force acting between the given object 21 and the different object 22 about an axis of rotational force control, and the maximum value of the force about the axis of rotational force control under a predetermined condition in controlling the force acting between the given object 21 and the different object 22. This makes it possible to adjust and calculate the target amount of rotational force control axis rotational movement in accordance with the magnitude of the force acting between the given object 21 and the different object 22 about the axis of rotational force control. When, for example, a predetermined direction independent of the moving operation of the given object 21 is set as a direction of translational force control, the force acting between the given object 21 and the different object 22 about the axis of rotational force control reduces as the given object 21 and the different object 22 approach a combined state. In such a case, when the given object 21 and the different object 22 are not in a combined state, the velocity of rotation of the given object 21 relative to the different object 22 is set as high as possible and the given object 21 is moved. As the given object 21 and the different object 22 approach a combined state or when the given object 21 and the different object 22 have approached a combined state, smooth convergence to the combined state can be achieved, without passing over the combined state, by lowering the velocity of rotation of the given object 21 relative to the different object 22 about the axis of rotational force control.

Figure 6:
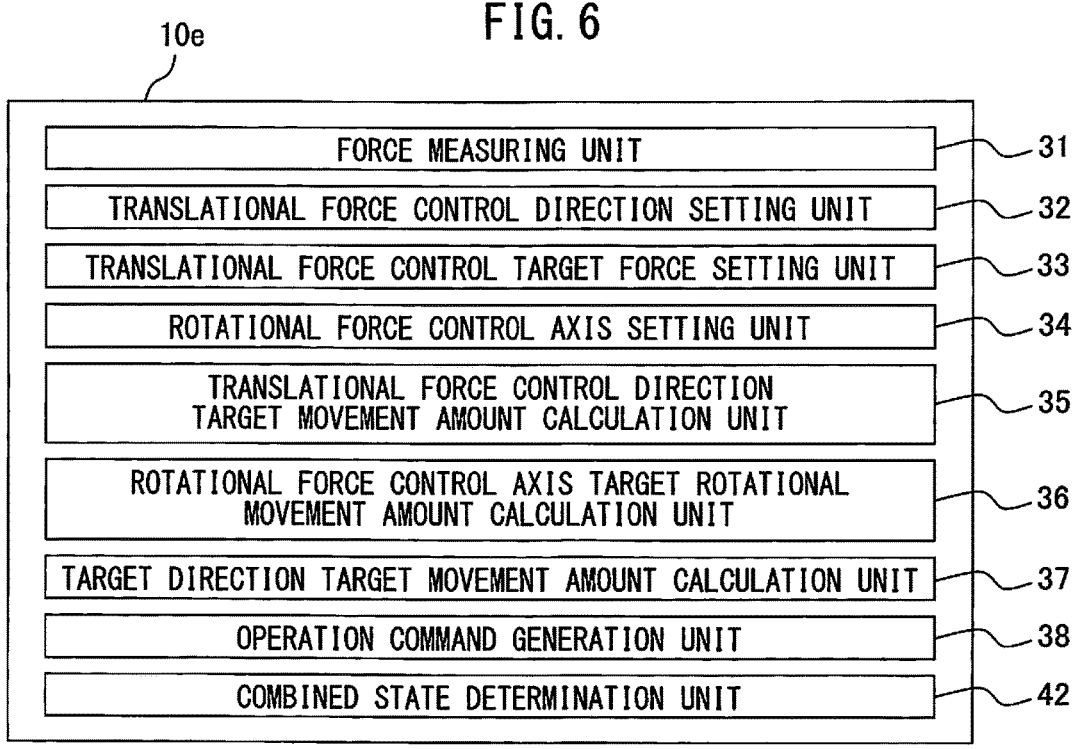
FIG. 6 is a block diagram functionally illustrating the configuration of a robot controller according to still another embodiment of the present invention.

FIG. 6 is a block diagram functionally illustrating the configuration of a robot controller 10e according to an eighth embodiment of the present invention. In the eighth embodiment of the present invention, a combined state determination unit 42 may be added to the robot controller 10 according to any one of the first to fifth embodiments of the present invention to obtain another robot controller configuration. In the eighth embodiment of the present invention, a combined state determination unit 42 is added to the robot controller 10a, as depicted as FIG. 6. The configuration of a robot controller 10g, depicted as FIG. 8, including functions to be described later may be used.

In the eighth embodiment of the present invention, as an additional feature to the robot controllers 10 according to the first to fifth embodiments of the present invention, preferably, the robot controller 10 includes a combined state determination unit 42 which determines whether a given object 21 and a different object 22 are in a combined state in which a predetermined portion of the given object 21 and a predetermined portion of the different object 22 are in contact and combined with each other, or a nearly combined state close to the combined state. In calculating a target amount of movement about an axis of rotational force control that is not parallel to one of the directions of translational force control set by a translational force control direction setting unit 32, upon defining as a first contact state, the state in which the force acting between the given object 21 and the different object 22 in the direction of translational force control that is not parallel to the axis of rotational force control is smaller than a second predetermined threshold for the force in the direction of translational force control, or the force acting between the given object 21 and the different object 22 about the axis of rotational force control is smaller than a predetermined threshold A for the force about the axis of rotational force control, and upon defining as a second contact state, the state in which the force acting between the given object 21 and the different object 22 in the direction of translational force control that is not parallel to the axis of rotational force control is equal to or greater than the second predetermined threshold for the force in the direction of translational force control, and the force acting between the given object 21 and the different object 22 about the axis of rotational force control is equal to or greater than the predetermined threshold A for the force about the axis of rotational force control, a rotational force control axis target rotational movement amount calculation unit 36 calculates the target amount of rotational force control axis rotational movement as zero when the first contact state has been set and no shift from the second contact state to the first contact state is made, and calculates the target amount of rotational force control axis rotational movement as zero, or calculates a target amount of rotational force control axis rotational movement, based on the direction and amount of movement about the axis of rotational force control in the second contact state until a shift to the first contact state is made, when a shift from the second contact state to the first contact state is made, and upon defining as a contact state 2A, the state in which the second contact state has been set and the combined state determination unit 42 determines that the nearly combined state or the combined state has been set, or the state subsequent to that in which the second contact state has been set and the combined state determination unit 42 determines that the nearly combined state or the combined state has been set, and upon defining as a contact state 2B, a state included in the second contact state and different from the contact state 2A, when the contact state 2B has been set, the rotational force control axis target rotational movement amount calculation unit 36 calculates a target amount of rotational force control axis rotational movement, based on the sign of the force about the axis of rotational force control, and at least one of a predetermined amount of rotational movement A, a translational force control target force in the direction of translational force control that is not parallel to the axis of rotational force control, and the force in the direction of translational force control that is not parallel to the axis of rotational force control, and when the contact state 2A has been set, the rotational force control axis target rotational movement amount calculation unit 36 calculates a target amount of rotational force control axis rotational movement, based on the force about the axis of rotational force control, the force about the axis of rotational force control and the maximum value of the force about the axis of rotational force control under a predetermined condition in controlling the force acting between the given object 21 and the different object 22, or a predetermined amount of rotational movement B, the force about the axis of rotational force control, and the maximum value of the force about the axis of rotational force control under a predetermined condition in controlling the force acting between the given object 21 and the different object 22, or calculates a target amount of rotational force control axis rotational movement by adjustment to a value smaller than the target amount of rotational force control axis rotational movement calculated in the contact state 2B.

Differences from the robot controllers 10 according to the first to fifth embodiments of the present invention will now be mainly described in the eighth embodiment of the present invention. Details which will not be particularly referred to hereinafter are practiced in the same way.

The combined state determination unit 42 performs combined state determination between the given object 21 and the different object 22, in which it determines whether the given object 21 and the different object 22 are in a combined state in which a predetermined portion of the given object 21 and a predetermined portion of the different object 22 are in contact and combined with each other, or a nearly combined state close to the combined state.

The combined state determination unit 42 performs combined state determination, in which it determines whether a combined state or a nearly combined state has been set, for the direction of rotation about a predetermined axis of rotational force control, based on at least one of the position or displacement of a control point for the given object 21 in a direction perpendicular to the predetermined axis of rotational force control during a predetermined time, the position relative to the predetermined axis of rotational force control at a virtual point of action calculated based on the force about the predetermined axis of rotational force control and the force in the axial direction of the predetermined axis of rotational force control, a change in sign of the force about the predetermined axis of rotational force control, and a comparison of the force about the predetermined axis of rotational force control with a predetermined threshold.

When combined state determination is performed based on whether the force acting between the given object 21 and the different object 22 about the axis of rotational force control is smaller than a predetermined threshold, inappropriate setting of the predetermined threshold may bring about a situation in which the given object 21 and the different object 22 are actually in a combined state or a nearly combined state, but it is not determined as such. This may happen due to a plurality of factors such as the control performance of rotation about the axis of rotational force control, the control performance of translation in the direction of translational force control, noise produced in the force about the axis of rotational force control, vibration of a robot 50, vibration upon force control, movement or shift of the portion where the given object 21 and the different object 22 come into contact with each other, and movement or shift of the center point for the portion where the given object 21 and the different object 22 come into contact with each other.

It is often the case that the given object 21 and the different object 22 are actually in a combined state or a nearly combined state, but it is not determined as such. It is, therefore, preferable not only to determine whether the force acting between the given object 21 and the different object 22 about the axis of rotational force control is smaller than a predetermined threshold, but also to perform combined state determination, in which it is determined whether a combined state or a nearly combined state has been set, using the determination method as described earlier.

When the first contact state has been set and no shift from the second contact state to the first contact state is made, the same processing as that when the first contact state has been set and no shift from the second contact state to the first contact state is made in the robot controller 10 according to the sixth or seventh embodiment of the present invention is performed.

When a shift from the second contact state to the first contact state is made, a target amount of rotational force control axis rotational movement is calculated using the same method as that when a shift from the second contact state to the first contact state is made in the robot controller 10 according to the sixth or seventh embodiment of the present invention. However, in the robot controller 10 according to the eighth embodiment of the present invention, when the combined state determination unit 42 determines that a nearly combined state or a combined state has been set, the target amount of rotational force control axis rotational movement may be calculated as zero.

The second contact state means the state in which the given object 21 and the different object 22 are in contact with each other in the direction of translational force control, and the force acting between the given object 21 and the different object 22 about the axis of rotational force control is relatively large and larger than a predetermined value.

Setting a small value to the predetermined threshold A for the force about the axis of rotational force control, used to determine whether the first contact state has been set, allows setting of the target amount of rotational force control axis rotational movement to zero when the force about the axis of rotational force control is too small to allow movement based on this force about the axis of rotational force control. The situation in which the force about the axis of rotational force control is too small to allow movement based on this force about the axis of rotational force control includes herein that in which the given object 21 and the different object 22 are in a combined state.

The predetermined threshold A for the force about the axis of rotational force control may be set based on the force acting between the given object 21 and the different object 22 about the axis of rotational force control during a predetermined time after the given object 21 and the different object 22 come into contact with each other with a force having a magnitude equal to or greater than a predetermined threshold in the direction of translational force control, as in other embodiments.

In the second contact state, when the predetermined threshold A for the force about the axis of rotational force control is small, the given object 21 and the different object 22 may be in a combined state or a nearly combined state. Further, in the second contact state, it is often the case that, for example, the given object 21 and the different object 22 already reached a combined state or a nearly combined state but they have passed over these states upon rotation, or smooth convergence is not achieved because of several repetitive shifts between a combined state or a nearly combined state and a non-combined state or a non-nearly combined state.

In a contact state 2A in which the second contact state has been set and the given object 21 and the different object 22 are in a combined state or a nearly combined state, rotation is preferably performed about the axis of rotational force control based on the magnitude of the force acting between the given object 21 and the different object 22 about the axis of rotational force control to achieve smooth convergence to the combined state. At this time, the given object 21 and the different object 22 may deviate from the combined state, depending on the conditions under which the given object 21 and the different object 22 come into contact with each other. Therefore, when the combined state determination unit 42 determines that neither a combined state nor a nearly combined state has been set, the given object 21 may be moved as rapid as possible by changing the method for rotation.

In another contact state 2A subsequent to the state in which the second contact state has been set and the given object 21 and the different object 22 are in a combined state or a nearly combined state, rotation may be performed about the axis of rotational force control based on the magnitude of the force acting between the given object 21 and the different object 22 about the axis of rotational force control, after a combined state or a nearly combined state is set, to achieve smooth convergence to the combined state. This allows switching of the method for calculating an amount of movement to achieve smooth convergence to the combined state even during movement with the increased amount of rotational movement.

Alternatively, the target amount of rotational force control axis rotational movement may be adjusted and calculated to be smaller for the contact state 2A than for a contact state 2B. This makes it possible to avoid the situation in which it takes much time to achieve convergence to a combined state, as it is passed over, to allow smoother convergence to the combined state. Setting the amount of rotational movement comparatively large for the contact state 2B and comparatively small for the contact state 2A achieves not only calculation method simplification but also smooth convergence to a combined state without the magnitude of the force about the axis of rotational force control.

In the contact state 2B included in the second contact state and different from the contact state 2A, movement is performed with the stably increased amount of rotational movement. This allows rapid, stable movement to a combined state or a nearly combined state when the given object 21 and the different object 22 are far from the combined state. In the contact state 2B, for such movement, as in the above-described method for calculating a target amount of rotational force control axis rotational movement in the second contact state according to the sixth embodiment of the present invention, a direction of rotation is obtained based on the sign of the force about the axis of rotational force control to calculate an amount of rotational movement based on at least one of the predetermined amount of rotational movement A, the translational force control target force in a direction of translational force control that is not parallel to the axis of rotational force control, and the force in the direction of translational force control that is not parallel to the axis of rotational force control to, in turn, calculate a target amount of rotational force control axis rotational movement.

In the contact state 2A, for the above-mentioned movement, as in the above-described method for calculating a target amount of rotational force control axis rotational movement in the second contact state according to the seventh embodiment of the present invention, a target amount of rotational force control axis rotational movement is calculated in consideration of the magnitude of the force acting between the given object 21 and the different object 22 about the axis of rotational force control as well. Alternatively, a target amount of rotational force control axis rotational movement is calculated by adjustment to a value smaller than the target amount of rotational force control axis rotational movement calculated in the contact state 2B. At this time, a target amount of rotational force control axis rotational movement is calculated by multiplying the target amount of rotational force control axis rotational movement calculated in the contact state 2B by a coefficient smaller than 1. A predetermined constant smaller than 1 may be set as the above-mentioned coefficient used for multiplication. Alternatively, a coefficient which takes a small value when the force about the axis of rotational force control is small may be set as the above-mentioned coefficient used for multiplication, based on the magnitude of the force about the axis of rotational force control during the rotational operation in the contact state 2B.

Alternatively again, a coefficient which takes a small value when the magnitude of the force about the axis of rotational force control undergoes considerable variations or vibration may be set as the above-mentioned coefficient used for multiplication, based on the variations or vibration of the force about the axis of rotational force control.

A target amount of rotational force control axis rotational movement is calculated in the above-mentioned way, and the given object 21 is moved such that when the given object 21 and the different object 22 are far from a combined state, relatively rapid rotation is performed, and when an almost combined state has been set, the velocity of rotation is adjusted according to the circumstances involved, to achieve convergence to the combined state in a short period of time. Thus, the given object 21 and the different object 22 can be quickly, stably set in a combined state.

In a ninth embodiment of the present invention, as an additional feature to the robot controller 10 according to the eighth embodiment of the present invention, preferably, when the state in which the force acting between a given object 21 and a different object 22 in a direction of translational force control that is not parallel to the axis of rotational force control is equal to or greater than a second predetermined threshold for the force in the direction of translational force control, and a combined state determination unit 42 determines that a combined state has been set continues for a predetermined time or more, a rotational force control axis target rotational movement amount calculation unit 36 in a robot controller 10 sets the target amount of rotational force control axis rotational movement to zero, or calculates a target amount of rotational force control axis rotational movement by adjustment to a value smaller than the calculated target amount of rotational force control axis rotational movement, and a translational force control direction target movement amount calculation unit 35 sets the target amount of translational force control direction movement to zero, or calculates a target amount of translational force control direction movement by adjustment to a value smaller than the calculated target amount of translational force control direction movement.

Differences from the robot controller 10 according to the eighth embodiment of the present invention will now be mainly described in the ninth embodiment of the present invention. Details which will not be particularly referred to hereinafter are practiced in the same way.

In calculating a target amount of rotational force control axis rotational movement and a target amount of translational force control direction movement, they are preferably adjusted to be relatively small when the state in which the force in the direction of translational force control is equal to or greater than a second predetermined threshold for the force in the direction of translational force control, and the combined state determination unit 42 determines that a combined state has been set continues for a predetermined time or more.

When the state in which the force in the direction of translational force control is equal to or greater than a second predetermined threshold for the force in the direction of translational force control, and the combined state determination unit 42 determines that a combined state has been set continues for a predetermined time or more, the target amount of rotational force control axis rotational movement is set to zero, or a target amount of rotational force control axis rotational movement is calculated by adjustment to a value smaller than the previously calculated value by, e.g., multiplying the previously calculated value by a coefficient smaller than 1. The target amount of translational force control direction movement is set to zero, or a target amount of translational force control direction movement is calculated by adjustment to a value smaller than the previously calculated value by, e.g., multiplying the previously calculated value by a coefficient smaller than 1.

With this operation, the given object 21 and the different object 22 can be more stably set in a combined state to prevent any trouble such as a shift of the given object 21 and the different object 22 from a combined state or failure of smooth convergence to the combined state, due to, e.g., generation of noise in the force acting between the given object 21 and the different object 22, vibration upon force control, or vibration upon the moving operation of a robot 50.

In a tenth embodiment of the present invention, as an additional feature to the robot controller 10 according to any one of the first to ninth embodiments of the present invention, preferably, the robot controller 10 generates an operation command for the robot 50 to move the given object 21 relative to the different object 22 by correcting the direction and amount of movement of the given object 21 relative to the different object 22, based on movement of a robot pedestal 52 when the position, the orientation, or the position and orientation of the robot pedestal 52 move, correcting the direction and amount of movement of the given object 21 relative to the different object 22, based on movement of the different object 22 when the position, the orientation, or the position and orientation of the different object 22 move, or correcting the direction and amount of movement of the given object 21 relative to the different object 22, based on movement of the robot pedestal 52 and movement of the different object 22 when the position, the orientation, or the position and orientation of the robot pedestal 52 and the position, the orientation, or the position and orientation of the different object 22 move.

Differences from the robot controllers 10 according to the first to ninth embodiments of the present invention will now be mainly described in the tenth embodiment of the present invention. Details which will not be particularly referred to hereinafter are practiced in the same way.

In this embodiment, the robot pedestal 52 holding the given object 21 is assumed to be, e.g., located, attached, or held on a robot installation device 53 for, e.g., an apparatus, a traveling shaft, or another robot, including a mechanism unit capable of moving the position and/or orientation. The robot pedestal 52 is further assumed to be, e.g., located, attached, or held on an installation device 24 for a different object, such as an apparatus, a conveyor, another robot, or a jig, including a mechanism unit capable of moving the position and/or orientation of the different object 22.

The amount of movement of the position and/or orientation of the robot pedestal 52 is sent from another controller which drives the robot installation device 53 to the robot controller 10. Alternatively, since the robot installation device 53 is driven by the robot controller 10, the amount of movement of the position and/or orientation of the robot pedestal 52 is assumed to be known. Alternatively again, a sensor which obtains an amount of movement of the position and/or orientation of the robot pedestal 52 is assumed to send the amount of movement of the position and/or orientation of the robot pedestal 52 to the robot controller 10.

The position and/or orientation of the different object 22 is sent from another controller which drives the installation device 24 for a different object to the robot controller 10. Alternatively, since the installation device 24 for a different object is driven by the robot controller 10, the position and/or orientation of the different object 22 is assumed to be known. Alternatively again, a sensor which obtains an amount of movement of the position and/or orientation of the different object 22 is assumed to send the position and/or orientation of the different object 22 to the robot controller 10.

When the robot 50 stops its moving operation, the different object 22 stops in a coordinate system set for a space, and the robot pedestal 52 is moved by the robot installation device 53 including a mechanism unit capable of moving the position and/or orientation, the given object 21 moves relative to the different object 22 in the coordinate system set for the space. When the given object 21 stops in a coordinate system set for a space, and the different object 22 is moved by the installation device 24 for a different object including a mechanism unit capable of moving the position and/or orientation, the different object 22 moves relative to the given object 21 in the coordinate system set for the space. When the given object 21 is moved with movement of the robot installation device 53 including a mechanism unit capable of moving the position and/or orientation, or the different object 22 is moved with movement of the installation device 24 for a different object including a mechanism unit capable of moving the position and/or orientation, the direction and amount of movement of the given object 21 relative to the different object 22 are corrected and the given object 21 is moved relative to the different object 22. This makes it possible to more stably, quickly set a combined state in a plurality of embodiments of the present invention.

When the robot installation device 53 including a mechanism unit capable of moving the position and/or orientation moves the robot pedestal 52 to move the given object 21, the position, orientation, direction, amount of movement, and the like with reference to the position and/or orientation of the robot 50, the given object 21, or the different object 22 are preferably corrected based on the direction and amount of movement of the robot 50, the end effector 51 of the robot 50, or the given object 21 upon movement of the pedestal 52, or based on the direction and amount of movement of the different object 22 upon movement of the installation device 24 for a different object including a mechanism unit capable of moving the position and/or orientation.

The information with reference to the position and/or orientation of the robot 50, the given object 21, or the different object 22 includes information associated with relative movement between the given object 21 and the different object 22, such as a predetermined coordinate system for the different object 22, a predetermined direction for the different object 22, the position and/or orientation of a portion which moves upon movement of the robot 50 in a coordinate system set for a space, a predetermined coordinate system for the given object 21, or a predetermined direction for the given object 21.

When the robot 50, the end effector 51 of the robot 50, or the given object 21 moves upon movement of the robot pedestal 52, or the different object 22 is moved by the installation device 24 for a different object, the force measuring unit 31, the translational force control direction setting unit 32, the translational force control target force setting unit 33, the rotational force control axis setting unit 34, the translational force control direction target movement amount calculation unit 35, the rotational force control axis target rotational movement amount calculation unit 36, the target direction target movement amount calculation unit 37, the operation command generation unit 38, the contact position setting unit 39, the contact portion orientation calculation unit 40, the combined state orientation calculation unit 41, the combined state determination unit 42, a force instability detection unit 43 (to be described later), and a moving operation instability detection unit 44 (to be described later) for the robot controller 10 in the embodiments of the present invention, including embodiments of the present invention to be described later, preferably perform processing for each function in consideration of the position and/or orientation and the direction and amount of movement of the given object 21 that moves upon movement of the robot pedestal 52, or the position and/or orientation and the direction and amount of movement of the different object 22 moved by the installation device 24 for a different object.

The force measuring unit 31 compensates, e.g., gravity or the force of inertia in consideration of movement of the given object 21 upon movement of the robot pedestal 52. When the force is compensated based on the force obtained when the given object 21 and the different object 22 are in a non-contact state, a change in orientation is taken into consideration.

The translational force control direction setting unit 32 corrects and sets the direction of translational force control of the given object 21 relative to the different object 22 to be relatively the same direction as that when neither the given object 21 moves upon movement of the robot pedestal 52 nor the different object 22 moves upon movement of the installation device 24 for a different object. Alternatively, when a predetermined direction for the given object 21 is set as a direction of translational force control, the translational force control direction setting unit 32 corrects the direction of translational force control in consideration of movement of the given object 21 upon movement of the robot pedestal 52. Alternatively again, when a predetermined direction for the different object 22 is set as a direction of translational force control, the translational force control direction setting unit 32 corrects the direction of translational force control in consideration of movement of the different object 22 upon movement of the installation device 24 for a different object. Alternatively again, when an axis of rotational force control is set and used for settings in question, the translational force control direction setting unit 32 corrects the direction of translational force control based on the axis of rotational force control corrected in consideration of movement of the given object 21 upon movement of the robot pedestal 52 or movement of the different object 22 upon movement of the installation device 24 for a different object.

The rotational force control axis setting unit 34 corrects and sets the position and direction of the axis of rotational force control relative to the different object 22 to be relatively the same position and direction as those when neither the given object 21 moves upon movement of the robot pedestal 52 nor the different object 22 moves upon movement of the installation device 24 for a different object. Alternatively, when a predetermined direction for the given object 21 is set for an axis of rotational force control, the rotational force control axis setting unit 34 corrects the position and direction of the axis of rotational force control in consideration of movement of the given object 21 upon movement of the robot pedestal 52. Alternatively again, when a predetermined direction for the different object 22 is set for an axis of rotational force control, the rotational force control axis setting unit 34 corrects the direction of the axis of rotational force control in consideration of movement of the different object 22 upon movement of the installation device 24 for a different object. Alternatively again, when a direction of translational force control is set and used for settings in question, the rotational force control axis setting unit 34 corrects the axis of rotational force control based on the direction of translational force control corrected in consideration of movement of the given object 21 upon movement of the robot pedestal 52 or movement of the different object 22 upon movement of the installation device 24 for a different object. The rotational force control axis setting unit 34 further corrects the position of the axis of rotational force control in consideration of movement of the given object 21 upon movement of the robot pedestal 52 or movement of the different object 22 upon movement of the installation device 24 for a different object.

The translational force control direction target movement amount calculation unit 35 calculates a target amount of translational force control direction movement in consideration of movement of the given object 21 upon movement of the robot pedestal 52 or movement of the different object 22 upon movement of the installation device 24 for a different object.

The rotational force control axis target rotational movement amount calculation unit 36 calculates a target amount of rotational force control axis rotational movement in consideration of movement of the given object 21 upon movement of the robot pedestal 52 or movement of the different object 22 upon movement of the installation device 24 for a different object.

When the robot pedestal 52 is moved by the robot installation device 53 to continue movement of the given object 21, the robot controller 10 obtains a target amount of movement of the robot installation device 53 moved by a driving device for the robot installation device 53 in the next control cycle of the robot controller 10, calculates an amount of movement of the robot pedestal 52, and calculates an amount of movement of the given object 21 upon movement of the robot pedestal 52 based on the calculated target amount of movement of the robot pedestal 52. Alternatively, when the robot pedestal 52 is moved by the robot installation device 53 to continue movement of the given object 21, the robot controller 10 estimates and calculates an amount of movement of the robot pedestal 52 in the next control cycle of the robot controller 10 based on the amount of movement of the robot pedestal 52, and calculates an amount of movement of the given object 21 upon movement of the robot pedestal 52 based on the estimated amount of movement of the robot pedestal 52. Further, when the different object 22 continues to move upon movement of the installation device 24 for a different object, the robot controller 10 obtains a target amount of movement of the installation device 24 for a different object moved by a driving device for the installation device 24 for a different object in the next control cycle of the robot controller 10, and calculates an amount of movement of the different object 22 based on the target amount of movement of the installation device 24 for a different object. Alternatively, when the different object 22 continues to move upon movement of the installation device 24 for a different object, the robot controller 10 estimates and calculates an amount of movement of the different object 22 in the next control cycle of the robot controller 10 based on the amount of movement of the different object 22.

The target direction target movement amount calculation unit 37 corrects and calculates the target amount of translational movement and the target amount of rotational movement, based on the amount of movement of the given object 21 upon movement of the robot pedestal 52 and the amount of movement of the different object 22 upon movement of the installation device 24 for a different object, both calculated in the above-mentioned manner, the corrected target amount of translational force control direction movement, and the corrected target amount of rotational force control axis rotational movement.

The operation command generation unit 38 generates an operation command for the robot 50, based on the target amount of translational movement and the target amount of rotational movement, both corrected in the above-mentioned manner.

The contact position setting unit 39 corrects and sets the contact position at which the given object 21 and the different object 22 come into contact with each other to be relatively the same contact position for the given object 21 or the different object 22, in consideration of movement of the given object 21 upon movement of the robot pedestal 52 or movement of the different object 22 upon movement of the installation device 24 for a different object. The rotational force control axis setting unit 34 corrects and sets the contact position reference axis of rotational force control in consideration of movement of the given object 21 upon movement of the robot pedestal 52 or movement of the different object 22 upon movement of the installation device 24 for a different object, together with the corrected contact position. The rotational force control axis target rotational movement amount calculation unit 36 calculates a target amount of rotational force control axis rotational movement, based on, e.g., the contact position reference axis of rotational force control in consideration of movement of the given object 21 upon movement of the robot pedestal 52 or movement of the different object 22 upon movement of the installation device 24 for a different object.

The contact portion orientation calculation unit 40 calculates the orientation of the portion where the given object 21 and the different object 22 come into contact with each other, in consideration of movement of the given object 21 upon movement of the robot pedestal 52 or movement of the different object 22 upon movement of the installation device 24 for a different object.

The combined state orientation calculation unit 41 calculates a combined state orientation in consideration of movement of the given object 21 upon movement of the robot pedestal 52 or movement of the different object 22 upon movement of the installation device 24 for a different object.

The combined state determination unit 42 performs combined state determination in consideration of movement of the given object 21 upon movement of the robot pedestal 52 or movement of the different object 22 upon movement of the installation device 24 for a different object.

The force instability detection unit 43 (to be described later) preferably detects force instability based on the corrected force in consideration of movement of the given object 21 upon movement of the robot pedestal 52 or movement of the different object 22 upon movement of the installation device 24 for a different object.

The moving operation instability detection unit 44 (to be described later) preferably detects whether the moving operation of the robot 50 is oscillating by taking into account, e.g., whether the robot 50 is oscillating or whether the force acting between the given object 21 and the different object 22 results from the oscillation of the moving operation of the robot 50, in consideration of movement of the given object 21 upon movement of the robot pedestal 52 or movement of the different object 22 upon movement of the installation device 24 for a different object.

Figure 7:
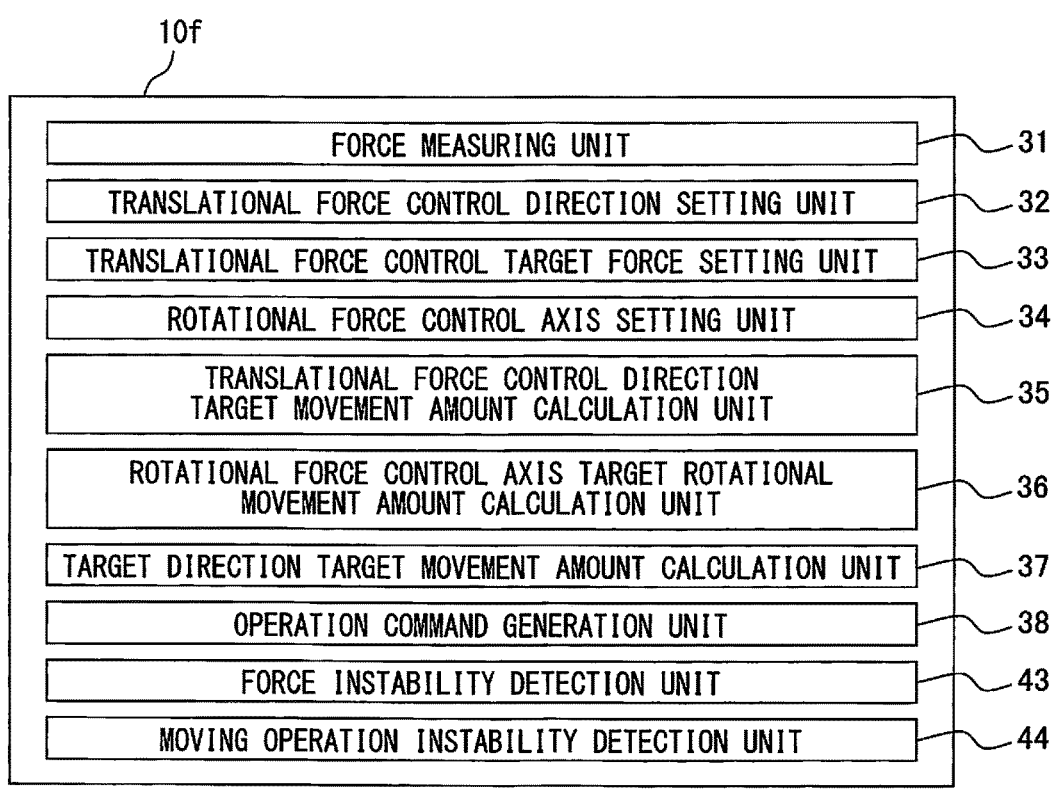
FIG. 7 is a block diagram functionally illustrating the configuration of a robot controller according to still another embodiment of the present invention.

Even for processes unspecified herein, when it is desired to take movement of the given object 21 upon movement of the robot pedestal 52 or movement of the different object 22 upon movement of the installation device 24 for a different object into consideration as appropriate, suitable correction is preferably performed. FIG. 7 is a block diagram functionally illustrating the configuration of a robot controller 10f according to an eleventh embodiment of the present invention. In the eleventh embodiment of the present invention, a force instability detection unit 43 and a moving operation instability detection unit 44 may be added to the robot controller 10 according to any one of the first to tenth embodiments of the present invention to obtain another robot controller configuration. In the eleventh embodiment of the present invention, a force instability detection unit 43 and a moving operation instability detection unit 44 are added to the robot controller 10a, as depicted as FIG. 7. The configuration of a robot controller 10g, depicted as FIG. 8, including functions to be described later may be used.

In the eleventh embodiment of the present invention, as an additional feature to the robot controllers 10 according to the first to 10th embodiments of the present invention, preferably, the robot controller 10 includes a force instability detection unit 43 which detects instability of the force acting between a given object 21 and a different object 22 by detecting at least one of the state in which a force greater than a predetermined threshold acts between the given object 21 and the different object 22 during a predetermined time, the state in which a force greater than another predetermined threshold acts between the given object 21 and the different object 22, and an oscillating state of the force acting between the given object 21 and the different object 22, and a moving operation instability detection unit 44 which detects instability of the moving operation of a robot 50 by detecting at least one of a state close to a singular orientation of the robot 50 and an oscillating state of the robot 50. When force instability is detected by the force instability detection unit 43 or instability of the moving operation of the robot 50 is detected by the moving operation instability detection unit 44, the robot controller 10 sets the target amount of rotational force control axis rotational movement to zero, or calculates the target amount of rotational force control axis rotational movement by adjustment to a value smaller than the target amount of rotational force control axis rotational movement calculated when neither force instability nor instability of the moving operation of the robot 50 is detected.

Differences from the robot controllers 10 according to the first to tenth embodiments of the present invention will now be mainly described in the eleventh embodiment of the present invention. Details which will not be particularly referred to hereinafter are practiced in the same way.

The force instability detection unit 43 detects the state in which a force greater than a predetermined threshold acts between the given object 21 and the different object 22 during a predetermined time. Thus, the force instability detection unit 43 can detect that the change in force acting between the given object 21 and the different object 22 has abruptly increased to, in turn, detect states such as the state in which the robot 50 is slightly oscillating, the state in which an unreasonable operation command has been issued to the robot 50 upon an abrupt change in command, the state in which the given object 21 and the different object 22 have come into contact with each other with great collision or at a high velocity when they are set in a combined state, and the state in which the given object 21 and the different object 22 have collided with each other due to slightly oscillation. The above-mentioned predetermined time or predetermined threshold may be set in advance to allow detection of the above-mentioned states or automatically set in accordance with the contact state between the given object 21 and the different object 22 or the state of the moving operation of the robot 50.

The force instability detection unit 43 further detects the state in which a force greater than another predetermined threshold acts between the given object 21 and the different object 22. Thus, the force instability detection unit 43 detects the state in which the force acting between the given object 21 and the different object 22 is excessively large to, in turn, detect the state in which the moving and contact operations of the given object 21 relative to the different object 22 are inappropriate, and the state in which the force acting between the given object 21 and the different object 22 may not be controlled appropriately. The above-mentioned other predetermined threshold may be set in advance to allow detection of the above-mentioned states or automatically set in accordance with the contact state between the given object 21 and the different object 22 or the state of the moving operation of the robot 50.

The force instability detection unit 43 detects an oscillating state of the force acting between the given object 21 and the different object 22, using a known method such as detection by analyzing frequency characteristics using short-time Fourier transformation or wavelet transformation based on the waveform of force data. Thus, the force instability detection unit 43 can detect, e.g., the state in which contact between the given object 21 and the different object 22 is unstable or the state in which the moving operation of the robot 50 is unstable.

In this embodiment, the states, as mentioned above, detected by the force instability detection unit 43 are defined as force instability.

The moving operation instability detection unit 44 detects a state close to a singular orientation of the robot 50. The singular orientation of the robot 50 means the state in which the position and/or orientation of the distal end of the robot 50 in an orthogonal coordinate system may not be uniquely inversely transformed into a position of each axis. The state close to a singular orientation of the robot 50 means the state in which the orientation of the robot 50 is close to the above-mentioned singular orientation. The robot orientation is assumed herein to be the orientation of the robot mechanism unit when an actuator which constitutes the robot assumes a certain state. When the orientation of the robot 50 is close to a singular orientation, the moving operation of the robot 50 may slightly oscillate or speed up, leading to instability. The moving operation instability detection unit 44 can early detect instability of the moving operation of the robot 50, based on the orientation of the robot 50. At this time, the region around a singular orientation close to the singular orientation is preferably, appropriately set in accordance with, e.g., the operation performance of the robot 50, or the situation in which it is desired to early detect the situation in which closeness to a singular orientation or to narrow the region determined to be close to a singular orientation.

The moving operation instability detection unit 44 further detects an oscillating state of the robot 50. At this time, the moving operation instability detection unit 44 detects an oscillating state or initial oscillating state of the robot 50 based on, e.g., operation conditions such as a deviation between an actual position and an operation command to the robot 50 or vibration of each axis of the robot 50 to, in turn, detect instability of the moving operation of the robot 50 or signs of unstable operations.

In this embodiment, the states, as mentioned above, detected by the moving operation instability detection unit 44 are defined as instability of the robot moving operation.

When force control is performed based on the force acting between the given object 21 and the different object 22 to set the given object 21 and the different object 22 in a combined state, since the force about the axis of rotational force control is obtained by the distance between the force in the direction of translational force control and the position about the axis of rotational force control, it suffers from noise, considerably fluctuates, or vibrates due to, e.g., fluctuations in force in the direction of translational force control, fluctuations in contact position, vibration upon the moving operation of the robot 50, or vibration upon force control. Rotation of the given object 21 may separate the given object 21 from the different object 22 or cause the given object 21 and the different object 22 to repeat contact and non-contact. Therefore, rotation of the given object 21 relative to the different object 22 based on the force about the axis of rotational force control may lead to force instability or instability of the robot moving operation due to factors associated with this moving operation.

Upon the occurrence of force instability or instability of the robot moving operation, when rotation is continued at the velocity set at this point in time, the force about the axis of rotational force control may vibrate more, thus hindering movement based on the force about the axis of rotational force control. In this case, movement can hardly be performed to set a combined state, which may not be set or may be set over a long period of time.

As for the direction of translational force control, since the force in the direction of translational force control is controlled to reach a target force having a predetermined value, this is easier than movement based on the force about the axis of rotational force control.

Force instability or instability of the robot moving operation is detected early, rotation is stopped or performed at a lower velocity, and control is continued in the direction of translational force control. Upon the occurrence of force instability or instability of the robot moving operation resulting from force instability, when the given object 21 and the different object 22 stably come into contact with each other in the direction of translational force control, the force instability or the instability of the robot moving operation is eliminated so that rotation can be speeded up again.

Alternatively, force instability or instability of the robot moving operation may be detected early, rotation may be stopped or performed at a lower velocity to adjust the velocity of rotation, and translation may be stopped or performed at a lower velocity to adjust the velocity of translation. This eliminates the force instability or the instability of the robot moving operation so that the velocities of rotation and translation can be increased again to predetermined values or adjusted to be moderate enough to avoid force instability or instability of the robot moving operation.

As described earlier, to move the given object 21 relative to the different object 22, the robot controller 10 sets the target amount of rotational force control axis rotational movement to zero when force instability is detected by the force instability detection unit 43 or instability of the moving operation of the robot 50 is detected by the moving operation instability detection unit 44. Alternatively, when force instability is detected by the force instability detection unit 43 or instability of the moving operation of the robot 50 is detected by the moving operation instability detection unit 44, the robot controller 10 calculates the target amount of rotational force control axis rotational movement by adjustment to a value smaller than the target amount of rotational force control axis rotational movement calculated when neither force instability nor instability of the moving operation of the robot 50 is detected. At this time, a rotational force control axis target rotational movement amount calculation unit 36 or a target direction target movement amount calculation unit 37 may perform adjustment to a smaller value by multiplying the calculated target amount of rotational force control axis rotational movement by a predetermined coefficient smaller than 1 when force instability or instability of the robot moving operation is detected, based on the output of the force instability detection unit 43 and the moving operation instability detection unit 44.

As described earlier, the given object 21 and the different object 22 can be quickly converged to a combined state in a shorter period of time by detecting force instability or instability of the robot moving operation and adjusting the velocity of rotation. In a twelfth embodiment of the present invention, as an additional feature to the robot controllers 10 according to the first to eleventh embodiments of the present invention, preferably, a robot controller 10 further sets the magnitude of the force in the direction of translational force control to a predetermined threshold when the magnitude of the force in the direction of translational force control is larger than the predetermined threshold, and sets the magnitude of the force about the axis of rotational force control to another predetermined threshold when the magnitude of the force about the axis of rotational force control is larger than the other predetermined threshold.

Differences from the robot controllers 10 according to the first to eleventh embodiments of the present invention will now be mainly described in the twelfth embodiment of the present invention. Details which will not be particularly referred to hereinafter are practiced in the same way.

In the embodiment of the present invention, when the force acting between a given object 21 and a different object 22 is excessively large, processes such as setting, calculation, and determination are preferably, appropriately performed in accordance with an appropriately adjusted value, instead of directly using this force value. When the force acting between the given object 21 and the different object 22 in the direction of translational force control or about the axis of rotational force control is greater than a predetermined upper limit, calculation and the like are preferably performed using the above-mentioned predetermined upper limit. Another value may be set as a predetermined upper limit in accordance with the direction.

When the target amount of translational force control direction movement is changed in accordance with the magnitude of the force in a direction of translational force control, and the magnitude of the force in the direction of translational force control is larger than a predetermined threshold set for the direction of translational force control, a translational force control direction target movement amount calculation unit 35 preferably calculates a target amount of translational force control direction movement upon setting the magnitude of the force in the direction of translational force control to the predetermined threshold. When two or more directions of translational force control are used, equal predetermined thresholds may be set or a predetermined threshold may be set for each direction of translational force control.

When the target amount of rotational force control axis rotational movement is changed in accordance with the magnitude of the force about an axis of rotational force control, and the magnitude of the force about the axis of rotational force control is larger than a predetermined threshold set for the axis of rotational force control, a rotational force control axis target rotational movement amount calculation unit 36 preferably calculates a target amount of rotational force control axis rotational movement upon setting the magnitude of the force about the axis of rotational force control to the predetermined threshold. When two or more axes of rotational force control are used, equal predetermined thresholds may be set or a predetermined threshold may be set for each axis of rotational force control.

When the force acting between the given object 21 and the different object 22 in a predetermined direction of translational force control is excessively large to, in turn, make the calculated target amount of translational force control direction movement exceed a predetermined threshold, the value of the predetermined threshold may be set as a target amount of translational force control direction movement.

When the force acting between the given object 21 and the different object 22 about a predetermined axis of rotational force control is excessively large to, in turn, make the calculated target amount of rotational force control axis rotational movement exceed another predetermined threshold, the value of the other predetermined threshold may be set as a target amount of rotational force control axis rotational movement. When a contact position setting unit 39 or a contact portion orientation calculation unit 40 calculates the position at which the given object 21 and the different object 22 come into contact with each other based on the force acting between the given object 21 and the different object 22, and the force acting between the given object 21 and the different object 22 is excessively large, it is preferable not to calculate the contact position based on the force acting between the given object 21 and the different object 22 in this case. In this case, the force acting between the given object 21 and the different object 22 may be obtained again, obtained after a change in contact state, or displayed on a teach device or an output device to issue an abnormality notification.

When the force acting between the given object 21 and the different object 22 is excessively large, the above-mentioned operation can prevent movement which poses a risk of damaging a robot 50, inappropriate movement of the robot 50 which poses a danger to any person or object around it, inappropriate movement of the given object 21 which causes damage, or inappropriate movement of the given object 21 which prolongs the time to set the given object 21 and the different object 22 in a combined state.

In a thirteenth embodiment of the present invention, as an additional feature to the robot controllers 10 according to the first to twelfth embodiments of the present invention, preferably, a translational force control direction setting unit 32 in a robot controller 10 sets at least one direction of translational force control based on at least one of a predetermined direction for a given object 21, a predetermined direction for a different object 22, a predetermined direction independent of the moving operation of the given object 21, and an axis of rotational force control when the axis of rotational force control has been set, and a rotational force control axis setting unit 34 in the robot controller 10 sets at least one axis of rotational force control based on at least one of a predetermined direction for the given object 21, a predetermined direction for the different object 22, a predetermined direction independent of the moving operation of the given object 21, and a direction of translational force control when the direction of translational force control has been set.

Differences from the robot controllers 10 according to the first to twelfth embodiments of the present invention will now be mainly described in the thirteenth embodiment of the present invention. Details which will not be particularly referred to hereinafter are practiced in the same way.

As described earlier in conjunction with the translational force control direction setting unit 32, the direction of translational force control means the direction to press by translating the given object 21 relative to the different object 22, in which the force acting between the given object 21 and the different object 22 in the direction of translation is controlled to reach a target force. The translational force control direction setting unit 32 preferably sets a direction of translational force control to allow the given object 21 and the different object 22 to appropriately come into contact with each other by controlling the force acting between the given object 21 and the different object 22 in this direction.

The translational force control direction setting unit 32 may set a predetermined direction for the given object 21 as a direction of translational force control to change the direction of translational force control in accordance with the state of the given object 21. Alternatively, the translational force control direction setting unit 32 may set a predetermined direction for the different object 22 as a direction of translational force control to bring the given object 21 close to the predetermined direction for the different object 22. In this case, when the different object 22 moves, the given object 21 can be brought close to the different object 22 in accordance with movement of the different object 22.

Alternatively again, the translational force control direction setting unit 32 may set a predetermined direction independent of the moving operation of the given object 21 as a direction of translational force control to perform translation in the predetermined direction, independently of the moving operation of the given object 21, to bring the given object 21 close to the different object 22.

Alternatively again, when an axis of rotational force control is set, the translational force control direction setting unit 32 may set a direction of translational force control based on the position or direction of the axis of rotational force control (e.g., set the direction of translational force control to a direction parallel to that perpendicular to the axis of rotational force control or a direction which makes a predetermined angle with the axis of rotational force control, based on the axis of rotational force control). This makes it possible to set a direction of translational force control in accordance with the axis of rotational force control.

Alternatively again, the translational force control direction setting unit 32 may combine the above-mentioned settings to set a plurality of directions of translational force control, set a direction of translational force control by selection from the above-mentioned settings in accordance with the state of relative movement or contact between the given object 21 and the different object 22, or set a combination of the above-mentioned directions as a direction of translational force control.

The above-mentioned setting of a direction of translational force control makes it possible to appropriately set the direction in which the given object 21 and the different object 22 are brought into contact with or pressed against each other, according to the circumstances involved, and, in turn, to appropriately bring the given object 21 and the different object 22 into contact with each other.

As described earlier in conjunction with the rotational force control axis setting unit 34, the axis of rotational force control means the axis of rotation of the given object 21 relative to the different object 22.

The rotational force control axis setting unit 34 preferably sets an axis of rotational force control to rotate the given object 21 relative to the different object 22 about the axis of rotational force control and perform translation in a predetermined direction of translational force control to enable the given object 21 and the different object 22 to appropriately set in contact with each other.

In setting the position of an axis of rotational force control, the rotational force control axis setting unit 34 sets it to pass through a control point set for the given object 21, a point set in a predetermined tool coordinate system for the given object 21, a point set in a predetermined coordinate system for the different object 22, or a point set in a reference coordinate system or a coordinate system set for a space in which the position and/or orientation stays the same even upon the moving operation of the given object 21, in accordance with the state of relative movement or contact between the given object 21 and the different object 22, or the moving method.

The rotational force control axis setting unit 34 sets a direction of the axis of rotational force control based on a predetermined direction for the given object 21. This makes it possible to change the direction of the axis of rotational force control in accordance with the state of movement of the given object 21.

Alternatively, the rotational force control axis setting unit 34 sets a direction of the axis of rotational force control based on a predetermined direction for the different object 22. This makes it possible to change the direction of the axis of rotational force control in accordance with the state of placement of the different object 22 or its movement when it is in motion.

Alternatively again, the rotational force control axis setting unit 34 sets a direction of the axis of rotational force control based on a predetermined direction independent of the moving operation of the given object 21. This makes it possible to set the direction of the axis of rotational force control to a direction independent of the moving operation of the given object 21.

Alternatively again, when a direction of translational force control is set, the rotational force control axis setting unit 34 may set a direction of the axis of rotational force control based on the direction of translational force control (e.g., set the direction of the axis of rotational force control to a direction parallel to that perpendicular to the direction of translational force control or a direction parallel to that which makes a predetermined angle with the direction of translational force control, based on the direction of translational force control). This makes it possible to set a direction of the axis of rotational force control in accordance with the direction of translational force control.

Alternatively again, the rotational force control axis setting unit 34 may combine the above-mentioned settings to set a direction of the axis of rotational force control or a point through which the axis of rotational force control passes to, in turn, set a plurality of axes of rotational force control, set a direction of the axis of rotational force control or a point through which the axis of rotational force control passes by selection from the above-mentioned settings in accordance with the state of relative movement or contact between the given object 21 and the different object 22, or set a combination of the above-mentioned directions as a direction of the axis of rotational force control. The above-mentioned setting of an axis of rotational force control makes it possible to appropriately set the direction in which the given object 21 and the different object 22 are rotated relative to each other, according to the circumstances involved, and, in turn, to appropriately bring the given object 21 and the different object 22 into contact with each other.

In a fourteenth embodiment of the present invention, as an additional feature to the robot controllers 10 according to the first to thirteenth embodiments of the present invention, a translational force control direction setting unit 32 in a robot controller 10 sets a direction of translational force control, based on the force about the axis of rotational force control when a given object 21 and a different object 22 come into contact with each other, and the given object 21 is pressed against the different object 22 in different directions including components of the direction of translational force control with a predetermined range as a limit.

Differences from the robot controllers 10 according to the first to thirteenth embodiments of the present invention will now be mainly described in the fourteenth embodiment of the present invention. Details which will not be particularly referred to hereinafter are practiced in the same way.

Figure 20A:
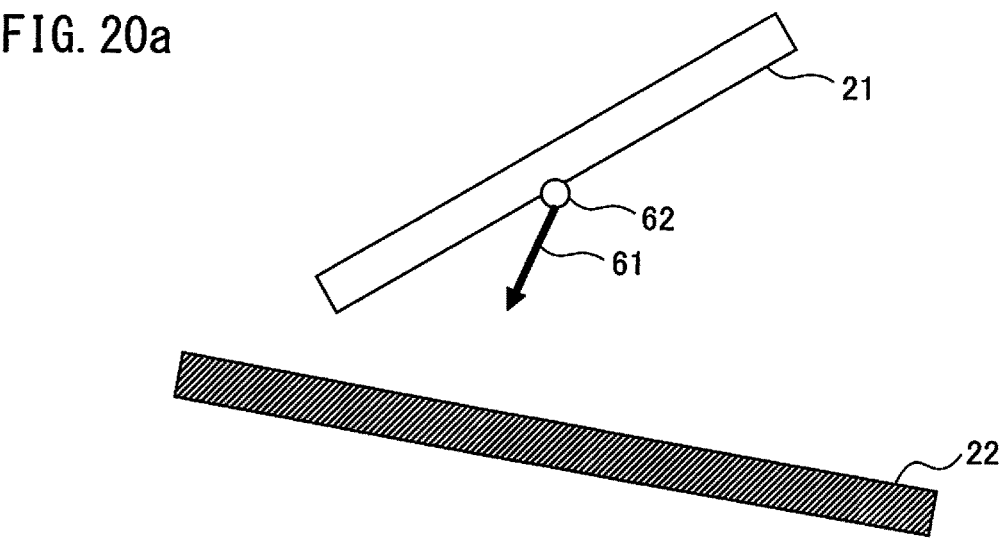
FIGS. 20a to 20c are partial enlarged views for explaining a method for setting a direction of translational force control.
Figure 20B:
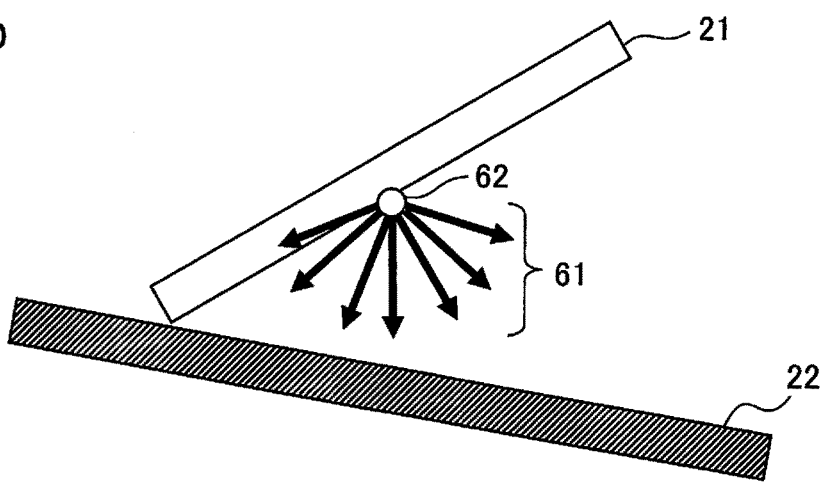
Figure 20C:
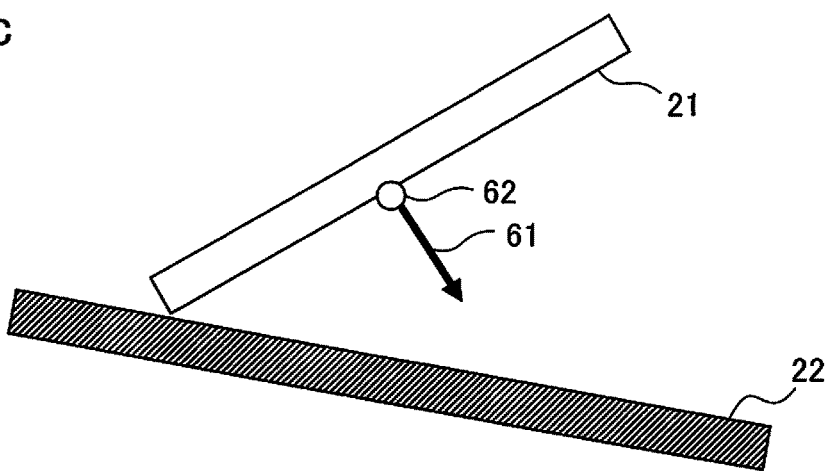

FIGS. 20*a* to 20*c* are partial enlarged views for explaining a method for setting a direction of translational force control when the given object 21 and the different object 22 are set in a combined state by the robot controller 10 according to the fourteenth embodiment of the present invention. FIG. 20*a* illustrates the state at the start of movement to set the given object 21 and the different object 22 in a combined state, a predetermined direction independent of the moving operation of the given object 21 is set as a direction of translational force control 61, and an axis which runs in a predetermined direction independent of the moving operation of the given object 21 and passes through a control point for the given object 21 is set as an axis of rotational force control 62. Alternatively, a predetermined direction for the given object 21 may be set as a direction of translational force control 61. As the given object 21 is translated in the direction of translational force control 61, as illustrated as FIG. 20*a*, the given object 21 and the different object 22 come into contact with each other, as illustrated as FIG. 20*b*. It is determined whether the given object 21 and the different object 22 have come into contact with each other by comparing the force acting between the given object 21 and the different object 22 in the direction of translational force control with a predetermined threshold. Alternatively, it may be determined whether the given object 21 and the different object 22 have come into contact with each other by comparing the force about the axis of rotational force control 62 with a predetermined threshold or based on a change in force about the axis of rotational force control 62 per predetermined time.

When the given object 21 and the different object 22 come into contact with each other, the robot controller 10 stops movement of the given object 21 relative to the different object 22 in the direction of translational force control. The robot controller 10 then moves the given object 21 to press it in a plurality of other directions including components of the direction of translational force control with a predetermined range as a limit at this time, without rotating the given object 21 about the axis of rotational force control. The other directions mean different directions. As the direction to press the given object 21 is changed to the other directions, these directions are set not to reduce the force about the axis of rotational force control or set to increase the force about the axis of rotational force control, based on the magnitude of the force about the axis of rotational force control. Alternatively, directions which satisfy conditions are searched with as few changes in direction to press as possible, in accordance with the purpose such as the finding of a direction in which the force about the axis of rotational force control reaches its maximum or the finding of a direction in which the force about the axis of rotational force control exceeds a predetermined threshold.

In this case, as described earlier, when the given object 21 is pressed in a plurality of directions by controlling the force in the direction of translational force control to reach a target force, forces about the axes of rotational force control in the plurality of directions are obtained to, in turn, obtain a force about the axis of rotational force control and a direction when the force about the axis of rotational force control exceeds a predetermined threshold, and the obtained direction is set as a direction of translational force control. At this time, the direction of translational force control is set to a predetermined direction for the given object 21, based on the obtained direction, to vary with movement of the given object 21. Then, the direction set at this time is used as a direction of translational force control 61 and movement is performed, as depicted as FIG. 20*c*. In the next control cycle for which a direction of translational force control is set, rotation is performed about the axis of rotational force control based on the force about the axis of rotational force control obtained when the direction of translational force control is set. Subsequently, rotation may be performed about the axis of rotational force control, based on the force about the axis of rotational force control obtained when the above-mentioned direction of translational force control is set, until the force about the axis of rotational force control falls below a predetermined threshold or comes close to zero, or its sign changes. Alternatively, rotation may be performed about the axis of rotational force control, based on the force about the axis of rotational force control at each point in time.

A direction of translational force control may be set as follows. When the given object 21 is pressed in a plurality of directions by controlling the force in the direction of translational force control to reach a target force, forces about the axes of rotational force control in the plurality of directions are obtained, and the direction in which the force about the axis of rotational force control reaches its maximum upon changes in the plurality of directions is set as a direction of translational force control. The direction in which the force about the axis of rotational force control reaches its maximum is assumed to be obtained when the direction in question is changed to a plurality of directions within a predetermined range. At this time, the direction of translational force control is set to a predetermined direction for the given object 21, based on the obtained direction, to vary with movement of the given object 21. In the next control cycle for which a direction of translational force control is set, rotation is performed about the axis of rotational force control based on the maximum force about the axis of rotational force control. Subsequently, rotation may be performed about the axis of rotational force control, based on the maximum force about the axis of rotational force control obtained in the above-mentioned operation, until the force about the axis of rotational force control falls below a predetermined threshold or comes close to zero, or its sign changes. Alternatively, rotation may be performed about the axis of rotational force control, based on the force about the axis of rotational force control at each point in time.

Figure 21A:
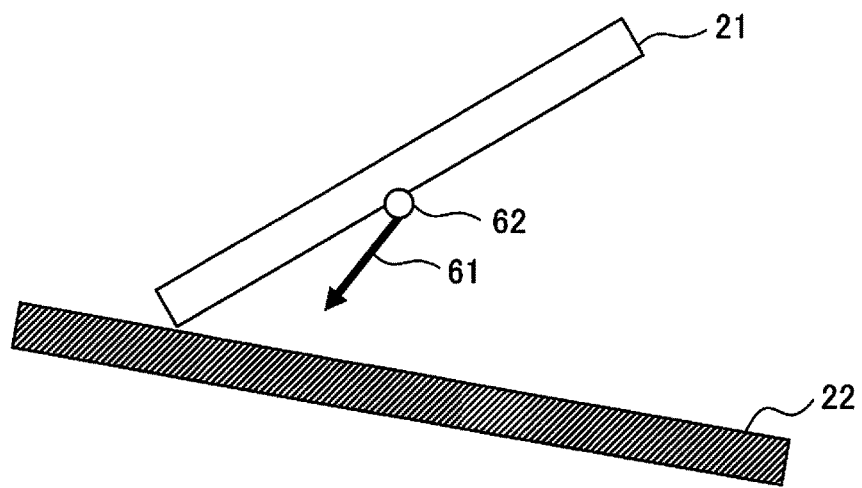
FIGS. 21a to 21c are partial enlarged views for explaining another method for setting a direction of translational force control.
Figure 21B:
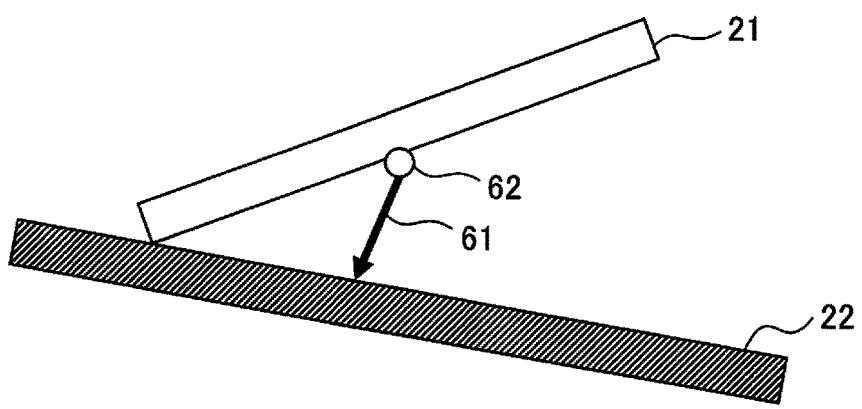
Figure 21C:
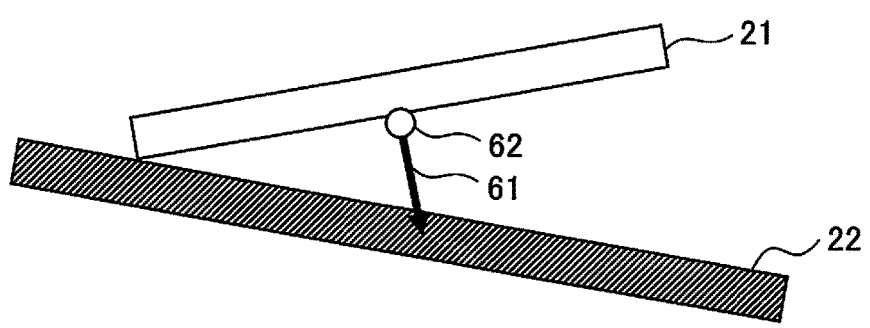

FIGS. 21*a* to 21*c* are partial enlarged views for explaining another method for setting a direction of translational force control when the given object 21 and the different object 22 are set in a combined state by the robot controller 10 according to the fourteenth embodiment of the present invention. In the method for setting a direction of translational force control, described with reference to FIGS. 20*a* to 20*c*, rotation of the given object 21 is stopped and the direction of translational force control is changed. However, in the other method for setting a direction of translational force control, a direction of translational force control is set by changing the direction of translational force control while rotating the given object 21 to obtain a direction in which the force about the axis of rotational force control increases.

FIG. 21*a* illustrates the state in which the given object 21 and the different object 22 have come into contact with each other for the first time upon movement to set the given object 21 and the different object 22 in a combined state. A predetermined direction independent of the moving operation of the given object 21 is set as a direction of translational force control 61, and an axis which runs in a predetermined direction independent of the moving operation of the given object 21 and passes through a control point for the given object 21 is set as an axis of rotational force control 62. Alternatively, a predetermined direction for the given object 21 may be set as a direction of translational force control 61. A method for determining contact between the given object 21 and the different object 22 is the same as described earlier.

In this case, rotation is performed about the axis of rotational force control, as well as pressing in the direction of translational force control, without stopping rotation about the axis of rotational force control, unlike the method described with reference to FIGS. 20*a* to 20*c*.

The given object 21 is moved relative to the different object 22 to set the given object 21 and the different object 22 in a combined state, while changing the direction of translational force control, as illustrated as FIGS. 21*b* and 21*c*. Movement may be performed by appropriate adjustment of the velocity of rotation of the given object 21 to be small until a change in direction of translational force control is completed. At this time, forces about the axes of rotational force control when the given object 21 and the different object 22 are in contact with each other are obtained to, in turn, obtain a direction in which the force about the axis of rotational force control exceeds a predetermined threshold or that in which the force about the axis of rotational force control reaches its maximum among a plurality of directions. The direction of translational force control is set to a predetermined direction for the given object 21 to vary with movement of the given object 21.

The given object 21 is moved to be pressed in a plurality of other directions including components of the direction of translational force control at the time with a predetermined range as a limit when the direction of translational force control is changed while rotating the given object 21 about the axis of rotational force control. As the direction to press the given object 21 is changed to the other directions, these directions are set not to reduce the force about the axis of rotational force control or set to increase the force about the axis of rotational force control, based on the magnitude of the force about the axis of rotational force control. Alternatively, directions which satisfy conditions are searched with as few changes in direction to press as possible, in accordance with the purpose such as the finding of a direction in which the force about the axis of rotational force control reaches its maximum or the finding of a direction in which the force about the axis of rotational force control exceeds a predetermined threshold.

Upon movement with a change in direction of translational force control of the given object 21, when the force about the axis of rotational force control is greater than that in the previous direction, the relationship between the orientation of the given object 21 and the direction of translational force control, i.e., the predetermined direction for the given object 21 is updated based on the direction of translational force control.

Movement is performed about the axis of rotational force control, based on the force about the axis of rotational force control at each point in time. The direction in which the force about the axis of rotational force control exceeds a predetermined threshold when movement is performed while changing the direction of translational force control of the given object 21 is set as a final direction of translational force control, and setting of a direction of translational force control is completed.

Alternatively, a direction of translational force control may be set as follows. Upon movement with a change in direction of translational force control of the given object 21, when the force about the axis of rotational force control is greater than that in the previous direction, the relationship between the orientation of the given object 21 and the direction of translational force control, i.e., the predetermined direction for the given object 21 is updated based on the direction of translational force control. Movement is performed about the axis of rotational force control, based on the force about the axis of rotational force control at each point in time. The direction in which the force about the axis of rotational force control reaches its maximum when movement is performed while changing the direction of translational force control of the given object 21 in a plurality of directions which fall within a predetermined range is set as a final direction of translational force control, and setting of a direction of translational force control is completed. The direction is preferably changed to make the direction in which the force about the axis of rotational force control reaches its maximum findable in a short period of time. The direction in which the force about the axis of rotational force control reaches its maximum is assumed to be the direction in which the force about the axis of rotational force control reaches its maximum when the direction in question is changed to a plurality of directions within a predetermined range.

Even when the preset direction of translational force control is inappropriate, it can be changed to a more appropriate direction by the above-mentioned setting of a direction of translational force control by the translational force control direction setting unit 32. This makes it possible to more quickly, reliably set the given object 21 and the different object 22 in a combined state.

In a fifteenth embodiment of the present invention, as an additional feature to the robot controllers 10 according to the first to fourteenth embodiments of the present invention, preferably, when two or more axes of rotational force control are set, for a predetermined axis of rotational force control, based on the force acting between a given object 21 and a different object 22, when the force about the axis of rotational force control is smaller than a predetermined threshold B for the force about the axis of rotational force control, a rotational force control axis target rotational movement amount calculation unit 36 in a robot controller 10 sets a predetermined amount of rotational movement C as a target amount of rotational force control axis rotational movement, and when the force about the axis of rotational force control is equal to or greater than the predetermined threshold B for the force about the axis of rotational force control, the rotational force control axis target rotational movement amount calculation unit 36 calculates a target amount of rotational force control axis rotational movement, based on the force about the axis of rotational force control and a predetermined target force about the axis, or a predetermined amount of rotational movement D, the force about the axis of rotational force control, and the predetermined target force about the axis.

Differences from the robot controllers 10 according to the first to fourteenth embodiments of the present invention will now be mainly described in the fifteenth embodiment of the present invention. Details which will not be particularly referred to hereinafter are practiced in the same way.

According to the fifteenth embodiment of the present invention, in the first to fourteenth embodiments of the present invention, when the given object 21 is moved relative to the different object 22 while rotating the given object 21 about a predetermined axis of rotational force control to obtain a state in which a predetermined portion of the given object 21 and a predetermined portion of the different object 22 are in contact and combined with each other, and the given object 21 is rotated about a predetermined axis of rotational force control different from the axis of rotational force control for setting the above-mentioned combined state, a target amount of movement about the predetermined axis of rotational force control different from the axis of rotational force control for setting the above-mentioned combined state is calculated in accordance with the force acting between the given object 21 and the different object 22.

The above-mentioned target amount of movement is calculated in accordance with the force acting between the given object 21 and the different object 22, as follows. When the force about a predetermined axis of rotational force control is smaller than a predetermined threshold, a predetermined amount of rotational movement is set as a target amount of rotational force control axis rotational movement. When the force about the predetermined axis of rotational force control is equal to or greater than the predetermined threshold, the force about the predetermined axis of rotational force control is controlled to reach a predetermined target force, based on the force about the predetermined axis of rotational force control and the predetermined target force about the axis or based on a predetermined amount of rotational movement per control cycle, the force about the predetermined axis of rotational force control, and the predetermined target force about the axis. At this time, a value calculated as, e.g., (Predetermined Target Force−Force about Predetermined Axis of Rotational Force Control)/(Predetermined Target Force)×(Force Control Gain) or (Predetermined Target Force−Force about Predetermined Axis of Rotational Force Control)/(Predetermined Target Force)×(Predetermined Amount of Rotational Movement) is set as a target amount of rotational force control axis rotational movement.

In this manner, calculating a target amount of movement about a predetermined axis of rotational force control in accordance with the force acting between the given object 21 and the different object 22 makes it possible to move the given object 21 relative to the different object 22 to obtain a state in which a predetermined portion of the given object 21 and a predetermined portion of the different object 22 are in contact and combined with each other, while rotating the given object 21 about the predetermined axis of rotational force control to adjust the force about this predetermined axis of rotational force control of the given object 21 to a target force.

Hence, when, for example, the given object 21 is equipped with a key while the different object 22 is equipped with a keyway, the key of the given object 21 can be fitted into the keyway in the different object 22 by setting the given object 21 and the different object 22 in a state in which their predetermined portions are in contact and combined with each other, and rotating the given object 21 about the axis of rotational force control by the above-mentioned control in accordance with the force about the axis of rotational force control. When the given object 21 and the different object 22 include respective three-dimensional structures for fitting them together, the three-dimensionally-patterned portions of the given object 21 and the different object 22 can be fitted together by setting the given object 21 and the different object 22 in a state in which their predetermined portions are in contact and combined with each other, and rotating the given object 21 about the axis of rotational force control by the above-mentioned control in accordance with the force about the axis of rotational force control. When the given object 21 and the different object 22 form a gear or the like, the geared portions of the given object 21 and the different object 22 can be meshed with each other and rotated by setting the given object 21 and the different object 22 in a state in which their predetermined portions are in contact and combined with each other, and rotating the given object 21 about the axis of rotational force control by the above-mentioned control in accordance with the force about the axis of rotational force control.

In this manner, the fifteenth invention according to the present invention makes it possible to set the given object 21 and the different object 22 in a combined state and fit the given object 21 and the different object 22 together, with an appropriate force, in a portion different from the portion where the given object 21 and the different object 22 are set in a combined state.

The robot controllers 10 according to the first to fifteenth embodiments of the present invention have been described above. However, when the same parameter is adjusted by a plurality of calculation units or setting units, this may be done by, for example, adjusting a value adjusted using a predetermined value as a limit, performing selective adjustment, obtaining the sum of weighted values, or using a value for adjustment to the greatest extent.

Movement can be stably, quickly performed to obtain a combined state, as described with reference to FIGS. 9a through 12e, even with a small pressing force, by setting a direction of translational force control and an axis of rotational force control and calculating an amount of movement, as described in a plurality of embodiments of the present invention.

Another exemplary setting of the given object 21 and the different object 22 in a combined state according to the present invention will be described below with reference to FIGS. 13a to 13d. FIGS. 13a to 13d are views for explaining another exemplary setting of the given object 21 and the different object 22 in a combined state.

Figure 13A:
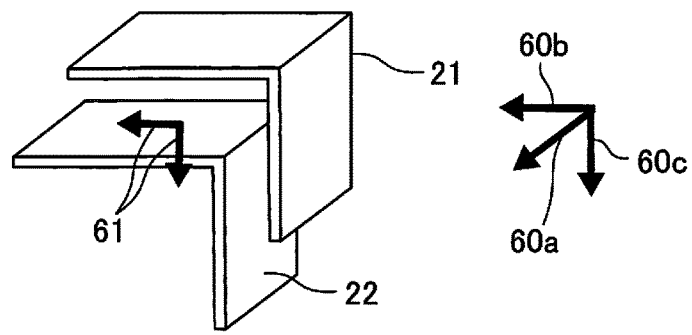
FIGS. 13a to 13d are views illustrating exemplary setting of a combined state.
Figure 13B:
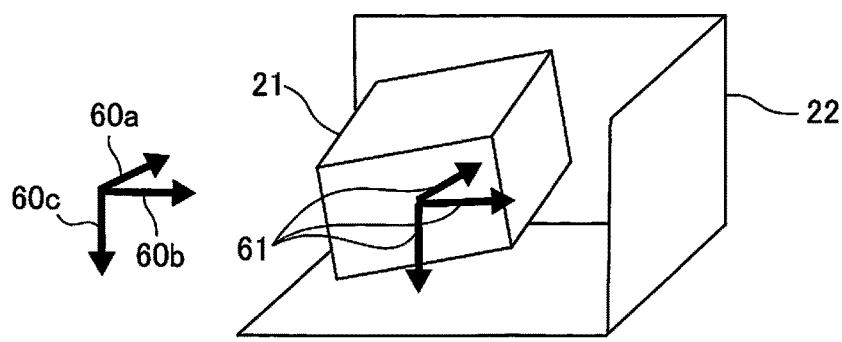
Figure 13C:
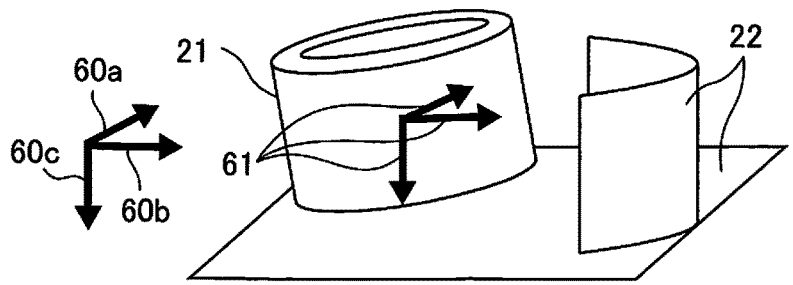
Figure 13D:
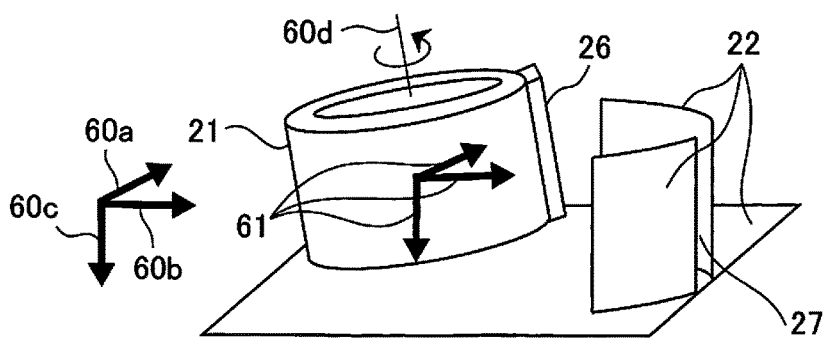

The given object 21 and the different object 22 illustrated as FIG. 13a form identically-shaped bodies each including two combined planes which make a predetermined angle with each other. In this case, the state in which the given object 21 and the different object 22 are stacked on each other is assumed as a combined state. A coordinate system defined by axes 60a, 60b, and 60c, illustrated as FIG. 13a, parallel to a coordinate system defined by three orthogonal axes set for a space or the different object 22, and having as its origin a control point for the given object 21 (since this coordinate system represents a position with respect to the given object 21, the given object 21 may not be located at its origin) is set for the given object 21. In other words, this coordinate system varies in origin position but stays the same in orientation upon movement of the given object 21. Upon defining two directions along the axes 60b and 60c as directions of translational force control 61, and the three axes 60a, 60b, and 60c as axes of rotational force control, the given object 21 is pressed in the two directions of translational force control 61, and the given object 21 is moved relative to the different object 22 to equilibrate the forces about the three axes of rotational force control: the axes 60a, 60b, and 60c, so that the given object 21 and the different object 22 can be moved to set them in a stacked, combined state. Alternatively, in the state illustrated as FIG. 13a, a combined state can also be obtained by setting two axes of rotational force control for each plane in which the given object 21 is stacked on the different object 22, and setting these axes for the given object 21 to maintain a predetermined relationship with the orientation of the given object 21, independently of movement of the given object 21, and moving the given object 21 relative to the different object 22 in the two directions of translational force control 61 to equilibrate the forces about the two axes of rotational force control in each plane.

Still another exemplary setting of the given object 21 and the different object 22 in a combined state will be described below. The given object 21 illustrated as FIG. 13b forms a rectangular parallelepiped, while the different object 22 illustrated as FIG. 13b uses three combined orthogonal planes. In this case, the state in which one vertex of the given object 21 is combined with the corner of the different object 22 is assumed as a combined state. A coordinate system defined by axes 60a, 60b, and 60c, illustrated as FIG. 13b, parallel to a coordinate system defined by three orthogonal axes set for a space or the different object 22, and having as its origin a control point for the given object 21 is set for the given object 21. In other words, this coordinate system varies in origin position but stays the same in orientation upon movement of the given object 21. A direction of translational force control and an axis of rotational force control are set based on three axes in a coordinate system defined by three orthogonal axes. Upon defining three directions along the axes 60a, 60b, and 60c as directions of translational force control 61, and the three axes 60a, 60b, and 60c as axes of rotational force control, the given object 21 is pressed in the three directions of translational force control 61 and moved relative to the different object 22 to equilibrate the forces about the three axes of rotational force control: the axes 60a, 60b, and 60c to attain a combined state in which one vertex of the given object 21 is combined with the corner of the different object 22. Still another exemplary setting of the given object 21 and the different object 22 in a combined state will be described below. The given object 21 illustrated as FIG. 13c forms a cylinder. The different object 22 illustrated as FIG. 13c uses a combination of a plane and a curved surface portion which can be superimposed on a curved surface portion defining the cylindrical side surface of the given object 21. In this case, the state in which the cylindrical bottom surface of the given object 21 is combined with the planar portion of the different object 22, and a curved surface defining the cylindrical side surface of the given object 21 and the above-mentioned curved surface of the different object 22 are superimposed on each other is assumed as a combined state. A coordinate system defined by axes 60*a*, 60*b*, and 60*c*, illustrated as FIG. 13*c*, parallel to a coordinate system defined by three orthogonal axes set for a space or the different object 22, and having as its origin a control point for the given object 21 is set for the given object 21. In other words, this coordinate system varies in origin position but stays the same in orientation upon movement of the given object 21. A direction of translational force control and an axis of rotational force control are set based on three axes in a coordinate system defined by three orthogonal axes. Three directions along the axes 60*a*, 60*b*, and 60*c* are defined as directions of translational force control 61. In this case, the given object 21 is pressed in the directions of translational force control 61 along the axes 60*b* and 60*c* with a translational force control target force having a predetermined non-zero magnitude. Passive force control is performed in the direction of translational force control 61 along the axis 60*a* with a translational force control target force having a predetermined magnitude of zero. Upon defining the two axes 60*a* and 60*b* as axes of rotational force control, the given object 21 is pressed in the three directions of translational force control 61 and moved relative to the different object 22 to equilibrate the forces about the axes 60*a* and 60*b* to attain a combined state in which the cylindrical bottom surface of the given object 21 is combined with the planar portion of the different object 22, and a curved surface defining the cylindrical side surface of the given object 21 and the above-mentioned curved surface of the different object 22 are superimposed on each other.

Still another exemplary setting of the given object 21 and the different object 22 in a combined state will be described below. The given object 21 illustrated as FIG. 13*d* forms a cylinder, as depicted as FIG. 13*c*, having a side surface equipped with a key formed in a part 26 of the given object 21. The different object 22 illustrated as FIG. 13*d* uses a combination of a plane, and a configuration including a curved surface portion which can be superimposed on a curved surface portion defining the cylindrical side surface of the given object 21, and a keyway formed in a part 27 of the different object 22 which can be combined with the key in the part 26 of the side surface of the given object 21. In this case, the robot controller 10 according to the 15th embodiment of the present invention is used to move the given object 21 and the different object 22 relative to each other to obtain a combined state in which the cylindrical bottom surface of the given object 21 is combined with the planar portion of the different object 22, and a curved surface defining the cylindrical side surface of the given object 21 and the above-mentioned curved surface of the different object 22 are superimposed on each other, and to combine the key in the part 26 of the given object 21 with the keyway in the part 27 of the different object 22. A coordinate system defined by axes 60*a*, 60*b*, and 60*c*, illustrated as FIG. 13*d*, parallel to a coordinate system defined by three orthogonal axes set for a space or the different object 22, and having as its origin a control point for the given object 21 is set for the given object 21. In other words, this coordinate system varies in origin position but stays the same in orientation upon movement of the given object 21. An axis 60*d*, illustrated as FIG. 13*d*, of rotation of the given object 21 is set for the given object 21. Three directions along the axes 60*a*, 60*b*, and 60*c* are defined as directions of translational force control 61. In this case, the given object 21 is pressed in the directions of translational force control 61 along the axes 60*b* and 60*c* with a translational force control target force having a predetermined non-zero magnitude. Passive force control is performed in the direction of translational force control 61 along the axis 60*a* with a translational force control target force having a predetermined magnitude of zero. Upon defining the two axes 60*a* and 60*b* as axes of rotational force control, the given object 21 is pressed in the three directions of translational force control 61, and the forces about the two axes 60*a* and 60*b* are equilibrated. The axis 60*d* is further defined as an axis of rotational force control.

Unlike rotation about the axes 60*a* and 60*b*, the given object 21 is rotated about the axis 60*d* serving as an axis of rotation, based on the force acting between the given object 21 and the different object 22, to adjust the force about the axis 60*d* to a predetermined target force. Moving the given object 21 relative to the different object 22, as described earlier, makes it possible to obtain a combined state in which the cylindrical bottom surface of the given object 21 is combined with the planar portion of the different object 22, and a curved surface defining the cylindrical side surface of the given object 21 and the above-mentioned curved surface of the different object 22 are superimposed on each other, and to combine the key in the part 26 of the given object 21 with the keyway in the part 27 of the different object 22. As an axis of rotational force control, the above-mentioned axis 60*d* may be replaced with the axis 60*c* (its orientation stays the same upon movement of the given object 21) of the above-described coordinate system defined by the axes 60*a*, 60*b*, and 60*c*, illustrated as FIG. 13*d*, parallel to a coordinate system defined by three orthogonal axes set for a space or the different object 22, and having as its origin a control point for the given object 21, which is set for the given object 21, so that the given object 21 is rotated based on the force acting between the given object 21 and the different object 22, to adjust the force about the obtained axis to a predetermined target force.

As described above, as long as the given object 21 and the different object 22 can be set in the state in which a predetermined portion of the given object 21 and a predetermined portion of the different object 22 are in contact and combined with each other in accordance with the present invention, a combination of objects having any shapes may be employed as the given object 21 and the different object 22, which can be stably, rapidly moved to obtain the combined state even with a small pressing force.

According to the present invention, when the orientation is changed by rotating a given object while pressing it against a different object with a predetermined force, a non-contact state is made harder to set, or the force in the direction of translational force control in which the given object is translated relative to the different object based on the force acting between the given object and the different object is made harder to get smaller. This allows more stable, more rapid rotation to obtain a state in which a predetermined portion of the given object and a predetermined portion of the different object are in contact and combined with each other in a short period of time.

Further, when the orientation is changed by rotating the given object relative to the different object, a non-contact state is made harder to set, or the force in the direction of translational force control in which the given object is translated relative to the different object based on the force acting between the given object and the different object is made harder to get smaller, and rotation is stably speeded up to allow more rapid rotation. This allows stable, rapid rotation to obtain a state in which a predetermined portion of the given object and a predetermined portion of the different object are in contact and combined with each other in a short period of time, even with a small target force for force control in the direction of translational force control.

In addition to stable, rapid rotation, quick convergence to a target state can be achieved by adjusting the velocity of rotation as appropriate in accordance with the contact state between the given object and the different object.

As described earlier, according to the present invention, a state in which a predetermined portion of the given object and a predetermined portion of the different object are in contact and combined with each other can be stably obtained in a short period of time, even with a small contact force.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A robot controller which controls a force acting between a given object located on an end effector of a robot and a different object to move the given object relative to the different object to obtain a state in which a predetermined portion of the given object and a predetermined portion of the different object are in contact and combined with each other, the robot controller comprising:
   a force measuring unit which measures the force acting between the given object and the different object;
   a translational force control direction setting unit which sets at least one direction of translational force control in which the given object is translated relative to the different object based on the force acting between the given object and the different object;
   a translational force control target force setting unit which sets, for each of the at least one direction of translational force control, a translational force control target force representing a target value for the force acting between the given object and the different object in the direction of translational force control;
   a rotational force control axis setting unit which sets at least one axis of rotational force control representing an axis of rotation about which the given object is rotated relative to the different object based on the force acting between the given object and the different object, and sets an axis that is not parallel to the direction of translational force control as at least one of the at least one axis of rotational force control;
   a translational force control direction target movement amount calculation unit which calculates a target amount of translational force control direction movement representing a target value for an amount of translational movement of the given object relative to the different object in the direction of translational force control, based on the force acting between the given object and the different object;
   a rotational force control axis target rotational movement amount calculation unit which calculates a target amount of rotational force control axis rotational movement representing a target value for an amount of rotational movement of the given object relative to the different object about the axis of rotational force control, based on the force acting between the given object and the different object;
   a target direction target movement amount calculation unit which calculates a target amount of translational movement representing a target value for an amount of translational movement of the given object, and a target amount of rotational movement representing a target value for an amount of rotational movement of the given object, based on
      the force acting between the given object and the different object,
      the direction of translational force control set by the translational force control direction setting unit,
      the axis of rotational force control set by the rotational force control axis setting unit,
      the target amount of translational force control direction movement calculated by the translational force control direction target movement amount calculation unit, and
      the target amount of rotational force control axis rotational movement calculated by the rotational force control axis target rotational movement amount calculation unit; and
   an operation command generation unit which generates an operation command for the robot, based on the target amount of translational movement and the target amount of rotational movement calculated by the target direction target movement amount calculation unit,
   wherein the translational force control direction target movement amount calculation unit
   calculates the target amount of translational force control direction movement, based on one of a first predetermined amount of translational force control direction movement, and the first predetermined amount of translational force control direction movement and the translational force control target force in the direction of translational force control, when the force acting between the given object and the different object in the direction of translational force control is smaller than a first predetermined threshold for a force in the direction of translational force control, and
   calculates the target amount of translational force control direction movement, based on one of
   the force acting between the given object and the different object in the direction of translational force control and the translational force control target force in the direction of translational force control, and the force acting between the given object and the different object in the direction of translational force control, the translational force control target force in the direction of translational force control, and a second predetermined amount of translational force control direction movement, when the force acting between the given object and the different object in the direction of translational force control is not less than the first predetermined threshold for the force in the direction of translational force control.

2. The robot controller as set forth in claim 1, wherein the translational force control direction target movement amount calculation unit calculates an amount of correction movement for the target amount of translational force control direction movement, based on the target amount of rotational force control axis rotational movement, to, in turn, calculate the target amount of translational force control direction movement by correction using the amount of correction movement, in accordance with a relationship between an amount of rotational movement about the axis of rotational force control of the given object and an amount of translational movement of a portion where the given object and the different object come into contact with each other upon rotation about the axis of rotational force control of the given object.

3. The robot controller as set forth in claim 1, further comprising:

a contact position setting unit which sets a contact position at which the given object and the different object come into contact with each other, or calculates and sets a contact position at which the given object and the different object come into contact with each other based on the force acting between the given object and the different object, wherein the rotational force control axis setting unit sets at least one predetermined axis of rotational force control, and sets as at least one contact position reference axis of rotational force control, at least one axis which passes through the contact position in one of the given object and the different object and is parallel to the predetermined axis of rotational force control, and the rotational force control axis target rotational movement amount calculation unit calculates a target amount of rotational movement about the contact position reference axis of rotational force control to set the calculated target amount of movement as the target amount of rotational force control axis rotational movement, based on one of a force about the predetermined axis of rotational force control, and a target amount of rotational movement about the axis of rotational force control calculated for the predetermined axis of rotational force control.

4. The robot controller as set forth in claim 1, further comprising:

a contact portion orientation calculation unit which calculates one of an orientation of a contact portion in the given object, where the state in which the predetermined portion of the given object and the predetermined portion of the different object are in contact and combined with each other is set, an orientation of the contact portion in the different object, and orientations of the contact portion in the given object and the contact portion in the different object, wherein the contact portion orientation calculation unit calculates a plurality of contact positions at which the given object and the different object come into contact with each other based on the force acting between the given object and the different object, to, in turn, calculate an orientation of a portion where the given object and the different object come into contact with each other based on the plurality of calculated contact positions, and the rotational force control axis target rotational movement amount calculation unit calculates the target amount of rotational force control axis rotational movement, based on the force acting between the given object and the different object, and the orientation of the portion where the given object and the different object come into contact with each other, calculated by the contact portion orientation calculation unit.

5. The robot controller as set forth in claim 1, further comprising:

a combined state orientation calculation unit (41) which calculates a combined state orientation to set the state in which the predetermined portion of the given object and the predetermined portion of the different object are in contact and combined with each other, wherein when the given object and the different object come into contact with each other, the robot controller stops movement of the given object relative to the different object in the direction of translational force control and obtains an orientation of the given object, and then stops movement of the given object relative to the different object in the direction of translational force control and rotates the given object relative to the different object about the axis of rotational force control to obtain an orientation of the given object when the given object and the different object come into contact with each other, the combined state orientation calculation unit calculates the combined state orientation based on the orientation of the given object obtained when the given object and the different object come into contact with each other, and the rotational force control axis target rotational movement amount calculation unit calculates the target amount of rotational force control axis rotational movement, based on the force acting between the given object and the different object, and the combined state orientation calculated by the combined state orientation calculation unit.

6. The robot controller as set forth in claim 1, wherein in calculating a target amount of movement about the axis of rotational force control that is not parallel to one of the at least one direction of translational force control set by the translational force control direction setting unit, upon defining as a first contact state, a state in which the force acting between the given object and the different object in the direction of translational force control that is not parallel to the axis of rotational force control is smaller than a second predetermined threshold for the force in the direction of translational force control, or the force acting between the given object and the different object about the axis of rotational force control is smaller than a predetermined threshold A for the force about the axis of rotational force control, and upon defining as a second contact state, a state in which the force acting between the given object and the different object in the direction of translational force control that is not parallel to the axis of rotational force control is not less than the second predetermined threshold for the force in the direction of translational force control, and the force acting between the given object and the different object about the axis of rotational force control is not less than the predetermined threshold A for the force about the axis of rotational force control, the rotational force control axis target rotational movement amount calculation unit calculates the target amount of rotational force control axis rotational movement as zero when the first contact state has been set and no shift from the second contact state to the first contact state is made, calculates the target amount of rotational force control axis rotational movement as zero, or calculates the target amount of rotational force control axis rotational movement, based on a direction of movement and an amount of movement about the axis of rotational force control in the second contact state until a shift to the first contact state is made, when a shift from the second contact state to the first contact state is made, and calculates the target amount of rotational force control axis rotational movement when a shift to the second contact state is made, based on a sign of the force about the axis of rotational force control, and at least one of a predetermined amount of rotational movement A, a translational force control target force in the direction of translational force control that is not parallel to the axis of rotational force control, and the force in the direction of translational force control that is not parallel to the axis of rotational force control.

7. The robot controller as set forth in claim 1, wherein in calculating a target amount of movement about the axis of rotational force control that is not parallel to one of the at least one direction of translational force control set by the translational force control direction setting unit, upon defining as a first contact state, a state in which the force acting between the given object and the different object in the direction of translational force control that is not parallel to the axis of rotational force control is smaller than a second predetermined threshold for the force in the direction of translational force control, or the force acting between the given object and the different object about the axis of rotational force control is smaller than a predetermined threshold A for the force about the axis of rotational force control, and upon defining as a second contact state, a state in which the force acting between the given object and the different object in the direction of translational force control that is not parallel to the axis of rotational force control is not less than the second predetermined threshold for the force in the direction of translational force control, and the force acting between the given object and the different object about the axis of rotational force control is not less than the predetermined threshold A for the force about the axis of rotational force control, the rotational force control axis target rotational movement amount calculation unit calculates the target amount of rotational force control axis rotational movement as zero when the first contact state has been set and no shift from the second contact state to the first contact state is made, calculates the target amount of rotational force control axis rotational movement as zero, or calculates the target amount of rotational force control axis rotational movement, based on a direction of movement and an amount of movement about the axis of rotational force control in the second contact state until a shift to the first contact state is made, when a shift from the second contact state to the first contact state is made, and calculates the target amount of rotational force control axis rotational movement when a shift to the second contact state is made, based on one of the force about the axis of rotational force control, the force about the axis of rotational force control and a maximum value of the force about the axis of rotational force control under a predetermined condition in controlling the force acting between the given object and the different object, and a predetermined amount of rotational movement B, the force about the axis of rotational force control, and a maximum value of the force about the axis of rotational force control under a predetermined condition in controlling the force acting between the given object and the different object.

8. The robot controller as set forth in claim 1, further comprising:

a combined state determination unit which determines whether the given object and the different object are in one of a combined state in which the predetermined portion of the given object and the predetermined portion of the different object are in contact and combined with each other, and a nearly combined state close to the combined state, wherein in calculating a target amount of movement about the axis of rotational force control that is not parallel to one of the at least one direction of translational force control set by the translational force control direction setting unit, upon defining as a first contact state, a state in which the force acting between the given object and the different object in the direction of translational force control that is not parallel to the axis of rotational force control is smaller than a second predetermined threshold for the force in the direction of translational force control, or the force acting between the given object and the different object about the axis of rotational force control is smaller than a predetermined threshold A for the force about the axis of rotational force control, and upon defining as a second contact state, a state in which the force acting between the given object and the different object in the direction of translational force control that is not parallel to the axis of rotational force control is not less than the second predetermined threshold for the force in the direction of translational force control, and the force acting between the given object and the different object about the axis of rotational force control is not less than the predetermined threshold A for the force about the axis of rotational force control, the rotational force control axis target rotational movement amount calculation unit calculates the target amount of rotational force control axis rotational movement as zero when the first contact state has been set and no shift from the second contact state to the first contact state is made, and calculates the target amount of rotational force control axis rotational movement as zero, or calculates the target amount of rotational force control axis rotational movement, based on a direction of movement and an amount of movement about the axis of rotational force control in the second contact state until a shift to the first contact state is made, when a shift from the second contact state to the first contact state is made, and upon defining as a contact state 2A, one of a state in which the second contact state has been set and the combined state determination unit determines that one of the nearly combined state and the combined state has been set, and a state subsequent to the state in which the second contact state has been set and the combined state determination unit determines that one of the nearly combined state and the combined state has been set, and upon defining as a contact state 2B, a state comprised in the second contact state and different from the contact state 2A, when the contact state 2B has been set, the rotational force control axis target rotational movement amount calculation unit calculates the target amount of rotational force control axis rotational movement, based on a sign of the force about the axis of rotational force control, and at least one of a predetermined amount of rotational movement A, a translational force control target force in the direction of translational force control that is not parallel to the axis of rotational force control, and the force in the direction of translational force control that is not parallel to the axis of rotational force control, and when the contact state 2A has been set, the rotational force control axis target rotational movement amount calculation unit
calculates the target amount of rotational force control axis rotational movement, based on one of
the force about the axis of rotational force control,
the force about the axis of rotational force control and a maximum value of the force about the axis of rotational force control under a predetermined condition in controlling the force acting between the given object and the different object, and
a predetermined amount of rotational movement B, the force about the axis of rotational force control, and a maximum value of the force about the axis of rotational force control under a predetermined condition in controlling the force acting between the given object and the different object, or
calculates the target amount of rotational force control axis rotational movement by adjustment to a value smaller than the target amount of rotational force control axis rotational movement calculated in the contact state 2B.

9. The robot controller as set forth in claim 8, wherein when a state in which the force acting between the given object and the different object in the direction of translational force control that is not parallel to the axis of rotational force control is not less than the second predetermined threshold for the force in the direction of translational force control, and the combined state determination unit determines that the combined state has been set continues for not less than a predetermined time,
the rotational force control axis target rotational movement amount calculation unit
sets the target amount of rotational force control axis rotational movement to zero, or
calculates the target amount of rotational force control axis rotational movement by adjustment to a value smaller than the calculated target amount of rotational force control axis rotational movement, and
the translational force control direction target movement amount calculation unit
sets the target amount of translational force control direction movement to zero, or
calculates the target amount of translational force control direction movement by adjustment to a value smaller than the calculated target amount of translational force control direction movement.

10. The robot controller as set forth in claim 1, wherein the robot controller further generates an operation command for the robot to move the given object relative to the different object by
correcting the direction of movement and the amount of movement of the given object relative to the different object, based on movement of a pedestal supporting the robot when one of a position, an orientation, and a position and an orientation of the pedestal of the robot moves,
correcting the direction of movement and the amount of movement of the given object relative to the different object, based on movement of the different object when one of a position, an orientation, and a position and an orientation of the different object moves, or
correcting the direction of movement and the amount of movement of the given object relative to the different object, based on movement of the pedestal of the robot and movement of the different object when one of the position, the orientation, and the position and the orientation of the pedestal of the robot and one of the position, the orientation, and the position and the orientation of the different object move.

11. The robot controller as set forth in claim 1, further comprising:
a force instability detection unit which detects instability of the force acting between the given object and the different object by detecting at least one of
a state in which a force greater than a predetermined threshold acts between the given object and the different object during a predetermined time,
a state in which a force greater than another predetermined threshold acts between the given object and the different object, and
an oscillating state of the force acting between the given object and the different object; and
a moving operation instability detection unit which detects instability of a moving operation of the robot by detecting at least one of a state close to a singular orientation of the robot and an oscillating state of the robot,
wherein when the instability of the force is detected by the force instability detection unit or the instability of the moving operation of the robot is detected by the moving operation instability detection unit, the robot controller sets the target amount of rotational force control axis rotational movement to zero, or calculates the target amount of rotational force control axis rotational movement by adjustment to a value smaller than the target amount of rotational force control axis rotational movement calculated when neither the instability of the force nor the instability of the moving operation of the robot is detected.

12. The robot controller as set forth in claim 1, wherein the robot controller further sets a magnitude of the force in the direction of translational force control as a predetermined threshold when the magnitude of the force in the direction of translational force control is larger than the predetermined threshold, and sets a magnitude of the force about the axis of rotational force control as another predetermined threshold when the magnitude of the force about the axis of rotational force control is larger than the other predetermined threshold.

13. The robot controller as set forth in claim 1, wherein the translational force control direction setting unit sets at least one of the at least one direction of translational force control based on at least one of
a predetermined direction for the given object,
a predetermined direction for the different object,
a predetermined direction independent of a moving operation of the given object, and
the axis of rotational force control when the axis of rotational force control has been set, and
the rotational force control axis setting unit sets at least one of the at least one axis of rotational force control based on at least one of
a predetermined direction for the given object,
a predetermined direction for the different object,
a predetermined direction independent of a moving operation of the given object, and
the direction of translational force control when the direction of translational force control has been set.

14. The robot controller as set forth in claim 1, wherein the translational force control direction setting unit sets the direction of translational force control, based on the force about the axis of rotational force control when the given object and the different object come into contact with each other, and the given object is pressed against the different object in different directions comprising components of the direction of translational force control with a predetermined range as a limit.

15. The robot controller as set forth in claim 1, wherein
when the axis of rotational force control comprises at least two axes of rotational force control,
for a predetermined axis of rotational force control of the at least two axes of rotational force control, based on the force acting between the given object and the different object,
when the force about the axis of rotational force control is smaller than a predetermined threshold B for the force about the axis of rotational force control, the rotational force control axis target rotational movement amount calculation unit sets a predetermined amount of rotational movement C as the target amount of rotational force control axis rotational movement, and
when the force about the axis of rotational force control is not less than the predetermined threshold B for the force about the axis of rotational force control, the rotational force control axis target rotational movement amount calculation unit calculates the target amount of rotational force control axis rotational movement, based on one of
the force about the axis of rotational force control and a predetermined target force about the axis, and
a predetermined amount of rotational movement D, the force about the axis of rotational force control, and the predetermined target force about the axis.

* * * * *